(12) United States Patent
Khoshnevisan et al.

(10) Patent No.: US 11,606,797 B2
(45) Date of Patent: Mar. 14, 2023

(54) DECODING DOWNLINK CONTROL INFORMATION IN A COMBINED PHYSICAL DOWNLINK CONTROL CHANNEL CANDIDATE

(71) Applicant: QUALCOMM Incorporated, San Diego, CA (US)

(72) Inventors: Mostafa Khoshnevisan, San Diego, CA (US); Xiaoxia Zhang, San Diego, CA (US); Tao Luo, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 71 days.

(21) Appl. No.: 17/118,146

(22) Filed: Dec. 10, 2020

(65) Prior Publication Data

US 2021/0195600 A1    Jun. 24, 2021

Related U.S. Application Data

(60) Provisional application No. 62/952,209, filed on Dec. 20, 2019.

(51) Int. Cl.
*H04W 72/04* (2009.01)
*H04W 72/02* (2009.01)
(Continued)

(52) U.S. Cl.
CPC ....... *H04W 72/0493* (2013.01); *H04W 72/02* (2013.01); *H04W 72/042* (2013.01); *H04W 72/0446* (2013.01); *H04W 72/0466* (2013.01)

(58) Field of Classification Search
CPC ............. H04W 72/0493; H04W 72/02; H04W 72/042; H04W 72/0446; H04W 72/0466
(Continued)

(56) References Cited

U.S. PATENT DOCUMENTS

| 2020/0228190 A1* | 7/2020 | Cirik | H04L 5/0023 |
| 2021/0013991 A1* | 1/2021 | Park | H04L 1/0003 |
| 2022/0053468 A1* | 2/2022 | Chen | H04L 5/0035 |

FOREIGN PATENT DOCUMENTS

WO    WO-2020064512 A1 *   4/2020   ........... H04L 1/0072

OTHER PUBLICATIONS

Huawei., et al., "PDCCH Repetition for URLLC", 3GPP Draft; R1-1809341, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 20, 2018-Aug. 24, 2018, Aug. 11, 2018 (Aug. 11, 2018), XP051516705, 7 pages, Retrieved from the Internet: URL: http://www.3gpp.org/ftp/tsg%5Fran/WG1%5FRL1/TSGR1%5F94/Docs/R1%2D1809341%2Ezip [retrieved on Aug. 11, 2018].

(Continued)

*Primary Examiner* — Faisal Choudhury
(74) *Attorney, Agent, or Firm* — Holland & Hart LLP

(57) ABSTRACT

Methods, systems, and devices for wireless communications are described. The described techniques may be used to identify when decoded downlink control information (DCI) is from a combined search space set (e.g., a physical downlink control channel (PDCCH)) candidate of a first search space set and a PDCCH candidate of a second search space set). A UE may receive DCI from a base station, identify PDCCH candidates from a first search space set, a second search space set, and a combined PDCCH candidate from the first and second search space set. The UE may decode the DCI and identify that the decoded DCI corresponds to the combined PDCCH candidate based on various characteristics. In accordance with identifying that the DCI is from a combined PDCCH candidate, the UE and base station may identify various communication channel characteristics such as PDSCH, PUSCH, and PUCCH schedul-
(Continued)

ing information, or rate-matching information, among others.

26 Claims, 19 Drawing Sheets

(51) Int. Cl.
*H04W 72/0446* (2023.01)
*H04W 72/044* (2023.01)

(58) Field of Classification Search
USPC .......................................................... 370/329
See application file for complete search history.

(56) References Cited

OTHER PUBLICATIONS

Huawei, et al., "Reliability Enhancement on PDCCH with Multi-TRP Panel Transmission", 3GPP TSG RAN WG1 Meeting #97, 3GPP Draft; R1-1907528, 3rd Generation Partnership Project (3GPP), Mobile Competence Centre; 650, Route Des Lucioles; F-06921 Sophia-Antipolis Cedex; France, vol. RAN WG1, No. Reno, USA; May 13, 2019-May 17, 2019, 3 Pages, May 13, 2019 (May 13, 2019), XP051728961, Retrieved from the Internet: URL: http://www.3gpp.org/ftp/Meetings%5F3GPP%5FSYNC/RAN1/Docs/R1%2D1907528%2Ezip [retrieved on May 13, 2019] the whole document.
International Search Report and Written Opinion—PCT/US2020/064606—ISA/EPO—dated Apr. 8, 2021.
Nokia., et al., "On PDCCH Repetition for NR URLLC", 3GPP Draft; R1-1810665_NR_URLLC_PDCCH_REP_FINAL, 3rd Generation Partnership Project (3GPP), Mobile Competence Centre; 650, Route Des Lucioles; F-06921 Sophia-Antipolis Cedex; France, vol. RAN WG1, No. Chengdu, China; Oct. 8, 2018-Oct. 12, 2018, Sep. 28, 2018 (Sep. 28, 2018), XP051518071, 5 pages, Retrieved from the Internet: URL: http://www.3gpp.org/ftp/tsg%5Fran/WG1%5FRL1/TSGR1%5F94b/Docs/R1%2D1810665%2Ezip [retrieved on Sep. 28, 2018].

* cited by examiner

DECODING DOWNLINK CONTROL INFORMATION IN A COMBINED PHYSICAL DOWNLINK CONTROL CHANNEL CANDIDATE

CROSS REFERENCE

The present Application for Patent claims the benefit of U.S. Provisional Patent Application No. 62/952,209 by KHOSHNEVISAN et al., entitled "DECODING DOWNLINK CONTROL INFORMATION IN A COMBINED PHYSICAL DOWNLINK CONTROL CHANNEL CANDIDATE," filed Dec. 20, 2019, assigned to the assignee hereof, and expressly incorporated by reference herein.

FIELD OF TECHNOLOGY

The following relates generally to wireless communications and more specifically to decoding downlink control information in a combined physical downlink control channel (PDCCH) candidate.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). A wireless multiple-access communications system may include one or more base stations or one or more network access nodes, each simultaneously supporting communication for multiple communication devices, which may be otherwise known as user equipment (UE).

SUMMARY

Various aspects of the described techniques relate to support of repetition of physical downlink control channel (PDCCH) information in fifth generation (5G) systems. The described techniques may be used to identify when decoded downlink control information (DCI) is from a combined search space set (e.g., a PDCCH candidate of a first search space set and a PDCCH candidate of a second search space set). A UE may receive DCI from a base station, identify one or more PDCCH candidates from a first search space set, or a second search space set, or a combined PDCCH candidate from the first and second search space set (or a combined candidate from one or more search space sets), or any combination thereof. The UE may decode the DCI and identify that the DCI corresponds to the combined PDCCH candidate based on one or more characteristics. In accordance with identifying that the DCI is from a combined PDCCH candidate, the UE and the base station may identify one or more various communication channel characteristics such as PDSCH, PUSCH, and PUCCH scheduling information, rate-matching information, among others.

A method of wireless communications at a UE is described. The method may include receiving downlink control information from a base station, identifying a first physical downlink control channel candidate, a second physical downlink control channel candidate, and a combined physical downlink control channel, decoding the downlink control information from at least one of the first physical downlink control channel candidate, the second physical downlink control channel candidate, and the combined physical downlink control channel candidate based on the identifying, identifying that the downlink control information corresponds to the combined physical downlink control channel candidate, and communicating with the base station based on identifying that the downlink control information corresponds to the combined physical downlink control channel candidate.

An apparatus for wireless communications at a UE is described. The apparatus may include a processor, memory coupled with the processor, and instructions stored in the memory. The instructions may be executable by the processor to cause the apparatus to receive downlink control information from a base station, identify a first physical downlink control channel candidate, a second physical downlink control channel candidate, and a combined physical downlink control channel candidate i, decode the downlink control information from at least one of the first physical downlink control channel candidate, the second physical downlink control channel candidate, and the combined physical downlink control channel candidate based on the identifying, identify that the downlink control information corresponds to the combined physical downlink control channel candidate, and communicate with the base station based on identifying that the downlink control information corresponds to the combined physical downlink control channel candidate.

Another apparatus for wireless communications at a UE is described. The apparatus may include means for receiving downlink control information from a base station, identifying a first physical downlink control channel candidate, a second physical downlink control channel candidate, and a combined physical downlink control channel, decoding the downlink control information from at least one of the first physical downlink control channel candidate, the second physical downlink control channel candidate, and the combined physical downlink control channel candidate based on the identifying, identifying that the downlink control information corresponds to the combined physical downlink control channel candidate, and communicating with the base station based on identifying that the downlink control information corresponds to the combined physical downlink control channel candidate.

A non-transitory computer-readable medium storing code for wireless communications at a UE is described. The code may include instructions executable by a processor to receive downlink control information from a base station, identify a first physical downlink control channel candidate, a second physical downlink control channel candidate, and a combined physical downlink control channel candidate, decode the downlink control information from at least one of the first physical downlink control channel candidate, the second physical downlink control channel candidate, and the combined physical downlink control channel candidate based on the identifying, identify that the downlink control information corresponds to the combined physical downlink control channel candidate, and communicate with the base station based on identifying that the downlink control information corresponds to the combined physical downlink control channel candidate.

Some examples of the method, apparatuses, and non-transitory computer-readable medium described herein may further include operations, features, means, or instructions for identifying an indication in the downlink control information, the indication indicating that the downlink control information corresponds to the combined physical downlink control channel candidate.

In some examples of the method, apparatuses, and non-transitory computer-readable medium described herein, the indication includes a bit indicating that the downlink control information corresponds to the combined physical downlink control channel candidate.

In some examples of the method, apparatuses, and non-transitory computer-readable medium described herein, identifying the indication in the downlink control information may include operations, features, means, or instructions for descrambling a cyclic redundancy check of the downlink control information with a radio network temporary identifier indicating that the downlink control information corresponds to the combined physical downlink control channel candidate.

In some examples of the method, apparatuses, and non-transitory computer-readable medium described herein, identifying the first physical downlink control channel candidate, the second physical downlink control channel candidate, and the combined physical downlink control channel candidate may include operations, features, means, or instructions for identifying the first physical downlink control channel candidate in a first search space set, the second physical downlink control channel candidate in a second search space set, and the combined physical downlink control channel candidate in the first search space set and the second search space set.

In some examples of the method, apparatuses, and non-transitory computer-readable medium described herein, decoding the downlink control information may include operations, features, means, or instructions for decoding downlink control information using at least a scrambling identifier that indicates that the downlink control information corresponds to the combined physical downlink control channel candidate.

In some examples of the method, apparatuses, and non-transitory computer-readable medium described herein, decoding the downlink control information using the scrambling identifier may include operations, features, means, or instructions for descrambling a demodulation reference signal and coded bits of the downlink control information using the scrambling identifier that indicates that the downlink control information corresponds to the combined physical downlink control channel candidate.

Some examples of the method, apparatuses, and non-transitory computer-readable medium described herein may further include operations, features, means, or instructions for identifying that the downlink control information corresponds to the combined physical downlink control channel candidate based at least in part on a configuration that indicates that the first physical downlink control channel candidate is associated with the second physical downlink control channel candidate.

Some examples of the method, apparatuses, and non-transitory computer-readable medium described herein may further include operations, features, means, or instructions for identifying a starting location of a physical downlink shared channel based on identifying that the downlink control information corresponds to the combined physical downlink control channel candidate, and receiving the physical downlink shared channel based on the starting location.

In some examples of the method, apparatuses, and non-transitory computer-readable medium described herein, identifying the starting location may include operations, features, means, or instructions for identifying that the starting location may be during or after a first symbol of a later search space set of the first search space set and the second search space set.

In some examples of the method, apparatuses, and non-transitory computer-readable medium described herein, identifying the starting location may include operations, features, means, or instructions for identifying that the starting location may be during or after a first symbol of an earlier search space set of the first search space set and the second search space set, during or after a first symbol of the first search space set or the second search space set with a smallest index, or during or after a first symbol of a first control resource set and a second control resource set with a smallest identifier.

Some examples of the method, apparatuses, and non-transitory computer-readable medium described herein may further include operations, features, means, or instructions for identifying a reference symbol for identifying a starting location of a physical downlink shared channel based on identifying that the downlink control information corresponds to the combined physical downlink control channel candidate.

In some examples of the method, apparatuses, and non-transitory computer-readable medium described herein, identifying the reference symbol may include operations, features, means, or instructions for identifying a first symbol among a later of the first search space set and the second search space set.

In some examples of the method, apparatuses, and non-transitory computer-readable medium described herein, identifying the reference symbol may include operations, features, means, or instructions for identifying a first symbol among an earlier of the first search space set and the second search space set, a first symbol of the first search space set or the second search space set with a smallest index, or a first symbol of a first control resource set and a second control resource set with a smallest identifier.

Some examples of the method, apparatuses, and non-transitory computer-readable medium described herein may further include operations, features, means, or instructions for identifying a downlink control information format for the decoded downlink control information, where identifying the reference symbol may be based on identifying the downlink control information format.

Some examples of the method, apparatuses, and non-transitory computer-readable medium described herein may further include operations, features, means, or instructions for identifying the starting location of the physical downlink shared channel based on the reference symbol, and receiving the physical downlink shared channel based on the identified starting location.

Some examples of the method, apparatuses, and non-transitory computer-readable medium described herein may further include operations, features, means, or instructions for identifying a reference slot in accordance with a later slot of the first search space set and the second search space set based on identifying that the downlink control information corresponds to the combined physical downlink control channel candidate, and identifying a starting location of a physical downlink shared channel based on the reference slot.

In some examples of the method, apparatuses, and non-transitory computer-readable medium described herein, identifying the starting location further may include operations, features, means, or instructions for identifying a resource allocation field in the downlink control information, where the starting location of the physical downlink shared channel may be identified using a value of the resource allocation field relative to the reference slot.

Some examples of the method, apparatuses, and non-transitory computer-readable medium described herein may further include operations, features, means, or instructions for receiving the physical downlink shared channel based at least in part on the identified starting location.

Some examples of the method, apparatuses, and non-transitory computer-readable medium described herein may further include operations, features, means, or instructions for identifying a reference symbol in accordance with a last symbol of a later of the first search space set and the second search space set, identifying an offset between the reference symbol and a physical downlink shared channel scheduled by the decoded downlink control information, and comparing the offset to a UE capability threshold to determine whether to use a default setting or a setting indicated by the downlink control information for receiving the physical downlink shared channel.

In some examples of the method, apparatuses, and non-transitory computer-readable medium described herein, the default setting and the setting indicated by the downlink control information correspond respective receive beams for receiving the physical downlink shared channel.

Some examples of the method, apparatuses, and non-transitory computer-readable medium described herein may further include operations, features, means, or instructions for determining to use the default setting for receiving the physical downlink shared channel based on determining that the offset may be less than the UE capability threshold in accordance with the comparing.

Some examples of the method, apparatuses, and non-transitory computer-readable medium described herein may further include operations, features, means, or instructions for determining to use the setting indicated by the downlink control information based on determining that the offset may be greater than the UE capability threshold in accordance with the comparing.

Some examples of the method, apparatuses, and non-transitory computer-readable medium described herein may further include operations, features, means, or instructions for identifying a reference slot in accordance with a later slot of the first search space set and the second search space set based on identifying that the downlink control information corresponds to the combined physical downlink control channel candidate, and identifying a starting location of a physical uplink shared channel based on the reference slot.

In some examples of the method, apparatuses, and non-transitory computer-readable medium described herein, identifying the starting location further may include operations, features, means, or instructions for identifying a resource allocation field included in the decoded downlink control information, where the starting location may be identified based on a value of the resource allocation field relative to the reference slot.

Some examples of the method, apparatuses, and non-transitory computer-readable medium described herein may further include operations, features, means, or instructions for identifying a reference symbol in accordance with a last symbol of a later search space set of the first search space set and the second search space set based on identifying that the downlink control information corresponds to the combined physical downlink control channel candidate, and identifying that a scheduled physical uplink control channel starts after a number of symbols after the reference symbol.

In some examples of the method, apparatuses, and non-transitory computer-readable medium described herein, the number of symbols may be determined based on a capability of the UE.

Some examples of the method, apparatuses, and non-transitory computer-readable medium described herein may further include operations, features, means, or instructions for identifying that a physical downlink shared channel scheduled by the downlink control information may be rate matched around resources in the first search space set and the second search space set corresponding to the downlink control information based on identifying that the downlink control information corresponds to the combined physical downlink control channel candidate.

Some examples of the method, apparatuses, and non-transitory computer-readable medium described herein may further include operations, features, means, or instructions for identifying that a physical downlink shared channel scheduled by the downlink control information may be rate matched around resources in of the first physical downlink control channel candidate and the second physical downlink control channel candidate corresponding to the downlink control information based on identifying that the downlink control information corresponds to the combined physical downlink control channel candidate.

Some examples of the method, apparatuses, and non-transitory computer-readable medium described herein may further include operations, features, means, or instructions for identifying a precoder granularity of a control resource set associated with the first search space set or the second search space set, and identifying that the physical downlink shared channel may be further rate matched around one or more demodulation reference signals based on the precoder granularity.

In some examples of the method, apparatuses, and non-transitory computer-readable medium described herein, the one or more demodulation reference signals correspond to resource element groups of the control resource set when the precoder granularity indicates contiguous resource blocks of the control resource set.

In some examples of the method, apparatuses, and non-transitory computer-readable medium described herein, the one or more demodulation reference signals correspond to resource element groups of the combined physical downlink control channel candidate when the precoder granularity does not indicate contiguous resource blocks of the control resource set.

Some examples of the method, apparatuses, and non-transitory computer-readable medium described herein may further include operations, features, means, or instructions for identifying that the downlink control information does not include a transmission configuration indicator state field indicating a transmission configuration indicator state of a physical downlink shared channel scheduled by the downlink control information, and identifying whether a first control resource set corresponding to the first search space set may be a same control resource set as a second control resource set corresponding to the second search space set based on identifying that the downlink control information corresponds to the combined physical downlink control channel candidate and identifying that the downlink control information does not include the transmission configuration indicator state field.

Some examples of the method, apparatuses, and non-transitory computer-readable medium described herein may further include operations, features, means, or instructions for identifying the transmission configuration indicator state, a quasi-co-location, or both for the scheduled physical downlink shared channel in accordance with the first control resource set or the second control resource set that corresponds to a combined physical downlink shared channel candidate based on identifying that the first control resource set corresponds to the second control resource set.

Some examples of the method, apparatuses, and non-transitory computer-readable medium described herein may further include operations, features, means, or instructions for determining whether an offset between the downlink control information and a corresponding physical downlink shared channel may be greater than or equal to a UE capability threshold, where the transmission configuration indicator state, the quasi co-location or both may be identified based on determining that the offset may be greater than the UE capability threshold.

Some examples of the method, apparatuses, and non-transitory computer-readable medium described herein may further include operations, features, means, or instructions for identifying the transmission configuration transmission configuration indicator state, a quasi-co-location, or both for the scheduled physical downlink shared channel in accordance with the first control resource set or the second control resource set based on identifying that the first control resource set may be different from the second control resource set.

Some examples of the method, apparatuses, and non-transitory computer-readable medium described herein may further include operations, features, means, or instructions for identifying the transmission configuration indicator state, the quasi co-location, or both for the scheduled physical downlink shared channel in accordance with the first control resource set or the second control resource set based on a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof.

Some examples of the method, apparatuses, and non-transitory computer-readable medium described herein may further include operations, features, means, or instructions for identifying the transmission configuration indicator state, a quasi-co-location, or both for the scheduled physical downlink shared channel in accordance with the first control resource set and the second control resource set based on identifying that the first control resource set may be different from the second control resource set.

In some examples of the method, apparatuses, and non-transitory computer-readable medium described herein, the transmission configuration indicator state, the quasi co-location, or both correspond to a multi-beam or a multi-transmission configuration indicator state physical downlink shared channel based on the identifying.

Some examples of the method, apparatuses, and non-transitory computer-readable medium described herein may further include operations, features, means, or instructions for identifying resources of a physical uplink control channel based on a number of control channel elements and a starting control channel element index from a first control resource set corresponding to the first search space set or from a second control resource set corresponding to the second search space set based on identifying that the downlink control information corresponds to the combined physical downlink control channel candidate.

Some examples of the method, apparatuses, and non-transitory computer-readable medium described herein may further include operations, features, means, or instructions for identifying the resources of the physical uplink control channel based on the number of control channel elements and the starting control channel element index from either the first control resource set or the second control resource set based on a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof.

Some examples of the method, apparatuses, and non-transitory computer-readable medium described herein may further include operations, features, means, or instructions for identifying resources of a physical uplink control channel based on a number of control channel elements and a starting control channel element index from both a first control resource set corresponding to the first search space set and a second control resource set corresponding to the second search space set based on identifying that the downlink control information corresponds to the combined physical downlink control channel candidate.

Some examples of the method, apparatuses, and non-transitory computer-readable medium described herein may further include operations, features, means, or instructions for identifying that a first control resource set pool index of a first control resource set corresponding to the first search space set may be different from a second control resource set pool index of a second control resource set corresponding to the second search space set based on identifying that the downlink control information corresponds to the combined physical downlink control channel candidate.

Some examples of the method, apparatuses, and non-transitory computer-readable medium described herein may further include operations, features, means, or instructions for identifying a hybrid automatic repeat request acknowledgement codebook based on the first control resource set pool index or the second control resource set pool index based on identifying that the first control resource set pool index and the second control resource set pool index may be different.

Some examples of the method, apparatuses, and non-transitory computer-readable medium described herein may further include operations, features, means, or instructions for identifying a fixed control resource set pool index value of the first control resource set pool index and the second control resource set pool index, where the hybrid automatic repeat request acknowledgement codebook may be identified in accordance with the fixed control resource set pool index value.

Some examples of the method, apparatuses, and non-transitory computer-readable medium described herein may further include operations, features, means, or instructions for identifying a control resource set pool index value corresponding to a fixed value, a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof, where the hybrid automatic repeat request acknowledgement codebook may be identified in accordance with the control resource set pool index value.

Some examples of the method, apparatuses, and non-transitory computer-readable medium described herein may further include operations, features, means, or instructions for identifying a hybrid automatic repeat request acknowledgement codebook based on the first control resource set pool index and the second control resource set pool index based on identifying that the first control resource set pool index and the second control resource set pool index may be different.

Some examples of the method, apparatuses, and non-transitory computer-readable medium described herein may further include operations, features, means, or instructions for identifying a physical downlink scrambling sequence initialization value, a default beam for a physical downlink shared channel scheduled via the decoded downlink control information, a set of activated transmission configuration indicator states, or any combination thereof based on the first control resource set pool index or the second control resource set pool index.

Some examples of the method, apparatuses, and non-transitory computer-readable medium described herein may further include operations, features, means, or instructions for identifying a control resource set pool index value corresponding to a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof, where the physical downlink scrambling sequence initialization value, the default beam for a physical downlink shared channel scheduled via the decoded downlink control information, the set of activated transmission configuration indicator states, or any combination thereof may be identified based on the control resource set pool index value.

A method of wireless communications at a base station is described. The method may include transmitting downlink control information to a UE, where the downlink control information corresponds to a first physical downlink control channel candidate, a second physical downlink control channel candidate, or a combined physical downlink control channel candidate, identifying that the transmitted downlink control channel candidate corresponds to the combined physical downlink control channel candidate based on the transmitting, and communicating with the UE based on identifying that the downlink control information corresponds to the combined physical downlink control channel candidate.

An apparatus for wireless communications at a base station is described. The apparatus may include a processor, memory coupled with the processor, and instructions stored in the memory. The instructions may be executable by the processor to cause the apparatus to transmit downlink control information to a UE, where the downlink control information corresponds to a first physical downlink control channel candidate, a second physical downlink control channel candidate, or a combined physical downlink control channel candidate, identify that the transmitted downlink control channel candidate corresponds to the combined physical downlink control channel candidate based on the transmitting, and communicate with the UE based on identifying that the downlink control information corresponds to the combined physical downlink control channel candidate.

Another apparatus for wireless communications at a base station is described. The apparatus may include means for transmitting downlink control information to a UE, where the downlink control information corresponds to a first physical downlink control channel candidate, a second physical downlink control channel candidate, or a combined physical downlink control channel candidate, identifying that the transmitted downlink control channel candidate corresponds to the combined physical downlink control channel candidate based on the transmitting, and communicating with the UE based on identifying that the downlink control information corresponds to the combined physical downlink control channel candidate.

A non-transitory computer-readable medium storing code for wireless communications at a base station is described. The code may include instructions executable by a processor to transmit downlink control information to a UE, where the downlink control information corresponds to a first physical downlink control channel candidate, a second physical downlink control channel candidate, or a combined physical downlink control channel candidate, identify that the transmitted downlink control channel candidate corresponds to the combined physical downlink control channel candidate based on the transmitting, and communicate with the UE based on identifying that the downlink control information corresponds to the combined physical downlink control channel candidate.

Some examples of the method, apparatuses, and non-transitory computer-readable medium described herein may further include operations, features, means, or instructions for including an indication in the downlink control information that indicates that the transmitted physical downlink control channel corresponds to the combined physical downlink control channel candidate.

In some examples of the method, apparatuses, and non-transitory computer-readable medium described herein, the indication includes a bit indicating that the transmitted downlink control information corresponds to the combined physical downlink control channel candidate.

Some examples of the method, apparatuses, and non-transitory computer-readable medium described herein may further include operations, features, means, or instructions for the downlink control information corresponding to the first physical downlink control channel candidate in a first search space set, the second physical downlink control channel candidate in a second search space set, and the combined physical downlink control channel candidate in the first search space set and the second search space set.

In some examples of the method, apparatuses, and non-transitory computer-readable medium described herein, including the indication may include operations, features, means, or instructions for scrambling a cyclic redundancy check of the downlink control information with a radio network temporary identifier indicating that the transmitted downlink control information corresponds to the combined physical downlink control channel candidate.

Some examples of the method, apparatuses, and non-transitory computer-readable medium described herein may further include operations, features, means, or instructions for scrambling the downlink control information using at least a scrambling identifier that indicates that the transmitted physical downlink control channel candidate may be the combined physical downlink control channel candidate.

In some examples of the method, apparatuses, and non-transitory computer-readable medium described herein, scrambling the downlink control information further may include operations, features, means, or instructions for scrambling a demodulation reference signal and coded bits of the downlink control information using the scrambling identifier that indicates that the transmitted physical downlink control channel candidate may be the combined physical downlink control channel candidate.

Some examples of the method, apparatuses, and non-transitory computer-readable medium described herein may further include operations, features, means, or instructions for identifying a starting location of a physical downlink shared channel corresponding to the transmitted physical downlink control channel candidate based on identifying that the transmitted physical downlink control channel candidate may be the combined physical downlink control channel candidate, and transmitting the physical downlink shared channel in accordance with the identified starting location.

In some examples of the method, apparatuses, and non-transitory computer-readable medium described herein, identifying the starting location may include operations, features, means, or instructions for identifying that the starting location may be during or after a first symbol of a later search space set of the first search space set and the second search space set.

Some examples of the method, apparatuses, and non-transitory computer-readable medium described herein may further include operations, features, means, or instructions for identifying that the starting location may be during or after a first symbol of an earlier search space set of the first search space set and the second search space set, during or after a first symbol of the first search space set or the second search space set with a smallest index, or during or after a first symbol of a first control resource set and a second control resource set with a smallest identifier.

Some examples of the method, apparatuses, and non-transitory computer-readable medium described herein may further include operations, features, means, or instructions for identifying an offset number of slots relative to the reference slot, and transmitting an identification of the offset number of slots in the downlink control information, where the physical downlink shared channel may be transmitted based on the reference slot and the offset number of slots.

Some examples of the method, apparatuses, and non-transitory computer-readable medium described herein may further include operations, features, means, or instructions for identifying a reference symbol for identifying a starting location of a physical downlink shared channel based on identifying that the transmitted downlink control information corresponds to the combined physical downlink control channel candidate.

Some examples of the method, apparatuses, and non-transitory computer-readable medium described herein may further include operations, features, means, or instructions for identifying a first symbol among a later of the first search space set and the second search space set.

Some examples of the method, apparatuses, and non-transitory computer-readable medium described herein may further include operations, features, means, or instructions for identifying a first symbol among an earlier of the first search space set and the second search space set, a first symbol of the first search space set or the second search space set with a smallest index, or a first symbol of a first control resource set and a second control resource set with a smallest identifier.

Some examples of the method, apparatuses, and non-transitory computer-readable medium described herein may further include operations, features, means, or instructions for identifying a downlink control information format for the transmitted downlink control information, where identifying the reference symbol may be based on identifying the downlink control information format.

Some examples of the method, apparatuses, and non-transitory computer-readable medium described herein may further include operations, features, means, or instructions for identifying the starting location of the physical downlink shared channel based on the reference symbol, and transmitting the physical downlink shared channel based on the identified starting location.

Some examples of the method, apparatuses, and non-transitory computer-readable medium described herein may further include operations, features, means, or instructions for identifying a reference slot in accordance with a later slot of the first search space set and the second search space set based on identifying that the transmitted downlink control information corresponds to the combined physical downlink control channel candidate, and identifying a starting location of a physical downlink shared channel based on the reference slot, where the transmitted downlink control information indicates the starting location using a value of a resource allocation field included in the downlink control information.

Some examples of the method, apparatuses, and non-transitory computer-readable medium described herein may further include operations, features, means, or instructions for identifying a reference slot in accordance with a later slot of the first search space set and the second search space set based on identifying that the transmitted downlink control information corresponds to the combined physical downlink control channel candidate, and identifying a starting location of a physical uplink shared channel based on the reference slot, where the transmitted downlink control information indicates the starting location using a value of a resource allocation field included in the downlink control information.

Some examples of the method, apparatuses, and non-transitory computer-readable medium described herein may further include operations, features, means, or instructions for identifying a number of slots relative to the reference slot, where the value of the resource allocation field indicates the number of slots.

Some examples of the method, apparatuses, and non-transitory computer-readable medium described herein may further include operations, features, means, or instructions for rating matching resources of a physical downlink shared channel scheduled by the downlink control information around resources in the first search space set and the second search space set corresponding to the downlink control information based on identifying that the transmitted downlink control information corresponds to the combined physical downlink control channel candidate.

Some examples of the method, apparatuses, and non-transitory computer-readable medium described herein may further include operations, features, means, or instructions for transmitting a precoder granularity of a control resource set associated with the first search space set or the second search space set, and rate matching resources of the physical downlinks shared channel with resources of one or more demodulation reference signals based on the precoder granularity.

In some examples of the method, apparatuses, and non-transitory computer-readable medium described herein, the one or more demodulation reference signals correspond to resource element groups of the control resource set when the precoder granularity indicates contiguous resource blocks of the control resource set.

In some examples of the method, apparatuses, and non-transitory computer-readable medium described herein, the one or more demodulation reference signals correspond to resource element groups of the combined physical downlink control channel candidate when the precoder granularity does not indicate contiguous resource blocks of the control resource set.

Some examples of the method, apparatuses, and non-transitory computer-readable medium described herein may further include operations, features, means, or instructions for transmitting the downlink control information without a transmission configuration indicator state field indicating a transmission configuration indicator state of a physical downlink shared channel scheduled by the downlink control information; and that the transmitted downlink control information does not include a transmission configuration indicator state, and identifying whether a first control resource set corresponding to the first search space set may be a same control resource set as a second control resource set corresponding to the second search space set based on identifying that the transmitted downlink control information corresponds to the combined physical downlink control channel candidate and transmitting the downlink control information without the transmission configuration indicator state field.

Some examples of the method, apparatuses, and non-transitory computer-readable medium described herein may further include operations, features, means, or instructions for identifying the transmission configuration indicator state, a quasi-co-location, or both for the scheduled physical downlink shared channel in accordance with the first control resource set or the second control resource set that corresponds to a combined physical downlink shared channel candidate based on identifying that the first control resource set corresponds to the second control resource set.

Some examples of the method, apparatuses, and non-transitory computer-readable medium described herein may further include operations, features, means, or instructions for receiving, from the UE, an indication of the UE capability, and determining whether an offset between the transmitted downlink control information and a corresponding physical downlink shared channel may be greater than or equal to a UE capability threshold corresponding to the UE capability, where the transmission configuration indicator state, the quasi co-location or both may be identified based on determining that the offset may be greater than the UE capability threshold.

Some examples of the method, apparatuses, and non-transitory computer-readable medium described herein may further include operations, features, means, or instructions for identifying the transmission configuration indicator state, a quasi-co-location, or both for the scheduled physical downlink shared channel in accordance with the first control resource set or the second control resource set based on identifying that the first control resource set may be different from the second control resource set.

Some examples of the method, apparatuses, and non-transitory computer-readable medium described herein may further include operations, features, means, or instructions for identifying the transmission configuration indicator state, the quasi co-location, or both for the scheduled physical downlink shared channel in accordance with the first control resource set or the second control resource set based on a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof.

Some examples of the method, apparatuses, and non-transitory computer-readable medium described herein may further include operations, features, means, or instructions for identifying the transmission configuration indicator state, a quasi-co-location, or both for the scheduled physical downlink shared channel in accordance with the first control resource set and the second control resource set based on identifying that the first control resource set may be different from the second control resource set.

In some examples of the method, apparatuses, and non-transitory computer-readable medium described herein, the transmission configuration indicator state, the quasi co-location, or both correspond to a multi-state physical downlink shared channel based on the identifying.

Some examples of the method, apparatuses, and non-transitory computer-readable medium described herein may further include operations, features, means, or instructions for identifying resources of a physical uplink control channel based on a number of control channel elements and a starting control channel element index from a first control resource set corresponding to the first search space set or from a second control resource set corresponding to the second search space set based on identifying that the transmitted downlink control information corresponds to the combined physical downlink control channel candidate.

Some examples of the method, apparatuses, and non-transitory computer-readable medium described herein may further include operations, features, means, or instructions for identifying the resources of the physical uplink control channel based on the number of control channel elements and the starting control channel element index from either the first control resource set or the second control resource set based on a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof.

Some examples of the method, apparatuses, and non-transitory computer-readable medium described herein may further include operations, features, means, or instructions for receiving the physical uplink control channel in accordance with the identifying.

Some examples of the method, apparatuses, and non-transitory computer-readable medium described herein may further include operations, features, means, or instructions for identifying resources of a physical uplink control channel based on a number of control channel elements and a starting control channel element index from both a first control resource set corresponding to the first search space set and a second control resource set corresponding to the second search space set based on identifying that the transmitted downlink control information corresponds to the combined physical downlink control channel candidate.

Some examples of the method, apparatuses, and non-transitory computer-readable medium described herein may further include operations, features, means, or instructions for receiving the physical uplink control channel in accordance with the identifying.

Some examples of the method, apparatuses, and non-transitory computer-readable medium described herein may further include operations, features, means, or instructions for identifying that a first control resource set pool index of a first control resource set corresponding to the first search space set may be different from a second control resource set pool index of a second control resource set corresponding to the second search space set based on identifying that the transmitted downlink control information corresponds to the combined physical downlink control channel candidate.

Some examples of the method, apparatuses, and non-transitory computer-readable medium described herein may further include operations, features, means, or instructions for identifying a hybrid automatic repeat request acknowledgement codebook based on the first control resource set pool index or the second control resource set pool index based on identifying that the first control resource set pool index and the second control resource set pool index may be different.

Some examples of the method, apparatuses, and non-transitory computer-readable medium described herein may further include operations, features, means, or instructions for identifying a fixed control resource set pool index value of the first control resource set pool index and the second control resource set pool index, where the hybrid automatic repeat request acknowledgement codebook may be identified in accordance with the fixed control resource set pool index value.

Some examples of the method, apparatuses, and non-transitory computer-readable medium described herein may further include operations, features, means, or instructions for identifying a control resource set pool index value corresponding to a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof, where the hybrid automatic repeat request acknowledgement codebook may be identified in accordance with the control resource set pool index value.

Some examples of the method, apparatuses, and non-transitory computer-readable medium described herein may further include operations, features, means, or instructions for identifying a hybrid automatic repeat request acknowledgement codebook based on the first control resource set pool index and the second control resource set pool index based on identifying that the first control resource set pool index and the second control resource set pool index may be different.

Some examples of the method, apparatuses, and non-transitory computer-readable medium described herein may further include operations, features, means, or instructions for identifying a physical downlink scrambling sequence initialization value, a default beam for a physical downlink shared channel scheduled via the transmitted downlink control information, a set of activated transmission configuration indicator states, or any combination thereof based on the first control resource set pool index or the second control resource set pool index.

Some examples of the method, apparatuses, and non-transitory computer-readable medium described herein may further include operations, features, means, or instructions for identifying a control resource set pool index value corresponding to a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof, where the physical downlink scrambling sequence initialization value, the default beam for a physical downlink shared channel scheduled via the transmitted downlink control information, the set of activate transmission configuration indicator states, or any combination thereof may be identified based on the control resource set pool index value.

DETAILED DESCRIPTION

Figure 1:
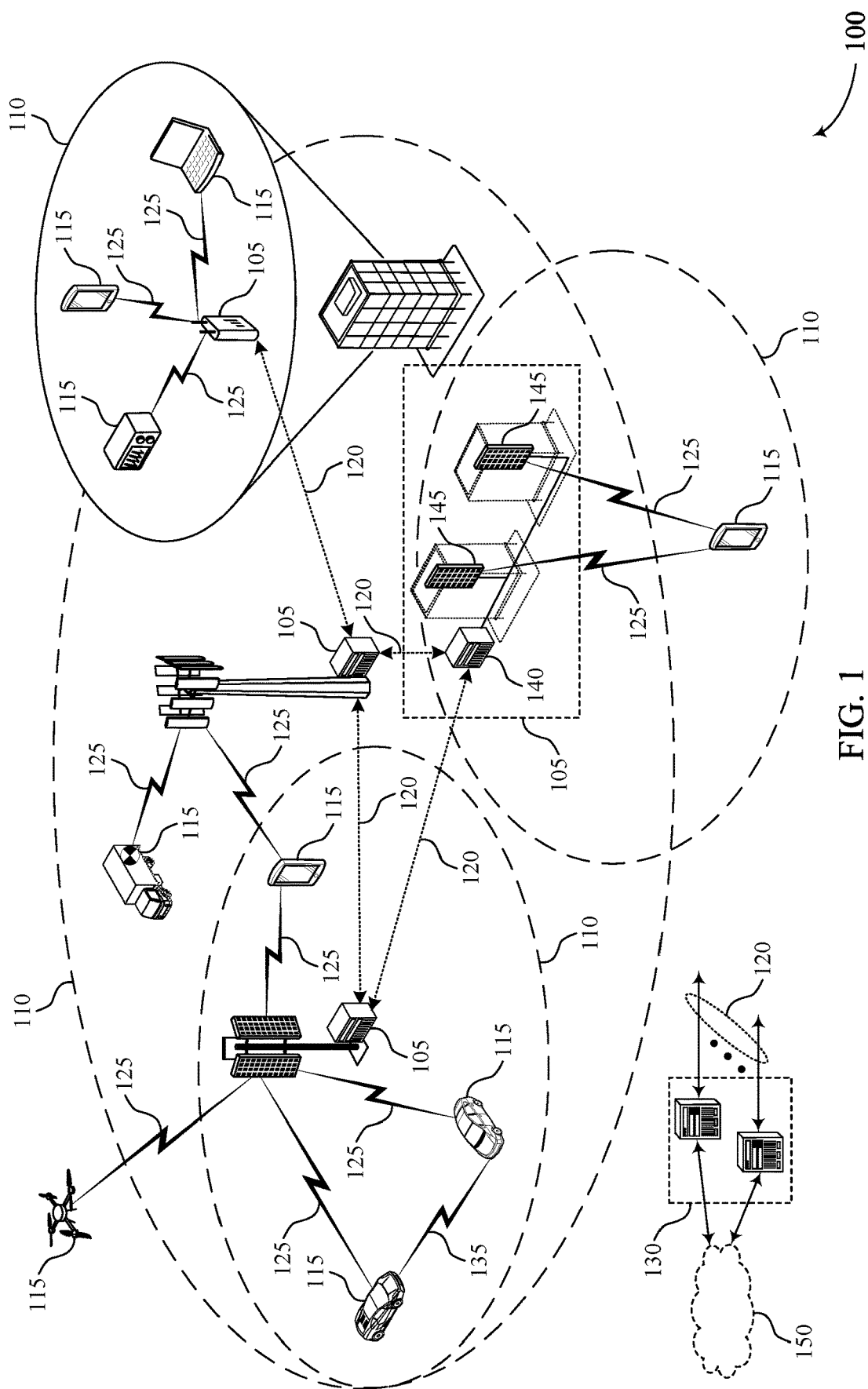
FIG. 1 illustrates an example of a system for wireless communications that supports decoding downlink control information in a combined physical downlink control channel (PDCCH) candidate in accordance with aspects of the present disclosure.

Wireless communications systems may include multiple communication devices such as user equipment (UEs) and base stations, which may provide wireless communication services to the UEs. For example, such base stations may be next-generation NodeBs or giga-NodeBs (either of which may be referred to as a gNB) that may support multiple radio access technologies including fourth generation (4G) systems, such as Long Term Evolution (LTE) systems, as well as fifth generation (5G) systems, which may be referred to as New Radio (NR) systems. The described techniques may be used by UEs and base stations to support a combined physical downlink control channel (PDCCH) candidate, which may relate to multiple search space sets or the same search space set.

For example, a UE may combine a PDCCH candidate corresponding to a search space set and another PDCCH candidate corresponding to another search space set (or the same search space set) to form a combined PDCCH candidate. The described techniques may be used to determine when DCI decoded from the search space sets corresponds to the combined PDCCH candidate. For example, the UE or base station (or both) may identify that DCI corresponds to the combined PDCCH candidate based on identifying the combined PDCCH candidate from a first and second search space set (e.g., a default to determination. In other examples, the UE or base station (or both) may identify that DCI corresponds to the combined PDCCH candidate based on indications included in the DCI, such as a bit indicator, a radio network temporary identifier (RNTI) (e.g., that scrambles a portion of the DCI, one or more demodulation reference signals (DMRSs), or both), or a scrambling identifier for the PDCCH.

In some examples, based on identifying that the DCI corresponds to the combined PDCCH candidate, other channel characteristics, such as PDSCH, PUSCH, and PUCCH scheduling information may be determined. For example, a reference symbol or a slot for determining offsets between the decoded DCI and another channel (e.g., PDSCH, PUSCH, or PUCCH) may be identified based on resources of the search space set including the PDCCH candidates. In some cases, the first symbol in the later search space set may be used as a reference symbol for the PDSCH. In other examples, the latest slot in the later search space set may be used for a reference slot for the PDSCH or PUSCH. Other signal characteristics such as rate-matching of the PUSCH, TCI states, PUCCH resources, HARQ feedback codebooks, etc. may be determined based on the search space set, control resources sets (CORESETs) corresponding to the search space sets, and other characteristics of the combined PDCCH candidates. As such, the UEs may provide extended flexibility for control information and improvements to the reliability of PDCCH in 5G systems. The described techniques may include features for improvements to power consumption and, in some examples, may promote enhanced efficiency for high reliability and low latency operations in 5G systems, among other benefits.

Aspects of the disclosure are initially described in the context of wireless communications systems. Aspects of the disclosure are further described with respect to various resource diagrams and a process flow diagram. Aspects of the disclosure are further illustrated by and described with reference to apparatus diagrams, system diagrams, and flowcharts that relate to decoding downlink control information in a combined PDCCH candidate.

FIG. 1 illustrates an example of a wireless communications system 100 that supports decoding downlink control information in a combined PDCCH candidate in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may be configured with multiple search space sets for a downlink channel (e.g., a PDCCH). The UE 115 may identify PDCCH candidates in the multiple search space sets and decode a received DCI and determine whether the decoded DCI corresponds to one of the PDCCH candidates from one of the multiple search space sets or from a combined PDCCH candidate corresponding to the multiple search space sets or combined PDCCH candidates corresponding to a single search space set. The UE 115 may identify that the decoded DCI corresponds to the combined PDCCH candidate based on an indication included in the DCI (e.g., a bit or a RNTI) or a scrambling identifier for the DCI, etc. In some cases, the UE 115 may identify that the decoded DCI corresponds to the combined PDCCH candidate based on being configured with a combined PDCCH candidate (e.g., RRC configured by the base station 105).

In accordance with identifying that the decoded DCI corresponds to a combined PDCCH candidate, the UE 115 may identify other channel characteristics, such as physical downlink shared channel (PDSCH), physical uplink shared channel (PUSCH), and physical uplink control channel (PUCCH) scheduling information, rate-matching information, HARQ feedback codebook information, etc. In some cases, such information may be identified based on resources associated with the search space sets, CORESETs, or a combination thereof. Accordingly, the described techniques may be used to support repetition of PDCCH information by a base station 105, such that the UE 115 may receive such information and determine various other communication aspects based on the received PDCCH information.

Figure 2:
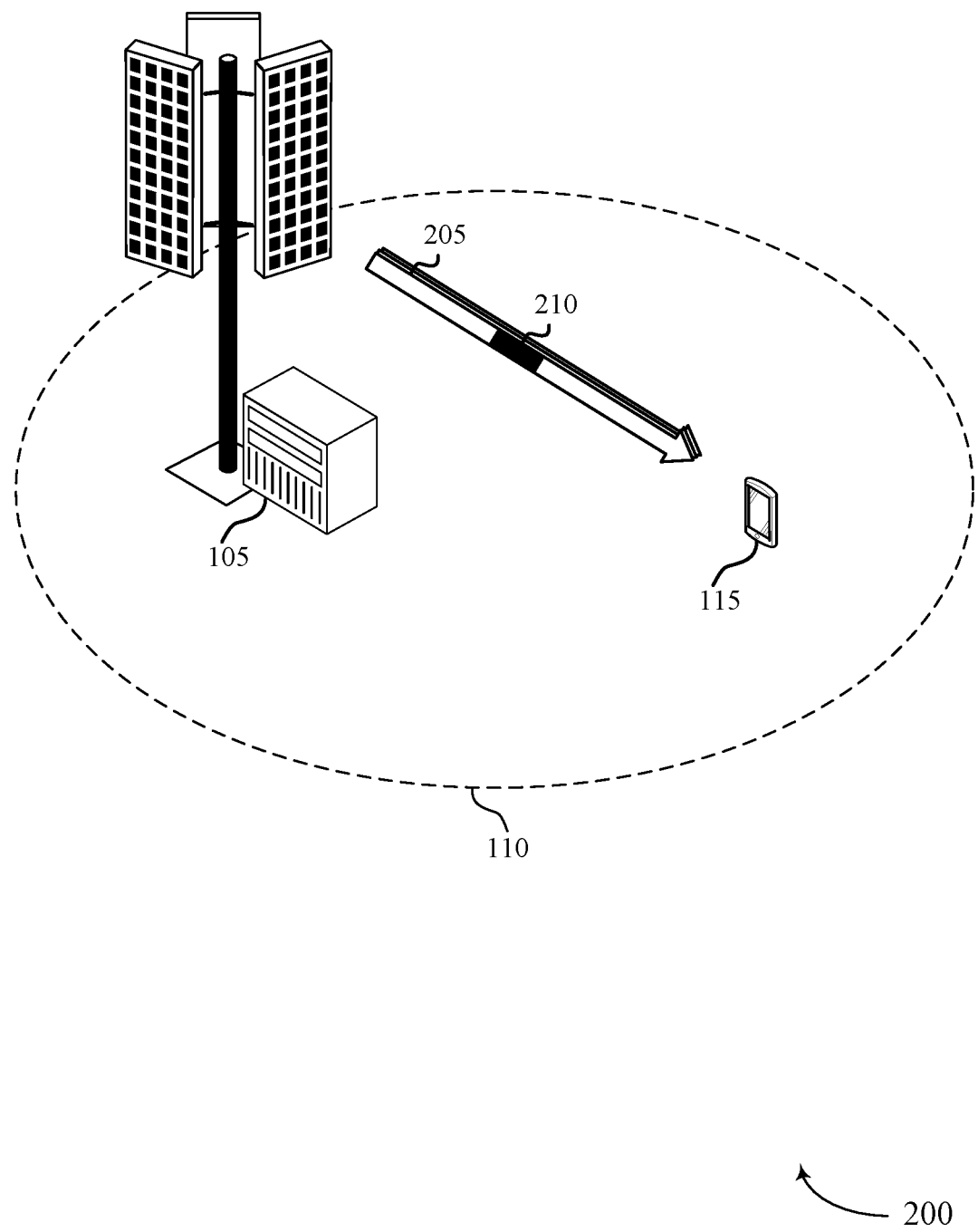
FIG. 2 illustrates an example of a wireless communications system that supports decoding downlink control information in a combined PDCCH candidate in accordance with aspects of the present disclosure.

FIG. 2 illustrates an example of a wireless communications system 200 that supports decoding downlink control information in a combined PDCCH candidate in accordance with aspects of the present disclosure. For example, the wireless communications system 200 may include a base station 105 and a UE 115 within a geographic coverage area 110. The base station 105 and the UE 115 may be examples of the corresponding devices described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may support improvements to power consumption, spectral efficiency, higher data rates and, in some examples, may promote enhanced efficiency for high reliability and low latency search space operations, among other benefits.

The base station 105 may configure the UE 115 by transmitting a configuration message 210 via one or more directional beams 205 (e.g., downlink directional beams). In some examples, the base station 105 may transmit the configuration message 210 on a downlink channel (e.g., a PDCCH) via the one or more directional beams 205. The configuration message 210 may include a configuration of one or more multiple search space sets. For example, the configuration may define a search space set for a downlink control channel (e.g., a PDCCH). In some examples, the configuration may be semi-static configuration. The base station 105 may provide the semi-static configuration to the UE 115 via RRC signaling. In other examples, the base station 105 may provide the configuration of the one or more multiple search space sets via downlink control signaling.

A search space set may include a common search space set configured for multiple UEs or a specific search space set configured for a specific UE (e.g., for the UE 115). The UE 115 may monitor one or more control regions of a search space set to receive, from the base station 105, and decode control information or data, or both on a physical channel (e.g., a PDCCH, a PDSCH). A control region (for example, a control resource set) for a physical channel may be defined by a number of symbol durations, a number of minislot durations, or a number of slot durations. One or more control regions (e.g., one or more control resource sets) may be configured for multiple UEs. For example, multiple UEs may monitor or search control regions for control information according to one or more search space sets, and each search space set may include one or multiple control channel candidates (e.g., also referred to as PDCCH candidates) in one or more aggregation levels. An aggregation level for a PDCCH candidate may refer to a number of control channel resources (for example, CCEs).

In some examples, such as in 5G systems, the base station 105 may configure the UE 115 with one or multiple PDCCH candidates in a search space set. The UE 115 may, in some examples, experience a decrease in efficiency of blind decoding of the one or multiple PDCCH candidates in the search space set. That is, some of the one or multiple PDCCH candidates in the search space may not be useful to the UE 115 due to communication operations by the base station 105, and therefore decrease the efficiency of blind decoding by the UE 115. The communication operations may include control information or data, or both associated with various information channels (for example, control channels, data channels). Control channels may include a PDCCH, a physical control channel may include physical uplink control channel (PUCCH), among other examples. Data channels may include a PDSCH, a physical uplink shared channel (PUSCH), among other examples.

The wireless communications system 200 may, in some cases, support repetition of various physical channels, such as PDSCH to improve reliability of various types of communication. The wireless communications system 200 may also support repetition of other physical channels, such as PDCCH to further improve the reliability of the various types of communication (e.g., control information, data) in the wireless communications system 200. For example, by supporting PDCCH repetition, the UE 115 may experience an increase in efficiency of blind decoding of one or multiple PDCCH candidates in one or multiple search space sets. In some examples, the base station 105 may configure the UE 115 to support one or multiple PDCCH candidates between multiple (e.g., two or more) search space sets. For example, the UE 115 may be configured to determine and combine different PDCCH candidates between one or multiple search space sets, and perform blind decoding of a combined PDCCH candidate. In some examples, the UE 115 may be configured to decode the combined PDCCH candidate in addition to individual PDCCH candidates, thereby providing increased flexibility for control information and improving the reliability of PDCCH.

The UE 115 may decode downlink control information from individual PDCCH candidates, combined PDCCH candidates, or both. In some cases, the UE 115 may be able to identify when decoded DCI corresponds to an individual PDCCH candidate or a combined PDCCH candidate. That is, relying only on the decoding result may be unreliable in determining whether decoded DCI corresponds to an individual or combined PDCCH candidate. If $(x_1, x_2, x_{1,2})$ is the decoding result at the UE, and $x_1 \in \{0, 1\}$ is the decoding result corresponding to PDCCH candidate $m_{s_1}^{(L)}$ (in search space set (SSS) $s_1$ with AL L), $x_2 \in \{0, 1\}$ is the decoding result corresponding to PDCCH candidate $m_{s_2}^{(L')}$ (in SSS $s_2$ with AL L'), $x_{1,2} \in \{0, 1\}$ is the decoding result corresponding to the combined PDCCH candidate $m_{s_1}^{(L)}$ and $m_{s_2}^{(L')}$, the gNB (e.g., base station 105) sends the DCI only in $m_{s_1}^{(L)}$, the UE 115 might detect (1, 0, 0) or (1, 0, 1). If gNB sends the DCI only in $m_{s_2}^{(L')}$, the UE 115 might detect (0, 1, 0) or (0, 1, 1). If gNB sends the DCI only in both $m_{s_1}^{(L)}$ and $m_{s_2}^{(L')}$, the UE 115 might detect (1,1,1), (0, 0, 1), (1, 0, 1), (0, 1, 1), (1, 0, 0), or (0, 1, 0). As such, the UE 115 may be unable to reliably determine when the decoded DCI corresponds to an individual or combined PDCCH candidate.

The UE 115 may identify whether the decoded DCI corresponds to an individual or combined PDCCH candidate in order to identify scheduling information. For example, some scheduling information may be a function of the search space set or CORESET in which the DCI is detected. Such information may include restrictions on when the PDSCH time domain resource allocation can start for downlink (DL) DCI, reference for PDSCH SLIV for DCI format 1_2, K0 value and scheduling offset (for a timeDurationForQCL parameter value) for DL DCI, K2 value and N2 timeline for PUSCH for uplink (DCI), rate matching around the scheduling DCI for DL DCI, transmission configuration indicator (TCI) state of PDSCH when the TCI field is not included in the DCI, PUCCH resource determination for DL DCI, and a CORESETPoolIndex value (e.g., for HARQ-ACK reporting, PDSCH scrambling, default quasi-co-location (QCL) for PDSCH, and activated TCI state sets).

In some examples, the UE 115 may identify that the decoded DCI corresponds to a combined PDCCH candidate when the UE 115 is configured with the combined PDCCH candidate. More particularly, the UE 115 may assume that if the DCI is transmitted in one of $m_{s_1}^{(L)}$ or $m_{s_2}^{(L')}$ then the same DCI is transmitted in the other of $m_{s_1}^{(L)}$ or $m_{s_2}^{(L')}$. In such cases, the UE 115 may perform blind decoding on the three (or more) PDCCH candidates for robustness, but the UE 115 may assume that any detected DCI corresponds to the combined PDCCH candidate. If the UE 115 is not configured with the combined PDCCH candidate, then the UE 115 may identify that a decoded DCI corresponds to the PDCCH candidate where the DCI is decoded.

In other examples, the UE 115 may determine whether the decoded DCI corresponds to a combined PDCCH candidate based at least in part on an indicator included in the decoded DCI. In one example, a bit in included in the DCI may indicate that the DCI corresponds to the combined PDCCH candidate if the bit has a first value (e.g., 1), and the bit may indicate that the DCI corresponds to an individual PDCCH candidate if the bit has a second value (e.g., 0). For example, if the UE detects (1, 0, 0), as set forth above, and the indicated bit is 1, then the UE 115 may assume that the DCI corresponds to the combined PDCCH candidate. If the UE detects (1, 0, 1) and the indicated bit is 0, then the UE 115 may assume that the decoded DCI does not correspond to the combined PDCCH candidate.

In some cases, the indicator included in the DCI may be a RNTI that is used for cyclic redundancy check (CRC) scrambling. For example, the UE 115 may descramble the DCI with an RNTI, which has a value indicating that the decoded DCI corresponds to the combined PDCCH candidate. Another value of the RNTI may function as an indication that the DCI does not correspond to the combined PDCCH candidate. For example, if the UE 115 detects (1, 0, 0) and the RNTI of the decoded DCI is the combined PDCCH candidate RNTI, then the UE 115 assumes that the decoded DCI corresponds to the combined PDCCH candidate. If the UE 115 detects (1, 0, 1) and the RNTI of the decoded DCI is not the combined PDCCH candidate RNTI, then the UE 115 assumes that the decoded DCI does not correspond to the combined PDCCH candidate.

In some cases, a PDCCH DMRS scrambling identifier may indicate whether the decoded DCI corresponds to the combined PDCCH candidate. The PDCCH scrambling identifier (e.g., pdcch-DMRS-ScramblingID) may be used for PDCCH scrambling (e.g., scrambling of coded bits of DCI and/or DMRS scrambling). If, for decoding a DCI, the UE uses the assumption that the scrambling identifier (identified based on descrambling) corresponds to the combined PDCCH candidate indicator, then the UE 115 may assume that the decoded DCI corresponds to the combined PDCCH candidate. If, for decoding the DCI, the UE uses the assumption that the scrambling identifier does not correspond to the combined PDCCH candidate indicator, then the UE 115 may assume that the decoded DCI does not correspond to the combined PDCCH candidate.

If the UE 115 identifies that the decoded DCI corresponds to the combined PDCCH candidate in accordance with one of the above described techniques, then the UE 115 may utilize the techniques described with respect to the following figures to identify various communication channel characteristics, such as scheduling information, rate-matching information, etc.

Figure 3:
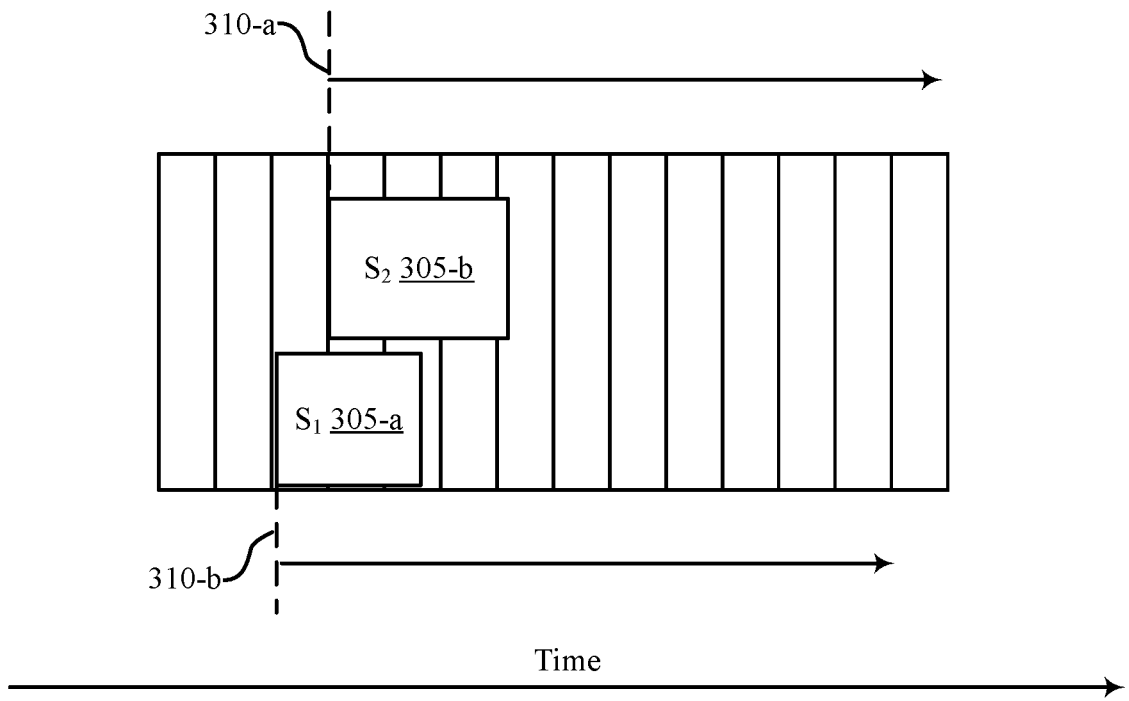
FIG. 3 illustrates an example of a resource diagram that supports decoding downlink control information in a combined PDCCH candidate in accordance with aspects of the present disclosure.

FIG. 3 illustrates an example of a resource diagram 300 that supports decoding downlink control information in a combined PDCCH candidate in accordance with aspects of the present disclosure. In some examples, resource diagram 300 may implement aspects of wireless communications system 100. A first search space set 305-*a* and a second search space set 305-*b* may be configured at a UE 115. The search space sets 305 may be positioned in the same or different slots of downlink resources. The UE 115 may perform blind decoding on various configured PDCCH candidates of the first search space set 305-*a* and the second search space set 305-*b*. The UE 115 may also be configured with a combined PDCCH candidate corresponding to both the first search space set 305-*a* and the second search space set 305-*b* or to either the first search space set 305-*a* or the second search space set 305-*b*, and the UE 115 may perform blind decoding on the combined PDCCH candidate to identify DCI.

Some restrictions of the starting location of a PDSCH scheduled by the decoded DCI may be exist for the UE 115 (e.g., and a base station 105) in accordance with various configurations. For example, the scheduled PDSCH may be restricted such that the PDSCH may not start earlier than the first symbol of the scheduling PDCCH. According to Rel. 15, the UE is not expected to receive a PDSCH with mapping type B in a slot, if the first symbol of the PDCCH scheduling the PDSCH was received in a later symbol than the first symbol indicated in the PDSCH time domain resource allocation.

In accordance with the blind decoding of the first search space set 305-*a* and the second search space set 305-*b*, the UE may decode a DCI. As described with respect to FIG. 2, the decoded DCI may correspond to an individual PDCCH candidate of one of the search space sets 305 or a combined PDCCH candidate corresponding to one or more of the search space sets 305. If the PDCCH corresponds to a combined PDCCH, then the UE 115 may identify which PDCCH candidate to use to determine the PDSCH restrictions. According to one option, the scheduled PDSCH may not be scheduled to start earlier than the later first symbol among the one or multiple search space sets (e.g., the first search space set 305-*a* and the second search space set 305-*b*). That is, the PDSCH may start during or after the later first symbol among the multiple search space sets. As illustrated in FIG. 3, the PDSCH may be scheduled to start after point 310, which corresponds to the first symbol of the later search space set 305-*b*.

According to another option, the scheduled PDSCH may not start earlier than the earlier first symbol among the one or multiple search space sets (e.g., the first search space set 305-*a* and the second search space set 305-*b*), earlier than the first symbol of the multiple search space sets with the smallest index, or earlier than the first symbol of the CORESETs with the smallest CORESET identifier among CORESETs i and j, which correspond to the first search space set 305-*a* and the second search space set 305-*b*, respectively. Thus, according to this option, the PDSCH may start during or after the symbol at 310-*b*. Using these options, the UE 115 and base station 105 may identify the scheduling restrictions for PDSCH when the DCI corresponds to a combined candidate.

Figure 4:
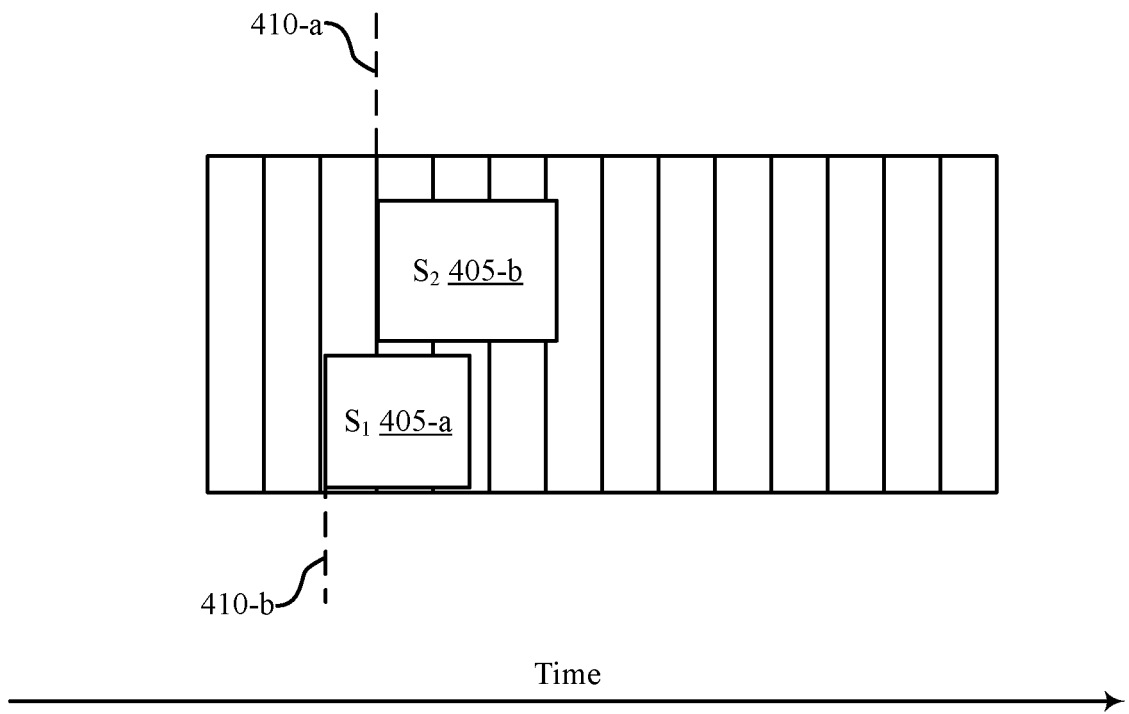
FIG. 4 illustrates an example of a resource diagram that supports decoding downlink control information in a combined PDCCH candidate in accordance with aspects of the present disclosure.

FIG. 4 illustrates an example of a resource diagram 400 that supports decoding downlink control information in a combined PDCCH candidate in accordance with aspects of the present disclosure. In some examples, resource diagram 400 may implement aspects of wireless communications system 100. A first search space set 405-*a* and a second search space set 405-*b* may be configured at a UE 115. The search space sets 405 may be positioned in the same or different slots of downlink resources. The UE 115 may perform blind decoding on various configured PDCCH candidates of the first search space set 405-*a* and the second search space set 405-*b*. The UE 115 may also be configured with a combined PDCCH candidate corresponding to one or both the first search space set 405-*a* and the second search space set 405-*b*.

Resource allocation of a PDSCH may depend on the starting symbol of the PDCCH monitoring occasion in which the downlink assignment is detected. That is, the starting symbol of the PDCCH monitoring occasion that schedules the PDSCH may function as a reference symbol for the start symbol and length parameter (SLIV) for the PDSCH. In some cases, the reference symbol may be enabled using radio resource control (RRC) signaling. When an RRC parameter enables the utilization of the new reference symbol, the new reference symbol may be applied for time domain resource allocation (TDRA) entries with K0=0.

In accordance with the blind decoding of the first search space set 405-*a* and the second search space set 405-*b*, the UE may decode a DCI. As described with respect to FIG. 2, the decoded DCI may correspond to an individual PDCCH candidate of one of the search space sets 405 or a combined PDCCH candidate corresponding to the search space sets 405. If it is identified that the PDCCH corresponds to a combined PDCCH candidate and the detected/decoded DCI is DCI format 1_2, then the UE 115 may identify the reference symbol for the SLIV and K0=0 for PDSCH. According to one option, the reference symbol for the SLIV may be identified as the first symbol among the later of the one or multiple search space sets (e.g., a first search space set 405-a and a second search space set 405-b). As illustrated in FIG. 4, the reference symbol for SLIV may be identified as symbol at location 410-a, since the symbol at location 410-a is the starting symbol of the later search space set (e.g., the second search space set 405-b).

In accordance with another option, the reference symbol for SLIV may be identified as the first symbol among the one or multiple search space sets (e.g., the first search space set 405-a and the second search space set 405-b), the first symbol of the multiple search space sets with the smallest index, or the first symbol of the CORESETs with the smallest CORESET identifier among CORESETs i and j, which correspond to the first search space set 405-a and the second search space set 405-b, respectively. Thus, according to this option, the reference symbol may be identified as symbol at location 410-b, because the symbol at location 410-b is the first symbol of the earlier search space set (e.g., the first search space set 405-a). Using these techniques, the UE 115 and base station 105 may identify reference symbol for SLIV for a scheduled PDSCH.

Figure 5:
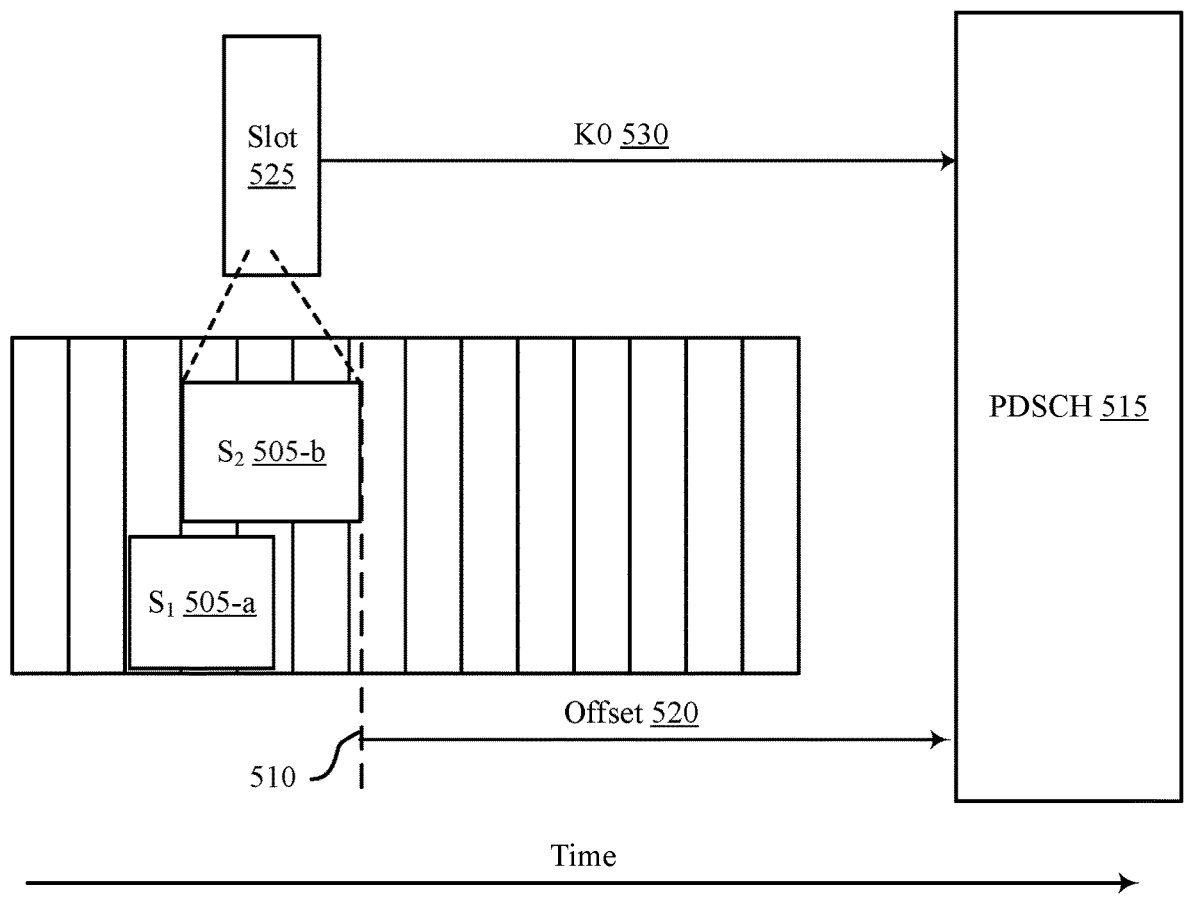
FIG. 5 illustrates an example of a resource diagram that supports decoding downlink control information in a combined PDCCH candidate in accordance with aspects of the present disclosure.

FIG. 5 illustrates an example of a resource diagram 500 that supports decoding downlink control information in a combined PDCCH candidate in accordance with aspects of the present disclosure. In some examples, resource diagram 500 may implement aspects of wireless communications system 100. A first search space set 505-a and a second search space set 505-b may be configured at a UE 115. The search space sets 505 may be positioned in the same or different slots of downlink resources. The UE 115 may perform blind decoding on various configured PDCCH candidates of the first search space set 505-a and the second search space set 505-b. The UE 115 may also be configured with a combined PDCCH candidate corresponding to one or both the first search space set 505-a and the second search space set 505-b.

According to some configurations, the slot/time where the DCI is received is used as a reference for scheduling a PDSCH 515. According to Rel. 15, the parameter K0 (which identifies a number of slots) may be indicated as part of the TDRA field of the DCI. The reference slot may be the slot where the DCI is detected (e.g., PDSCH slot is K0 slots after the slot where the DCI is received). If an offset between the reception of the downlink DCI and the corresponding PDSCH 515 is less than a timing threshold (e.g., timeDurationForQCL), then the receiving UE 115 may determine default settings for reception of the scheduled PDSCH 515. Otherwise, the UE may use a TCI state indicated by the DCI. The threshold may correspond to a UE capability in units of OFDM symbols. That is, the timing threshold may be based on a duration associated with UE radiofrequency (RF) tuning to receive the PDSCH according to an indicated TCI state (e.g., which may correspond to a receive beam).

In accordance with the blind decoding of the first search space set 505-a and the second search space set 505-b, the UE may decode a DCI. As described with respect to FIG. 2, the decoded DCI may correspond to an individual PDCCH candidate of one of the search space sets 505 or a combined PDCCH candidate corresponding to the search space sets 505. If the UE 115 determines that the PDCCH corresponds to a combined PDCCH candidate (in accordance with the techniques described with respect to FIG. 2), then the UE 115 may identify the reference slot 525 for the scheduling offset (e.g., K0 530) for PDSCH 515. In accordance with one option, a reference slot 525 (e.g., for K0 530) may be identified as a slot corresponding to the later in time search space set of multiple search space sets (e.g., the first search space set 505-a and the second search space set 505-b). According to FIG. 5, the reference slot for K0 530 may be identified in accordance with the second search space set 505-b, since the second search space set 505-b is later in time than the first search space set 505-a.

Further, for determining the offset 520 between the DL DCI and the corresponding PDSCH 515 (and comparing the offset to the threshold timeDurationForQCL) when the combined PDCCH candidate corresponds to the decoded DCI, the last symbol of the later search space set 505 may be used to determine the offset 520. As illustrated in FIG. 5, the reference symbol for determining the offset 520 is at location 510 (e.g., the last symbol of the later search space set 505-b). The UE 115 may compare the offset 520 to a threshold to determine the beam/QCL assumption of the PDSCH 515. That is, if the offset is less than the threshold corresponding to the UE capability, then the UE may utilize default settings (e.g., a default beam/QCL assumption). If the offset 520 is greater than the threshold, then the UE 115 may utilize the TCI state indicated by the DCI.

Figure 6:
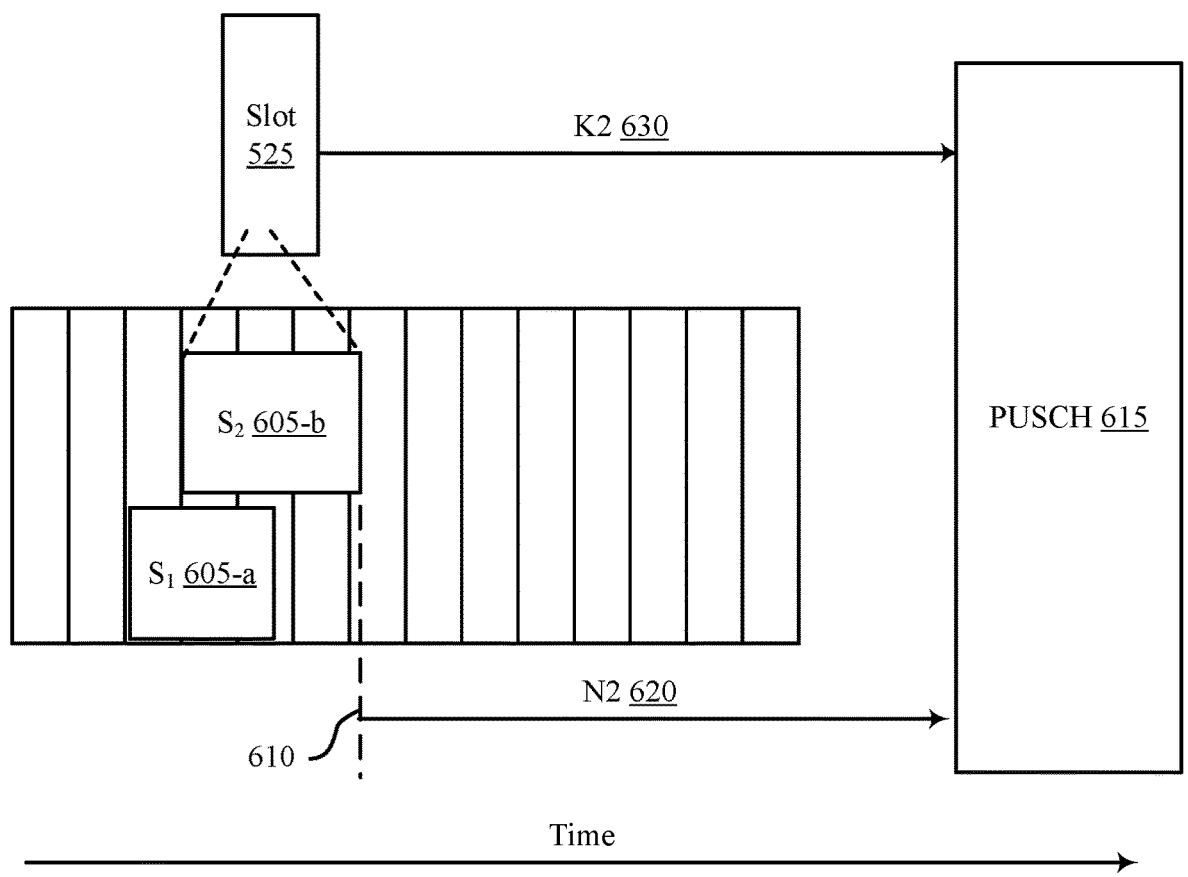
FIG. 6 illustrates an example of a resource diagram that supports decoding downlink control information in a combined PDCCH candidate in accordance with aspects of the present disclosure.

FIG. 6 illustrates an example of a resource diagram 600 that supports decoding downlink control information in a combined PDCCH candidate in accordance with aspects of the present disclosure. In some examples, resource diagram 600 may implement aspects of wireless communications system 100. A first search space set 605-a and a second search space set 605-b may be configured at a UE 115. The search space sets 605 may be positioned in the same or different slots of downlink resources. The UE 115 may perform blind decoding on various configured PDCCH candidates of the first search space set 605-a and the second search space set 605-b. The UE 115 may also be configured with a combined PDCCH candidate corresponding to one or both of the first search space set 605-a and the second search space set 605-b.

According to some configurations, the time/slot where the DCI is received for scheduling a PUSCH 615 may be used as a reference for determining the location of the PUSCH resources. A K2 value (indicating a number of slots) may be included as part of a TDRA field of DCI. The reference slot for the K2 value may be the slot where the DCI is detected. Accordingly, the slot for PUSCH may be K2 slots after the slot where DCI is received. Further, a value N2 (indicating a number of OFDM symbols) may be the UE processing time for preparing for PUSCH transmissions. The reference symbol for N2 may be the last symbol of PDCCH resources. A UE 115 may not expect the PUSCH to start before N2 symbols after the last symbol of the scheduling DCI. N2 may be determined from the UE capability signaling and may dependent on subcarrier spacing.

In accordance with the blind decoding of the first search space set 605-a and the second search space set 605-b, the UE may decode a DCI. As described with respect to FIG. 2, the decoded DCI may correspond to an individual PDCCH candidate of one of the search space sets 605 or a combined PDCCH candidate corresponding to the search space sets 605. If the UE 115 determines that the PDCCH corresponds to a combined PDCCH candidate (in accordance with the techniques described with respect to FIG. 2), then a reference slot for K2 may be identified as the slot corresponding to the later search space set among the one or multiple search space sets (e.g., the first search space set 605-a and the second search space set 605-b). The reference slot may be used to determine the slot for the PUSCH 615 (based on the K2 value). In accordance with FIG. 6, a reference slot 625 may be identified based on the slot corresponding to the later search space set 605-b. In accordance with K2 630 and the reference slot 625, the slot for the PUSCH 615 may be identified. Further, a reference symbol at location 610 may be identified as last symbol of the later search space set (e.g., the second search space set 605-b). Accordingly, the UE 115 may expect that the PUSCH does not start N2 620 symbols after the reference symbol at location 610.

Figure 7:
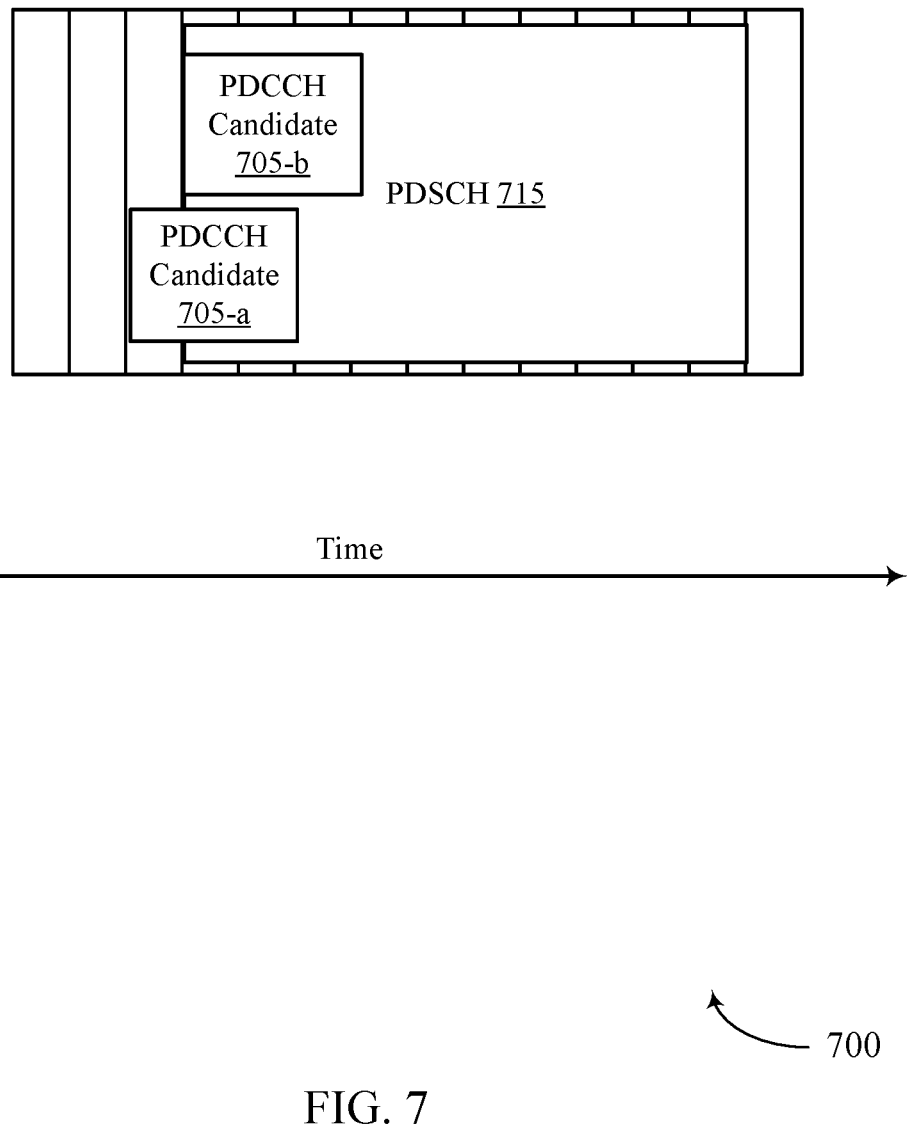
FIG. 7 illustrates an example of a resource diagram that supports decoding downlink control information in a combined PDCCH candidate in accordance with aspects of the present disclosure.

FIG. 7 illustrates an example of a resource diagram 700 that supports decoding downlink control information in a combined PDCCH candidate in accordance with aspects of the present disclosure. In some examples, resource diagram 700 may implement aspects of wireless communications system 100. Various PDCCH candidates 705 may be configured at a UE 115, and the UE 115 may perform blind decoding on the PDCCH candidates to identify DCI. In some cases, the UE 115 performs blind decoding on combined PDCCH candidates.

According to some configurations, a scheduled PDSCH 715 may be rate-matched around the scheduling PDCCH resources. According to Rel. 15, if a PDSCH scheduled by a PDCCH would overlap with resources in the CORESET containing the PDCCH, the resources corresponding to a union of the detected PDCCH that scheduled the PDSCH and associated PDCCH DMRS are not available for the PDSCH. When a precoder granularity (e.g., precoderGranularity) configured in a CORESET where the PDCCH was detected is equal to all contiguous resource blocks (e.g., allContiguousRBs), the associated PDCCH DMRS are identified as the DMRS in all resource element groups (REGs) of the CORESET. Otherwise, the associated DMRS are identified as the DMRS in REGs of the PDCCH.

In accordance with the blind decoding of PDCCH candidates 705, the UE 115 may decode a DCI. As described with respect to FIG. 2, the decoded DCI may correspond to an individual PDCCH candidate 705 or a combined PDCCH candidate 705. If the UE 115 determines that the decoded DCI corresponds to a combined PDCCH candidate 705 (in accordance with the techniques described with respect to FIG. 2) and the detected/decoded DCI schedules the PDSCH 715, then the PDSCH 715 may be rate-matched around the resources corresponding to a union of the detected PDCCH that schedule the PDSCH across both search space sets (corresponding to control channel elements (CCEs)/REGs in both $m_{s_1}^{(L)}$ and $m_{s_2}^{(L')}$ associated with the combined PDCCH) and the associated PDCCH DMRS. For wideband RS (precoderGranularity=allContiguousRBs is configured for CORESET i or CORESET j corresponding to the search space sets), the associated PDCCH DMRS may be the DMRS in all REGs of CORESET i or CORESET j. Otherwise, the associated DMRS are the DMRS in REGs of the PDCCH. In some cases, one CORESET corresponding to a search space set may be configured with wideband RS while the other CORESET may not be configured with wideband RS.

Figure 8:
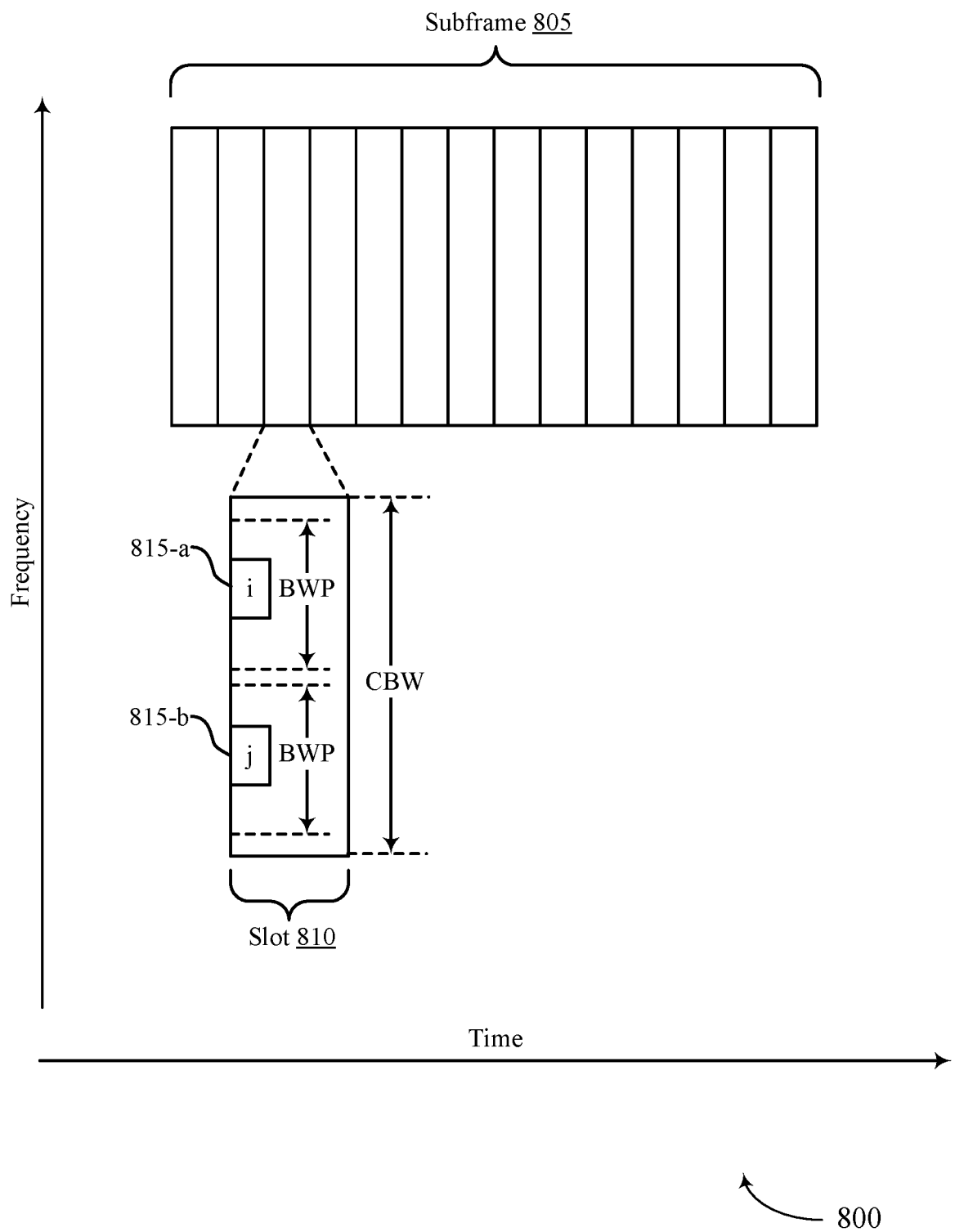
FIG. 8 illustrates an example of a resource diagram that supports decoding downlink control information in a combined PDCCH candidate in accordance with aspects of the present disclosure.

FIG. 8 illustrates an example of a resource diagram 800 that supports decoding downlink control information in a combined PDCCH candidate in accordance with aspects of the present disclosure. In some examples, resource diagram 800 may implement aspects of wireless communications system 100. The resource diagram 800 may include a subframe 805 with a set of slots including slot 810. The slot 810 may span a carrier bandwidth (CBW) in the frequency domain and may include multiple bandwidth parts (BWPs). In some cases, each BWP includes a CORESET 815. As illustrated in FIG. 8, a first BWP includes CORESET i 815-a, and a second BWP includes a CORESET j 815-b. Each CORESET 815 may correspond to a set of search space sets, which may be used for various scheduling determinations when a decoded DCI corresponds to a combined PDCCH candidate, as described with respect to FIGS. 2 through 7.

In some scenarios, a decoded DCI scheduling the PDSCH may not include a TCI field. For example, a TCI field may not be configured for a particular CORESET 815, or DCI format 1_0 is used and does not include a TCI field. In such cases, when a scheduling offset is larger than a particular threshold, then the TCI state/QCL assumption of the PDSCH may be determined from the TCI state/QCL assumption of the scheduling CORESET 815.

According to Rel. 15, if tci-PresentInDCI is not configured for the CORESET scheduling the PDSCH or the PDSCH is scheduled by a DCI format 1_0, and the time offset between the reception of the DL DCI and the corresponding PDSCH is equal to or greater than a threshold timeDurationForQCL, where the threshold is based on reported UE capability, for determining PDSCH antenna port quasi co-location, the UE 115 assumes that the TCI state or the QCL assumption for the PDSCH is identical to the TCI state or QCL assumption whichever is applied for the CORESET used for the PDCCH transmission.

When a UE 115 determines that a decoded DCI corresponds to a combined PDCCH candidate (according to the techniques described with respect to FIG. 2), the CORESET used for the PDCCH transmission may refer to multiple CORESETs 815 corresponding to the combined PDCCH candidate. More particularly, when a combined PDCCH candidate is detected across two CORESETs i 815-a and j 815-b (corresponding to one or multiple search space sets) and the DCI that schedules the PDSCH (e.g., PDSCH 715 of FIG. 7) does not include the TCI field, a UE 115 may determine whether the two CORESETs 815 are the same (e.g., whether i=j). If the CORESETs are the same (as illustrated in FIG. 8), then the same rule as Rel. 15 may apply (e.g., the TCI state of the CORESET i/j may be used). As such, the TCI state/QCL assumption is determined in accordance with CORSET i/j. If, however, CORESET i j (the CORESETs 815 are not the same), then, according to one option, the TCI state and/or QCL assumption of the PDSCH may be determined from the TCI state/QCL assumption of one of CORESETs i 815-a or j 815-b based on a CORESET selection rule. According to these rules, the TCI state/QCL assumption may be determined in accordance with the selected CORESET According to a first CORESET selection rule, the CORESET 815 with the lowest or highest CORESET ID may be used for determining TCI state and/or QCL assumption for the PDSCH. According to a second CORESET selection rule, the CORESET 815 corresponding to the search space set with the lowest or highest search space set ID may be used for determining the TCI state and/or QCL assumption. According to a third CORESET selection rule, the CORESET 815 corresponding to the search space set that starts or ends earlier or later in the time domain may be used for determining the TCI state and/or QCL assumption. Thus, the third CORESET selection rule may consider the resources of the search space sets including various PDCCH candidates. Any one of these rules or any combination of the rules may be used for CORSET selection.

In cases when a combined PDCCH candidate is detected across two CORESETs i 815-a and j 815-j (corresponding to multiple search space sets), the DCI that schedules the PDSCH does not include the TCI field, and CORESET i j, then both TCI states/QCL assumptions of CORESET i 815-*a* and j 815-*j* may be assumed for the PDSCH. That is, the PDSCH may be multi-TCI state with multiple SDM, FDM, and TDM schemes.

In some examples. a UE 115 determines PUCCH resources based on a downlink DCI. In Rel. 15, the DCI may include a PUCCH resource indicator (PRI) with three bits. The three bits may signal up to eight possibilities for PUCCH resources within a PUCCH resource set. However, the first PUCCH resource set (out of the four sets) can contain up to 32 PUCCH resources: In this case, PRI alone may not determine the PUCCH resource for HARQ-A transmission. Instead, the PUCCH resources may be a function of PRI, a number of control channel elements (CCEs) of the CORESET where the DCI is received, and an index of the first CCE of the DCI reception in the CORE-SET. The following formula may be used for determining the PUCCH resource set:

$$r_{PUCCH} = \begin{cases} \left\lfloor \frac{n_{CCE,p} \lceil R_{PUCCH}/8 \rceil}{N_{CCE,P}} \right\rfloor + \Delta_{PR1} \left\lceil \frac{R_{PUCCH}}{8} \right\rceil & \text{if } \Delta_{PR1} < R_{PUCCH} \bmod 8 \\ \left\lfloor \frac{n_{CCE,p} \lfloor R_{PUCCH}/8 \rfloor}{N_{CCE,P}} \right\rfloor + \Delta_{PR1} \left\lfloor \frac{R_{PUCCH}}{8} \right\rfloor + R_{PUCCH} \bmod 8 & \text{if } \Delta_{PR1} \geq R_{PUCCH} \bmod 8 \end{cases}$$

Thus, the PUCCH resources may be determined as a function of the PRI (e.g., $\Delta_{PRI}$), the number of CCEs of the CORESET where the DCI is received (e.g., $N_{CCE,P}$), and the index of the first CCE of the DCI reception in the CORESET (e.g., $n_{CCE,P}$).

When a combined PDCCH candidate is detected/identified (e.g., according to the techniques described with respect to FIG. 2) and the detected DCI schedules the PDSCH, then a UE 115 may identify the PUCCH resources according to various options. These options may be similar to those discussed with respect to the TCI state/QCL assumption determination. According to one option, the start CCE and number of CCEs for PUCCH determination may be identified according to a CORESET selected in accordance with a CORESET selection rule. According to a first CORESET selection rule, the CORESET 815 with the lowest or highest CORESET ID may be used for determining the start CCE and the number of CCEs for identifying PUCCH resources. According to a second CORESET selection rule, the CORE-SET 815 corresponding to the search space set with the lowest or highest search space set ID may be used for determining the start CCE and the number of CCEs for identifying PUCCH resources. According to a third CORE-SET selection rule, the CORESET 815 corresponding to the search space set that starts or ends earlier or later in the time domain may be used for determining the start CCE and the number of CCEs for identifying PUCCH resources. Thus, the third CORESET selection rule may consider the resources of the search space sets including various PDCCH candidates. Further, any one or any combination of these rules may be used.

According to another option, when a combined PDCCH candidate corresponds to the decoded DCI, the PUCCH resource determination may be a function of both start a CCE index and both numbers of CCEs corresponding to both CORESETs 815, in addition to the PRI value included in DCI. Thus, using these options, a UE 115 and base station 105 may identify PUCCH resources for HARQ-ACK transmission.

In some scenarios, according to Rel. 16, a pool index of a CORESET (e.g., CORESETPoolIndex) of 0 or 1 may be configured for each CORESET. These values may correspond to different modes for HARQ-ACK feedback (e.g., acknowledgement (ACK) or negative acknowledgement (NAK)). According to a separate HARQ-ACK mode, two HARQ-ACK codebooks may be sent on two different PUCCHs for ACK/NAK of PDSCHs that are scheduled with PDCCH detected in a CORESET with the first/second value of CORESETPoolIndex, respectively. That is, the HARQ-ACKs are separated based on which CORESET the scheduling DCI (scheduling PUSCH) is detected. These separate HARQ-ACK codebooks may be sent to separate TRPs. According to a joint HARQ-ACK mode, different positions in the HARQ-ACK codebook for ACK/NAK of PDSCHs that are scheduled with PDCCH detected in a CORESET with the first/second value of CORESETPoolIndex. Accordingly, dependent on whether a separate or joint mode is used for HARQ-ACK, the ACK/NAK may be a function of the CORESETPoolIndex of the CORESET scheduling the PDSCHs.

When a combined PDCCH candidate is detected/identified (e.g., according to the techniques described with respect to FIG. 2) across one or both of two CORESETs i 815-*a* and j 815-*b*, the two CORESETs have different values of CORE-SETPoolIndex, the detected DCI schedules the PDSCH, and a UE 115 is configured with a separate a HARQ-Ack or joint HARQ-Ack mode, then the CORESETPoolIndex may be identified corresponding to a selected CORESET based on a CORESET selection rule. This rule may be similar to the rules described above with PUCCH resource determination and TCI state/QCL assumption determination. According to a first option, one of the CORESETPoolIndex values (of one of the CORESETs 815) is considered for HARQ-Ack codebook determination and reporting, since one PDSCH is scheduled by the combined PDCCH candidate. According to a first rule, the CORESETPoolIndex may be selected according to a default value (e.g., value 0). According to a second rule, the CORESETPoolIndex corresponding to the lowest or highest CORESET identifier may be identified. According to a third rule, the CORESETPoolIndex of the CORESET corresponding to the lowest or highest search space set ID may be used. According to a fourth rule, the CORESETPoolIndex of a CORESET corresponding to a search space set that starts or ends earlier or later in the time domain may be used. According to another option, the two separate ACK/NAKs (with the same value) may be pre-sorted for the scheduled PDSCH based on the corresponding values of the CORESETPoolIndex. Any one of the rules or a combination of these rules may be used.

Further, according to Rel. 16, when different CORESETs have different values of CORESETPoolIndex, two different values for a PDSCH scrambling sequence initialization may be considered. The values for the PDSCH scrambling sequence initialization may be a function of the CORESET-PoolIndex of the CORESET in which the scheduling DCI is detected. When a UE 115 is capable of two simultaneous default beams (for receiving PDSCH when scheduling offset between scheduling PDCCH and scheduled PDSCH is less than timeDurationForQCL), the default beams for a PDSCH scheduled with a DCI may depend on the value of CORESETPoolIndex of the CORESET in which the DCI is sent. Further, there may be two sets of active TCI states corresponding to the two values of CORESETPoolIndex. The TCI field in the DCI indicates one TCI state for the PDSCH from the corresponding set. The utilized set may depend on the CORESETPoolIndex of the CORESET in which the DCI is sent.

When a combined PDCCH candidate is detected/identified (e.g., according to the techniques described with respect to FIG. 2) across one or both of two CORESETs i 815-a and j 815-b, the two CORESETs have different values of CORESETPoolIndex, and the detected DCI schedules the PDSCH, then various options may be used for identifying the CORESETPoolIndex value. These options may be similar to those options described above. with respect to HARQ-ACK determination. One of the different CORESETPoolIndex values may be considered, since the PDSCH is scheduled by the combined PDCCH candidate. According to a first rule, the CORESETPoolIndex value may be selected based on a default value (e.g., value 0). According to a second rule, the CORESETPoolIndex corresponding to the lowest or highest CORESET identifier may be identified. According to a third rule, the CORESETPoolIndex of the CORESET corresponding to the lowest or highest search space set ID may be used. According to a fourth rule, the CORESETPoolIndex of a CORESET corresponding to a search space set that starts or ends earlier or later in the time domain may be used. Thus, the CORESETPoolIndex selection rules may be used for determining HARQ-Ack codebook determination as well as for PDSCH scrambling sequence initialization, default beam identification, and active TCI states. Any one of the rules or any combination of these rules may be used.

Figure 9:
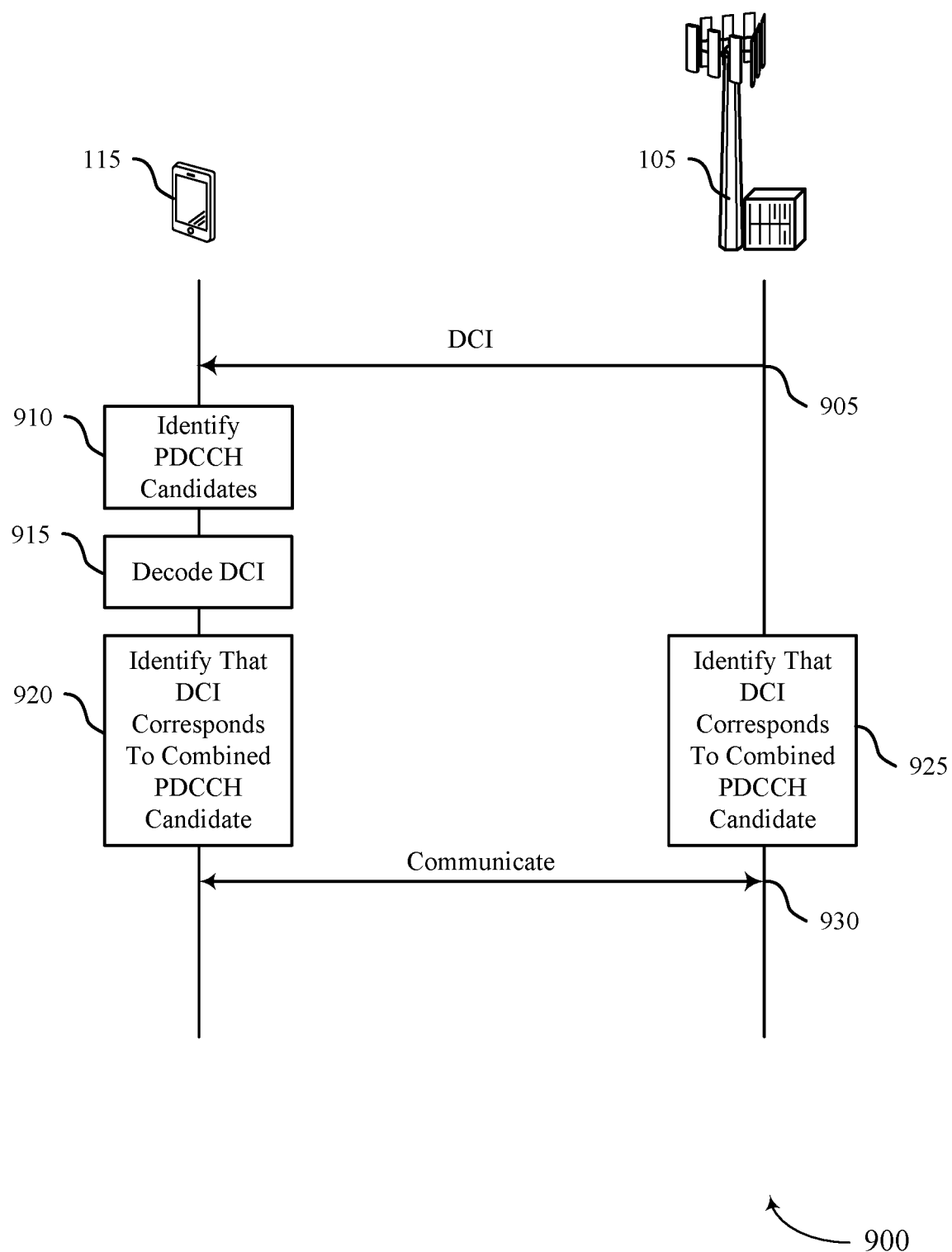
FIG. 9 illustrates an example of a process flow diagram that supports decoding downlink control information in a combined PDCCH candidate in accordance with aspects of the present disclosure.

FIG. 9 illustrates a process flow diagram 900 that supports decoding downlink control information in a combined PDCCH candidate in accordance with aspects of the present disclosure. In some examples, process flow diagram 900 may implement aspects of wireless communications system 100. The process flow diagram 900 includes a base station 105 and a UE 115, which may be examples of the corresponding devices as described with respect to FIGS. 1 through 8.

At 905, the UE 115 receives DCI from base station 105. At 910, the UE 115 may identify a first physical downlink control channel candidate, a second physical downlink control channel candidate, and a combined physical downlink control channel candidate. The candidates/search space sets may be configured at the UE 115. In some cases, the first physical downlink control channel candidate corresponds to a first search space, the second physical downlink control channel candidate corresponds to a second search space set, and the combined physical downlink control channel candidate corresponds to both the first search space set and the second search space set. In some cases, the combined physical downlink control channel candidate corresponds to one of the search space sets.

At 915, the UE 115 may decode the downlink control information from at least one of the first physical downlink control channel candidate, the second physical downlink control channel candidate, and the combined physical downlink control channel candidate based at least in part on the identifying.

At 920, the UE 115 may identify that the decoded downlink control information corresponds to the combined physical downlink control channel candidate. The identification may be based on the combined PDCCH candidate being configured at the UE 115, based on an indicator (e.g., bit or RNTI) included in the DCI, and/or based on a scrambling identifier value of identified based on descrambling of the DCI.

At 925, the base station identifies that the transmitted DCI corresponds to the combined physical downlink control channel candidate. The base station 105 may indicate that the transmitted DCI corresponds to the combined physical downlink control channel candidate using an indicator (e.g., a bit or RNTI value) in the DCI, or using a scrambling identifier to scramble the DCI.

At 930, the UE 115 and the base station 105 communicate based at least in part on identifying that the downlink control information corresponds to the combined physical downlink control channel candidate. In some cases, the UE 115 and the base station 105 communicate over PDSCH, PUSCH, and/or PUCCH resources that are identified based on identifying that the DCI corresponds to the combined PDCCH candidate and using various techniques as described herein.

Figure 10:
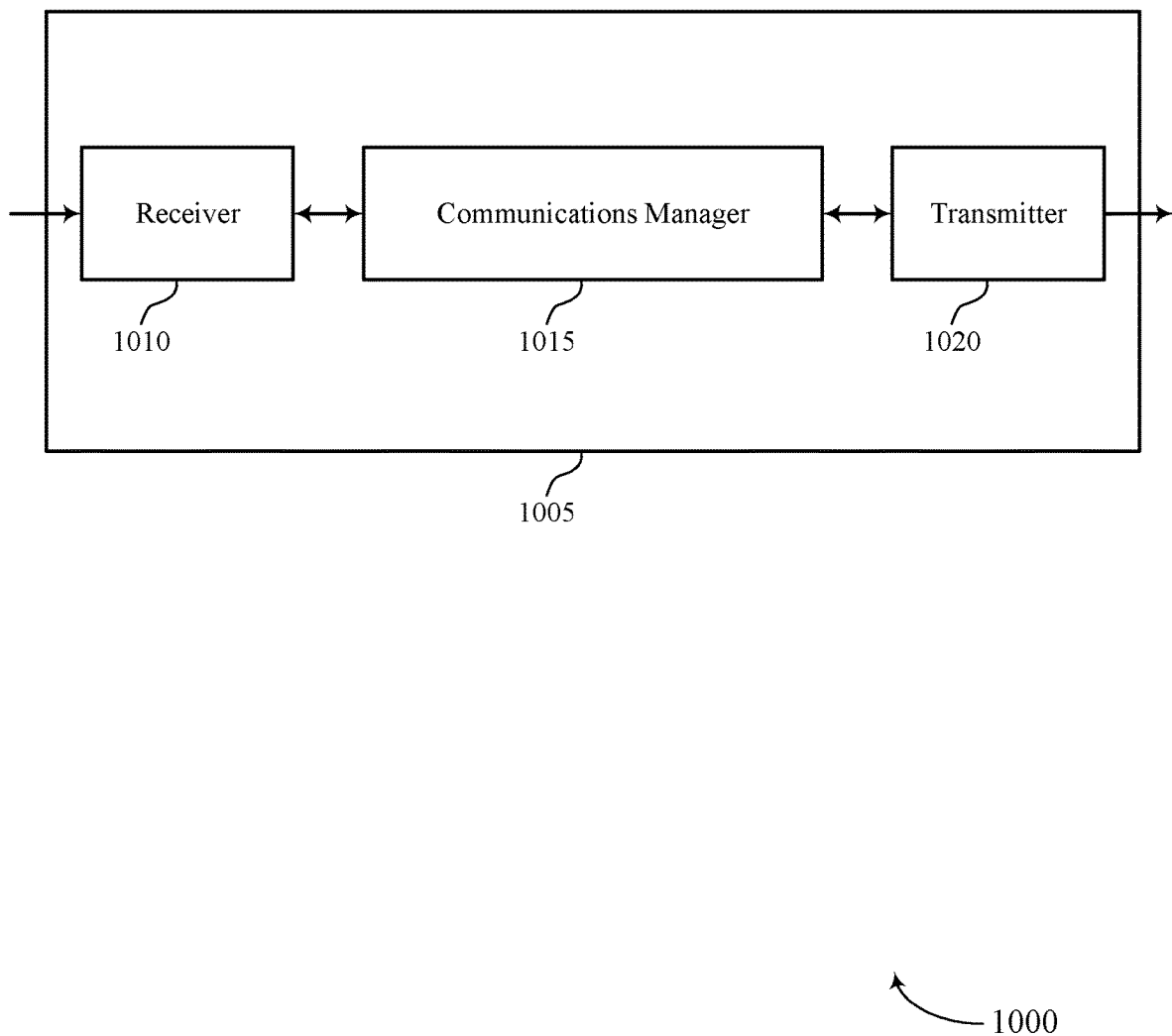
FIGS. 10 and 11 show block diagrams of devices that support decoding downlink control information in a combined PDCCH candidate in accordance with aspects of the present disclosure.

FIG. 10 shows a block diagram 1000 of a device 1005 that supports decoding downlink control information in a combined PDCCH candidate in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to decoding downlink control information in a combined PDCCH candidate, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive downlink control information from a base station. The communications manager 1015 may identify a first physical downlink control channel candidate, a second physical downlink control channel candidate, and a combined physical downlink control channel candidate. The communications manager 1015 may also decode the downlink control information from at least one of the first physical downlink control channel candidate, the second physical downlink control channel candidate, and the combined physical downlink control channel candidate based on the identifying. The communications manager 1015 may also identify that the decoded downlink control information corresponds to the combined physical downlink control channel candidate. The communications manager 1015 may also communicate with the base station based on identifying that the decoded downlink control information corresponds to the combined physical downlink control channel candidate. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Based on receiving DCI from a base station 105 and identifying that the DCI corresponds to a combined PDCCH candidate, a processor of a UE 115 (e.g., controlling the receiver 1010, the transmitter 1030, or the transceiver 1320 described with reference to FIG. 13) may efficiently identify a communication configurations for various channels including PDSCH, PUSCH, and PUCCH. Further, the processor of UE 115 may decode the combined PDCCH candidates. The processor of the UE 115 may thus turn on one or more processing units upon identifying the PDCCH candidates and identify a decoded DCI as corresponding to the combined PDCCH candidates. As such, when the DCI is decoded, the processor may be ready to identify scheduling information for various channels, and communication with the base station 105 over the identified channels.

Figure 11:
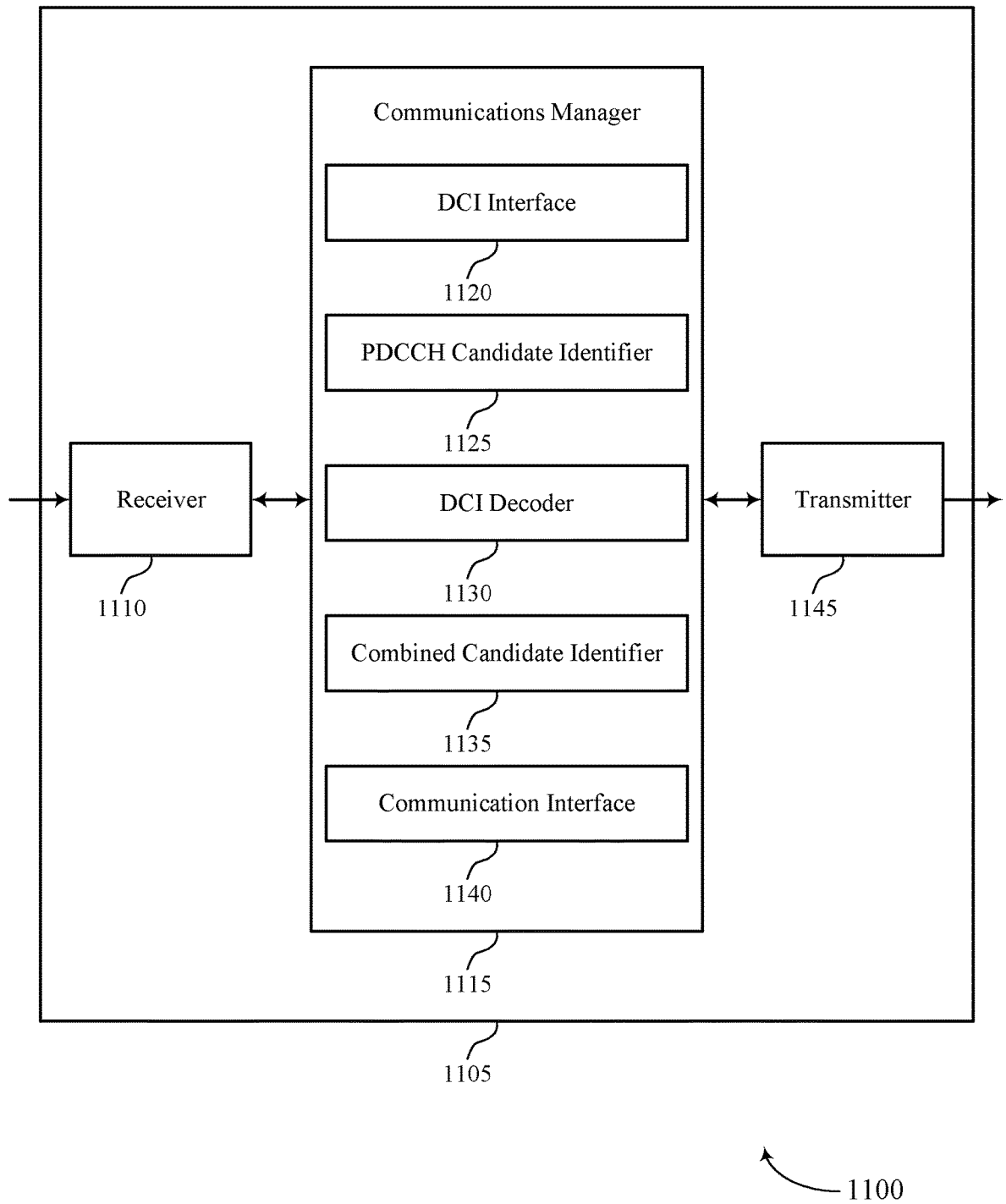

FIG. 11 shows a block diagram 1100 of a device 1105 that supports decoding downlink control information in a combined PDCCH candidate in accordance with aspects of the present disclosure. The device 1105 may be an example of aspects of a device 1005, or a UE 115 as described herein. The device 1105 may include a receiver 1110, a communications manager 1115, and a transmitter 1145. The device 1105 may also include a processor. Each of these components may be in communication with one another (e.g., via one or more buses).

The receiver 1110 may receive information such as packets, user data, or control information associated with various information channels (e.g., control channels, data channels, and information related to decoding downlink control information in a combined PDCCH candidate, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a DCI interface 1120, a PDCCH candidate identifier 1125, a DCI decoder 1130, a combined candidate identifier 1135, and a communication interface 1140. The communications manager 1115 may be an example of aspects of the communications manager 1310 described herein.

The DCI interface 1120 may receive downlink control information from a base station.

The PDCCH candidate identifier 1125 may identify a first physical downlink control channel candidate, a second physical downlink control channel candidate, and a combined physical downlink control channel candidate.

The DCI decoder 1130 may decode the downlink control information from at least one of the first physical downlink control channel candidate, the second physical downlink control channel candidate, and the combined physical downlink control channel candidate based on the identifying.

The combined candidate identifier 1135 may identify that the decoded downlink control information corresponds to the combined physical downlink control channel candidate.

The communication interface 1140 may communicate with the base station based on identifying that the decoded downlink control information corresponds to the combined physical downlink control channel candidate.

The transmitter 1145 may transmit signals generated by other components of the device 1105. In some examples, the transmitter 1145 may be collocated with a receiver 1110 in a transceiver module. For example, the transmitter 1145 may be an example of aspects of the transceiver 1320 described with reference to FIG. 13. The transmitter 1145 may utilize a single antenna or a set of antennas.

Figure 12:
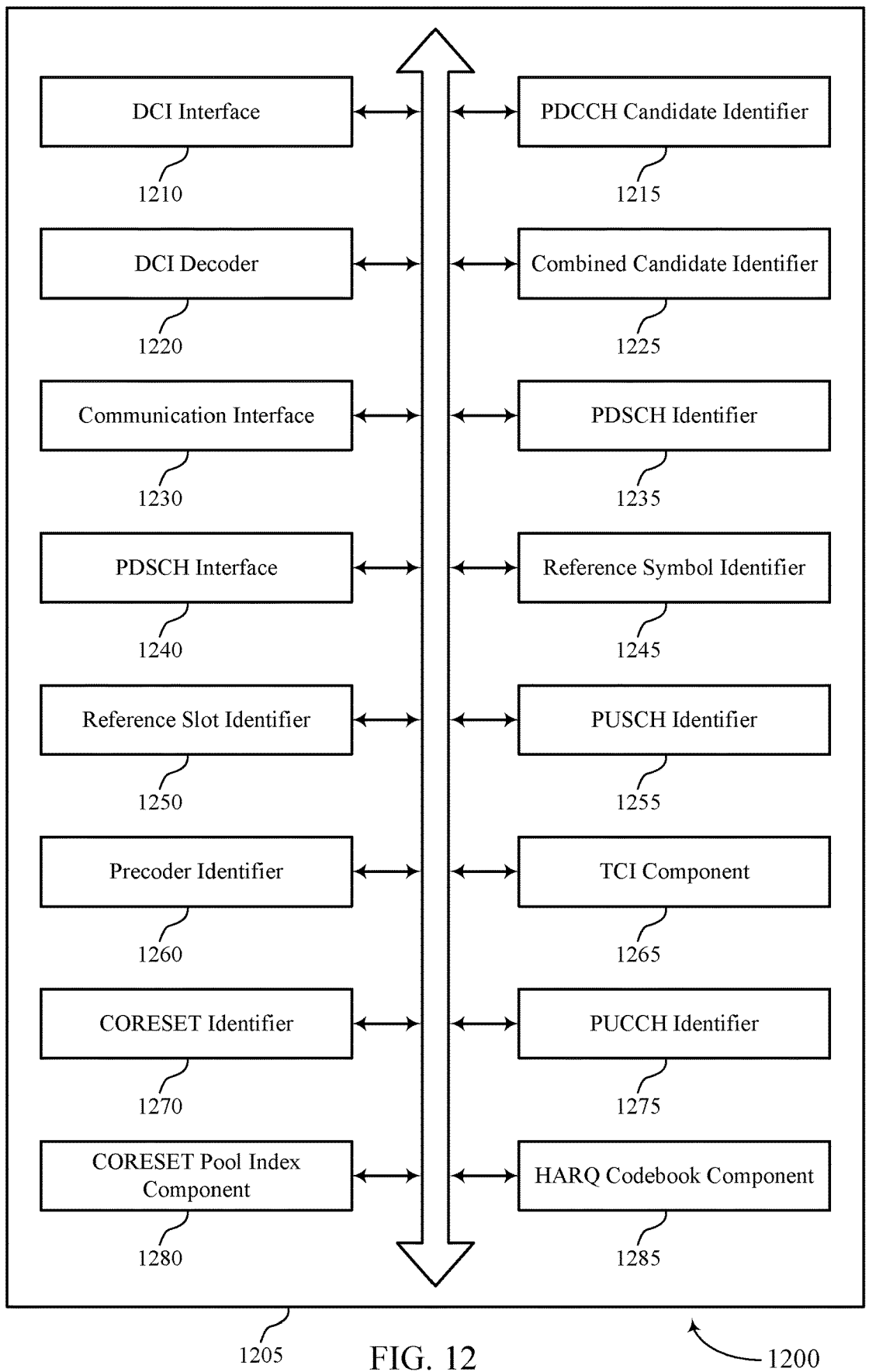
FIG. 12 shows a block diagram of a communications manager that supports decoding downlink control information in a combined PDCCH candidate in accordance with aspects of the present disclosure.

FIG. 12 shows a block diagram 1200 of a communications manager 1205 that supports decoding downlink control information in a combined PDCCH candidate in accordance with aspects of the present disclosure. The communications manager 1205 may be an example of aspects of a communications manager 1015, a communications manager 1115, or a communications manager 1310 described herein. The communications manager 1205 may include a DCI interface 1210, a PDCCH candidate identifier 1215, a DCI decoder 1220, a combined candidate identifier 1225, a communication interface 1230, a PDSCH identifier 1235, a PDSCH interface 1240, a reference symbol identifier 1245, a reference slot identifier 1250, a PUSCH identifier 1255, a precoder identifier 1260, a TCI component 1265, a CORESET identifier 1270, a PUCCH identifier 1275, a CORESET pool index component 1280, and a HARQ codebook component 1285. Each of these modules may communicate, directly or indirectly, with one another (e.g., via one or more buses).

The DCI interface 1210 may receive downlink control information from a base station.

The PDCCH candidate identifier 1215 may identify a first physical downlink control channel candidate, a second physical downlink control channel candidate, and a combined physical downlink control channel candidate.

In some examples, the PDCCH candidate identifier 1215 may identify the first physical downlink control channel candidate in a first search space set, the second physical downlink control channel candidate in a second search space set, and the combined physical downlink control channel candidate in the first search space set and the second search space set.

The DCI decoder 1220 may decode the downlink control information from at least one of the first physical downlink control channel candidate, the second physical downlink control channel candidate, and the combined physical downlink control channel candidate based on the identifying.

In some examples, the DCI decoder 1220 may identify an indication in the downlink control information, the indication indicating that the decoded downlink control information corresponds to the combined physical downlink control channel candidate.

In some examples, the DCI decoder 1220 may descramble a cyclic redundancy check of the downlink control information with a radio network temporary identifier indicating that the decoded downlink control information corresponds to the combined physical downlink control channel candidate.

In some examples, the DCI decoder 1220 may decode downlink control information using at least a scrambling identifier that indicates that the decoded downlink control information corresponds to the combined physical downlink control channel candidate.

In some examples, the DCI decoder 1220 may descramble a demodulation reference signal and coded bits of the downlink control information using the scrambling identifier that indicates that the decoded downlink control information corresponds to the combined physical downlink control channel candidate.

In some cases, the indication includes a bit indicating that the decoded downlink control information corresponds to the combined physical downlink control channel candidate.

The combined candidate identifier 1225 may identify that the decoded downlink control information corresponds to the combined physical downlink control channel candidate.

The communication interface 1230 may communicate with the base station based on identifying that the decoded downlink control information corresponds to the combined physical downlink control channel candidate.

The PDSCH identifier 1235 may identify a starting location of a physical downlink shared channel based on identifying that the decoded downlink control information corresponds to the combined physical downlink control channel candidate.

In some examples, the PDSCH identifier 1235 may identify that the starting location is during or after a first symbol of a later search space set of the first search space set and the second search space set.

In some examples, the PDSCH identifier 1235 may identify that the starting location is during or after a first symbol of an earlier search space set of the first search space set and the second search space set, during or after a first symbol of the first search space set or the second search space set with a smallest index, or during or after a first symbol of a first control resource set and a second control resource set with a smallest identifier.

In some examples, the PDSCH identifier 1235 may identify the starting location of the physical downlink shared channel based on the reference symbol.

In some examples, the PDSCH identifier 1235 may identify a starting location of a physical downlink shared channel based on the reference slot.

In some examples, the PDSCH identifier 1235 may identify an offset number of slots in the downlink control information, where the starting location of the physical downlink shared channel is identified using the offset number of slots relative to the reference slot.

In some examples, the PDSCH identifier 1235 may compare the offset number of slots to a UE capability threshold to determine whether to use a default setting or a setting indicated by the decoded downlink control information for receiving the physical downlink shared channel.

In some examples, the PDSCH identifier 1235 may determine to use the default setting for receiving the physical downlink shared channel based on determining that the offset is less than the UE capability threshold in accordance with the comparing.

In some examples, the PDSCH identifier 1235 may determine to use the setting indicated by the downlink control information based on determining that the offset is greater than the UE capability threshold in accordance with the comparing.

In some examples, the PDSCH identifier 1235 may identify that a physical downlink shared channel scheduled by the downlink control information is rate matched around resources in the first search space set and the second search space set corresponding to the downlink control information based on identifying that the decoded downlink control information corresponds to the combined physical downlink control channel candidate. In some examples, the PDSCH identifier 1235 may identify that a physical downlink shared channel scheduled by the downlink control information is rate matched around resources of the first physical downlink control channel candidate and the second physical downlink control channel candidate corresponding to the downlink control information based on identifying that the decoded downlink control information corresponds to the combined physical downlink control channel candidate.

In some examples, the PDSCH identifier 1235 may identify that the physical downlink shared channel is further rate matched around one or more demodulation reference signals based on the precoder granularity.

In some examples, the PDSCH identifier 1235 may identify a reference slot in accordance with a later slot of the first search space set and the second search space set based at least in part on identifying that the decoded downlink control information corresponds to the combined physical downlink control channel candidate, and identify a starting location of a physical downlink shared channel based at least in part on the reference slot.

In some examples, the DCI decoder 1220 may identify a resource allocation field in the downlink control information, wherein the starting location of the physical downlink shared channel is identified using a value of the resource allocation field relative to the reference slot. In some examples, the DCI decoder 12220 may identify that the downlink control information corresponding to the combined physical downlink control channel candidate schedules a physical downlink shared channel.

In some examples, the PDSCH identifier 1235 may identify a reference symbol in accordance with a last symbol of a later of the first search space set and the second search space set, identify an offset between the reference symbol and a physical downlink shared channel scheduled by the decoded downlink control information, and compare the offset to a UE capability threshold to determine whether to use a default setting or a setting indicated by the decoded downlink control information for receiving the physical downlink shared channel.

In some cases, the default setting and the setting indicated by the decoded downlink control information correspond respective receive beams for receiving the physical downlink shared channel.

In some cases, the one or more demodulation reference signals correspond to resource element groups of the control resource set when the precoder granularity indicates contiguous resource blocks of the control resource set.

In some cases, the one or more demodulation reference signals correspond to resource element groups of the combined physical downlink control channel candidate when the precoder granularity does not indicate contiguous resource blocks of the control resource set.

The PDSCH interface 1240 may receive the physical downlink shared channel based on the starting location.

In some examples, the PDSCH interface 1240 may receive the physical downlink shared channel based on the identified starting location.

The reference symbol identifier 1245 may identify a reference symbol for identifying a starting location of a physical downlink shared channel based on identifying that the decoded downlink control information corresponds to the combined physical downlink control channel candidate.

In some examples, the reference symbol identifier 1245 may identify a first symbol among a later of the first search space set and the second search space set.

In some examples, the reference symbol identifier 1245 may identify a first symbol among an earlier of the first search space set and the second search space set, a first symbol of the first search space set or the second search space set with a smallest index, or a first symbol of a first control resource set and a second control resource set with a smallest identifier.

In some examples, the reference symbol identifier 1245 may identify a downlink control information format for the decoded downlink control information, where identifying the reference symbol is based on identifying the downlink control information format.

The reference slot identifier 1250 may identify a reference slot in accordance with a later slot of the first search space set and the second search space set based on identifying that the decoded downlink control information corresponds to the combined physical downlink control channel candidate.

In some examples, the reference slot identifier 1250 may identify a reference slot in accordance with a later slot of the first search space set and the second search space set based on identifying that the decoded downlink control information corresponds to the combined physical downlink control channel candidate.

The PUSCH identifier 1255 may identify a starting location of a physical uplink shared channel based on the reference slot.

In some examples, the PUSCH identifier 1255 may identify a reference slot in accordance with a later slot of the first search space set and the second search space set based at least in part on identifying that the decoded downlink control information corresponds to the combined physical downlink control channel candidate, and identify a starting location of a physical uplink shared channel based at least in part on the reference slot. In some examples, the PUSCH identifier 1255 may transmit the physical uplink shared channel based at least in part on identifying the starting location.

In some examples, the DCI decoder 1220 may identify a resource allocation field included in the decoded downlink control information, where the starting location is identified based on a value of the resource allocation field relative to the reference slot.

In some examples, the PUSCH identifier 1255 may identify a reference symbol in accordance with a last symbol of a later search space set of the first search space set and the second search space set based at least in part on identifying that the decoded downlink control information corresponds to the combined physical downlink control channel candidate, and identify that a scheduled physical uplink control channel starts after a number of symbols after the reference symbol. In some examples, the number of symbols is determined based at least in part on a capability of the UE.

The precoder identifier 1260 may identify a precoder granularity of a control resource set associated with the first search space set or the second search space set. In some examples, the precoder identifier 1260 may identify a precoder granularity of a control resource set associated with the first physical downlink control channel candidate and the second physical downlink control channel candidate.

The TCI component 1265 may identify that the decoded downlink control information does not include a transmission configuration indicator state field indicating a transmission configuration indicator state of a physical downlink shared channel scheduled by the downlink control information.

In some examples, the TCI component 1265 may identify the transmission configuration indicator state, a quasi-co-location, or both for the scheduled physical downlink shared channel in accordance with the first control resource set or the second control resource set that corresponds to a combined physical downlink shared channel candidate based on identifying that the first control resource set corresponds to the second control resource set.

In some examples, the TCI component 1265 may determine whether an offset between the decoded downlink control information and a corresponding physical downlink shared channel is greater than or equal to a UE capability threshold, where the transmission configuration indicator state, the quasi co-location or both is identified based on determining that the offset is greater than the capability threshold.

In some examples, the TCI component 1265 may identify the transmission configuration transmission configuration indicator state, a quasi-co-location, or both for the scheduled physical downlink shared channel in accordance with the first control resource set or the second control resource set based on identifying that the first control resource set is different from the second control resource set.

In some examples, the TCI component 1265 may identify the transmission configuration indicator state, a quasi-co-location, or both for the scheduled physical downlink shared channel in accordance with the first control resource set and the second control resource set based on identifying that the first control resource set is different from the second control resource set.

In some cases, the transmission configuration indicator state, the quasi co-location, or both correspond to a multi-beam or multi-transmission configuration indicator state physical downlink shared channel based on the identifying.

The CORESET identifier 1270 may identify whether a first control resource set corresponding to the first search space set is a same control resource set as a second control resource set corresponding to the second search space set based on identifying that the decoded downlink control information corresponds to the combined physical downlink control channel candidate and identifying that the decoded downlink control information does not include the transmission configuration indicator state field.

In some examples, the CORESET identifier 1270 may identify the transmission configuration indicator state, the quasi co-location, or both for the scheduled physical downlink shared channel in accordance with the first control resource set or the second control resource set based on a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof.

The PUCCH identifier 1275 may identify resources of a physical uplink control channel for a hybrid automatic repeat request transmission for the physical uplink shared channel based on a number of control channel elements and a starting control channel element index from a first control resource set corresponding to the first search space set or from a second control resource set corresponding to the second search space set based on identifying that the decoded downlink control information corresponds to the combined physical downlink control channel candidate.

In some examples, the PUCCH identifier 1275 may identify the resources of the physical uplink control channel based on the number of control channel elements and the starting control channel element index from either the first control resource set or the second control resource set based on a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof.

In some examples, the PUCCH identifier 1275 may identify resources of a physical uplink control channel based on a number of control channel elements and a starting control channel element index from both a first control resource set corresponding to the first search space set and a second control resource set corresponding to the second search space set based on identifying that the decoded downlink control information corresponds to the combined physical downlink control channel candidate.

The CORESET pool index component 1280 may identify that a first control resource set pool index of a first control resource set corresponding to the first search space set is different from a second control resource set pool index of a second control resource set corresponding to the second search space set based on identifying that the decoded downlink control information corresponds to the combined physical downlink control channel candidate.

In some examples, the CORESET pool index component 1280 may identify a physical downlink scrambling sequence initialization value, a default beam for a physical downlink shared channel scheduled via the decoded downlink control information, a set of activated transmission configuration indicator states, or any combination thereof based on the first control resource set pool index or the second control resource set pool index.

In some examples, the CORESET pool index component 1280 may identify a control resource set pool index value corresponding to a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof, where the physical downlink scrambling sequence initialization value, the default beam for a physical downlink shared channel scheduled via the decoded downlink control information, the set of activated transmission configuration indicator states, or any combination thereof is identified based on the control resource set pool index value.

The HARQ codebook component 1285 may identify a hybrid automatic repeat request acknowledgement codebook based on the first control resource set pool index or the second control resource set pool index based on identifying that the first control resource set pool index and the second control resource set pool index are different. In some examples, the HARQ codebook component 1285 may transmit the hybrid automatic repeat request acknowledgement codebook for the scheduled physical downlink control channel candidate. In some examples, the HARQ codebook component 1285 may transmit the hybrid automatic repeat request acknowledgement codebook for the scheduled physical downlink control channel candidate with a same value based at least in part on identifying the hybrid automatic repeat request acknowledgement codebook based at least in part on the first control resource set pool index and the second control resource set pool index.

In some examples, the HARQ codebook component 1285 may identify a fixed control resource set pool index value of the first control resource set pool index and the second control resource set pool index, where the hybrid automatic repeat request acknowledgement codebook is identified in accordance with the fixed control resource set pool index value.

In some examples, the HARQ codebook component 1285 may identify a control resource set pool index value corresponding to a fixed value, a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof, where the hybrid automatic repeat request acknowledgement codebook is identified in accordance with the control resource set pool index value.

In some examples, the HARQ codebook component 1285 may identify a hybrid automatic repeat request acknowledgement codebook based on the first control resource set pool index and the second control resource set pool index based on identifying that the first control resource set pool index and the second control resource set pool index are different.

Figure 13:
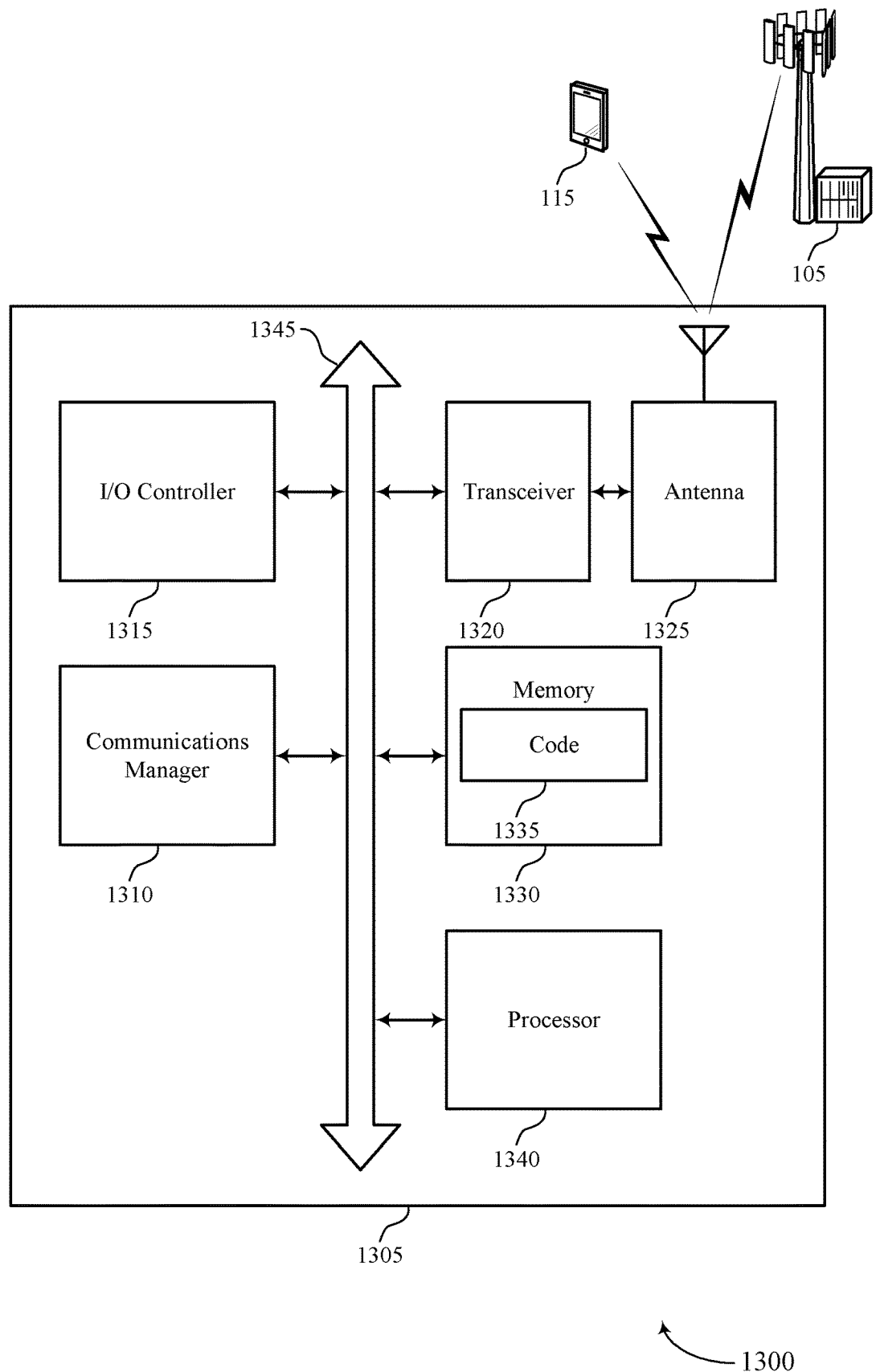
FIG. 13 shows a diagram of a system including a device that supports decoding downlink control information in a combined PDCCH candidate in accordance with aspects of the present disclosure.

FIG. 13 shows a diagram of a system 1300 including a device 1305 that supports decoding downlink control information in a combined PDCCH candidate in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may receive downlink control information from a base station. The communications manager 1310 may identify a first physical downlink control channel candidate, a second physical downlink control channel candidate, and a combined physical downlink control channel candidate. The communications manager 1310 may decode the downlink control information from at least one of the first physical downlink control channel candidate, the second physical downlink control channel candidate, and the combined physical downlink control channel candidate based on the identifying. The communications manager 1310 may identify that the decoded downlink control information corresponds to the combined physical downlink control channel candidate. The communications manager 1310 may communicate with the base station based on identifying that the decoded downlink control information corresponds to the combined physical downlink control channel candidate.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a basic input/output system (BIOS) which may control basic hardware or software operation such as the interaction with peripheral components or devices.

The processor 1340 may include an intelligent hardware device, (e.g., a general-purpose processor, a digital signal processor (DSP), a CPU, a microcontroller, an ASIC, a field programmable gate array (FPGA), a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting decoding downlink control information in a combined PDCCH candidate).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
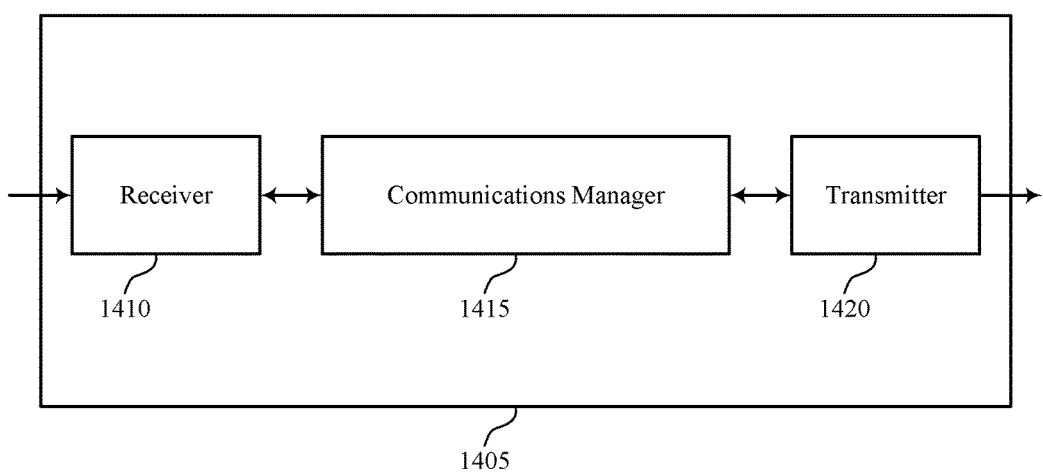
FIGS. 14 and 15 show block diagrams of devices that support decoding downlink control information in a combined PDCCH candidate in accordance with aspects of the present disclosure.

FIG. 14 shows a block diagram 1400 of a device 1405 that supports decoding downlink control information in a combined PDCCH candidate in accordance with aspects of the present disclosure. The device 1405 may be an example of aspects of a base station 105 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to decoding downlink control information in a combined PDCCH candidate, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may transmit downlink control information to a UE, where the downlink control information corresponds to a first physical downlink control channel candidate, a second physical downlink control channel, or a combined physical downlink control channel candidate. The communications manager 1415 may also identify that the transmitted downlink control channel candidate corresponds to the combined physical downlink control channel candidate based on the transmitting. The communications manager 1415 may also communicate with the UE based on identifying that the decoded downlink control information corresponds to the combined physical downlink control channel candidate. The communications manager 1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
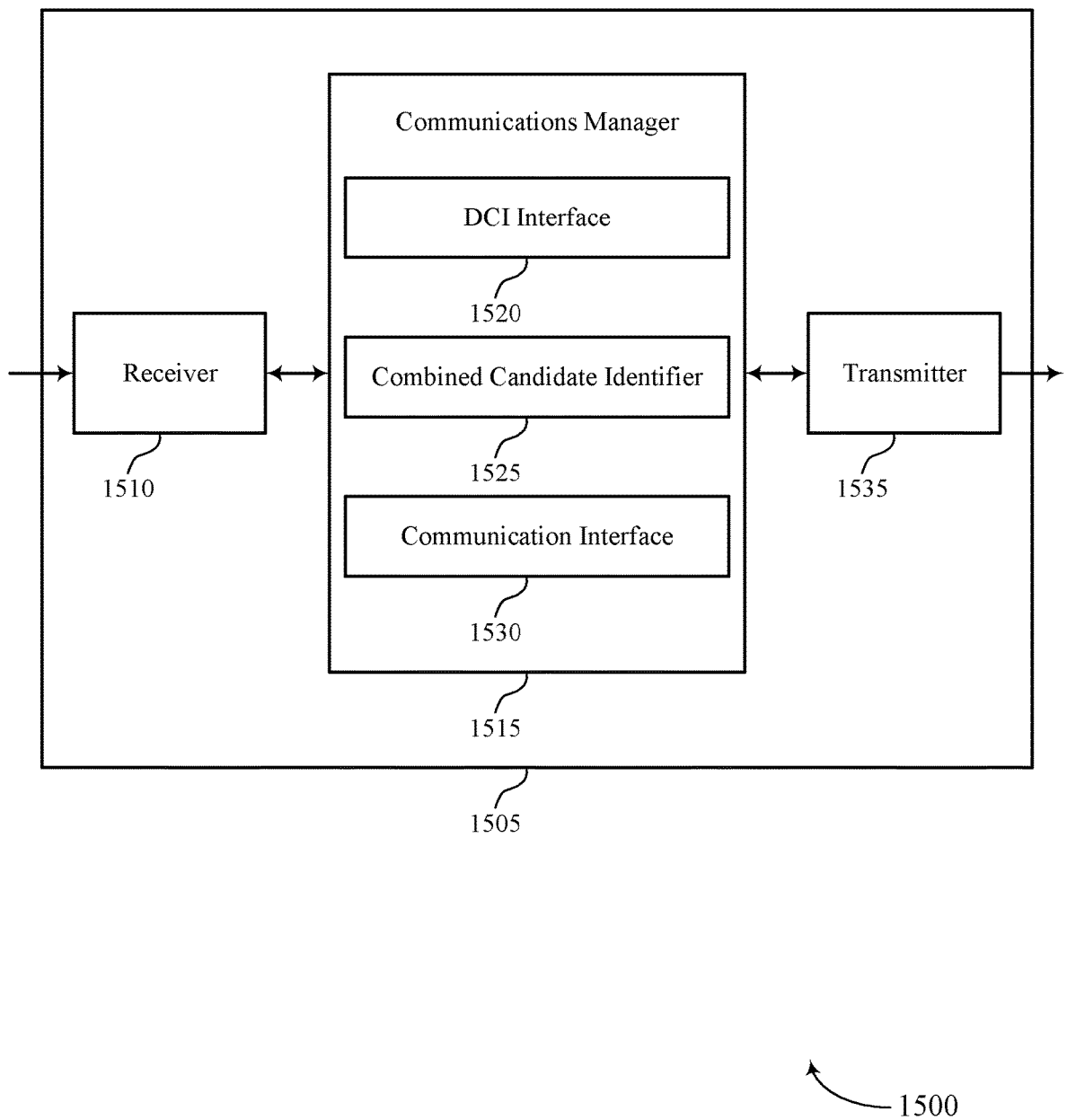

FIG. 15 shows a block diagram 1500 of a device 1505 that supports decoding downlink control information in a combined PDCCH candidate in accordance with aspects of the present disclosure. The device 1505 may be an example of aspects of a device 1405, or a base station 105 as described herein. The device 1505 may include a receiver 1510, a communications manager 1515, and a transmitter 1535. The device 1505 may also include a processor. Each of these components may be in communication with one another (e.g., via one or more buses).

The receiver 1510 may receive information such as packets, user data, or control information associated with various information channels (e.g., control channels, data channels, and information related to decoding downlink control information in a combined PDCCH candidate, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a DCI interface 1520, a combined candidate identifier 1525, and a communication interface 1530. The communications manager 1515 may be an example of aspects of the communications manager 1710 described herein.

The DCI interface 1520 may transmit downlink control information to a UE, where the downlink control information corresponds to a first physical downlink control channel candidate, a second physical downlink control channel, or a combined physical downlink control channel candidate.

The combined candidate identifier 1525 may identify that the transmitted downlink control channel candidate corresponds to the combined physical downlink control channel candidate based on the transmitting.

The communication interface 1530 may communicate with the UE based on identifying that the decoded downlink control information corresponds to the combined physical downlink control channel candidate.

The transmitter 1535 may transmit signals generated by other components of the device 1505. In some examples, the transmitter 1535 may be collocated with a receiver 1510 in a transceiver module. For example, the transmitter 1535 may be an example of aspects of the transceiver 1720 described with reference to FIG. 17. The transmitter 1535 may utilize a single antenna or a set of antennas.

Figure 16:
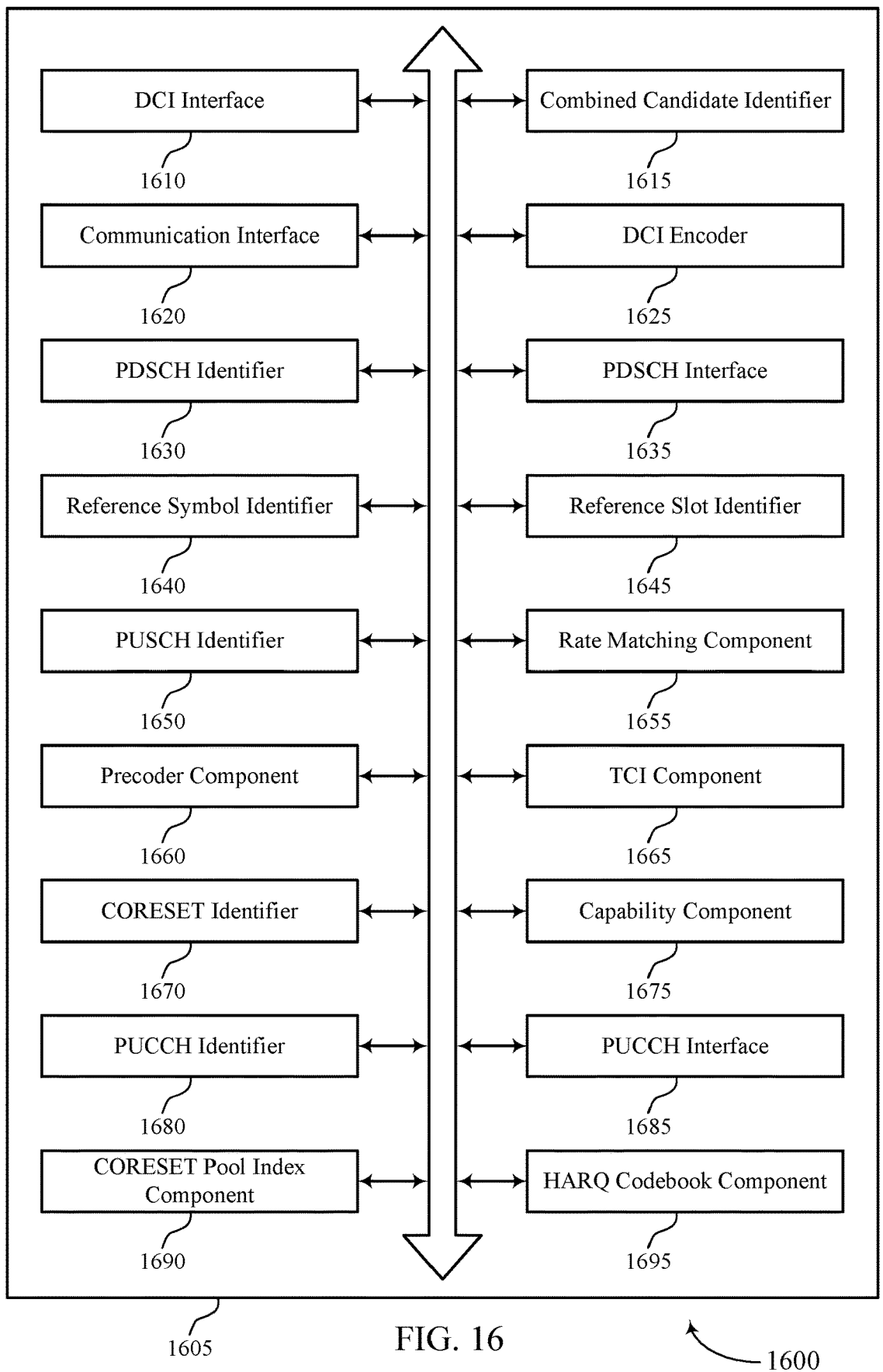
FIG. 16 shows a block diagram of a communications manager that supports decoding downlink control information in a combined PDCCH candidate in accordance with aspects of the present disclosure.

FIG. 16 shows a block diagram 1600 of a communications manager 1605 that supports decoding downlink control information in a combined PDCCH candidate in accordance with aspects of the present disclosure. The communications manager 1605 may be an example of aspects of a communications manager 1415, a communications manager 1515, or a communications manager 1710 described herein. The communications manager 1605 may include a DCI interface 1610, a combined candidate identifier 1615, a communication interface 1620, a DCI encoder 1625, a PDSCH identifier 1630, a PDSCH interface 1635, a reference symbol identifier 1640, a reference slot identifier 1645, a PUSCH identifier 1650, a rate matching component 1655, a precoder component 1660, a TCI component 1665, a CORESET identifier 1670, a capability component 1675, a PUCCH identifier 1680, a PUCCH interface 1685, a CORESET pool index component 1690, and a HARQ codebook component 1695. Each of these modules may communicate, directly or indirectly, with one another (e.g., via one or more buses).

The DCI interface 1610 may transmit downlink control information to a UE, where the downlink control information corresponds to a first physical downlink control channel candidate, a second physical downlink control channel candidate, or a combined physical downlink control channel.

In some examples, the DCI interface 1610 may transmit the downlink control information that corresponds to the first physical downlink control channel candidate in a first search space set, the second physical downlink control channel candidate in a second search space set, or the combined physical downlink control channel candidate in the first search space set and the second search space set.

The combined candidate identifier 1615 may identify that the transmitted downlink control channel candidate corresponds to the combined physical downlink control channel candidate based on the transmitting.

The communication interface 1620 may communicate with the UE based on identifying that the decoded downlink control information corresponds to the combined physical downlink control channel candidate.

The DCI encoder 1625 may include an indication in the downlink control information that indicates that the transmitted physical downlink control channel corresponds to the combined physical downlink control channel candidate.

In some examples, the DCI encoder 1625 may scramble a cyclic redundancy check of the downlink control information with a radio network temporary identifier indicating that the transmitted downlink control information corresponds to the combined physical downlink control channel candidate.

In some examples, the DCI encoder 1625 may scramble the downlink control information using at least a scrambling identifier that indicates that the transmitted physical downlink control channel candidate is the combined physical downlink control channel candidate.

In some examples, the DCI encoder 1625 may scramble a demodulation reference signal and coded bits of the downlink control information using the scrambling identifier that indicates that the transmitted physical downlink control channel candidate is the combined physical downlink control channel candidate.

In some examples, the DCI encoder 1625 may transmit an identification of the offset number of slots in the downlink control information, where the physical uplink shared channel is transmitted based on the reference slot and the offset number of slots.

In some cases, the indication includes a bit indicating that the transmitted downlink control information corresponds to the combined physical downlink control channel candidate.

The PDSCH identifier 1630 may identify a starting location of a physical downlink shared channel corresponding to the transmitted physical downlink control channel candidate based on identifying that the transmitted physical downlink control channel candidate is the combined physical downlink control channel candidate.

In some examples, the PDSCH identifier 1630 may identify that the starting location is during or after a first symbol of a later search space set of the first search space set and the second search space set.

In some examples, the PDSCH identifier 1630 may identify that the starting location is during or after a first symbol of an earlier search space set of the first search space set and the second search space set, during or after a first symbol of the first search space set or the second search space set with a smallest index, or during or after a first symbol of a first control resource set and a second control resource set with a smallest identifier.

In some examples, the PDSCH identifier 1630 may identify an offset number of slots relative to the reference slot.

In some examples, the PDSCH identifier 1630 may transmit an identification of the offset number of slots in the downlink control information, where the physical downlink shared channel is transmitted based on the reference slot and the offset number of slots.

In some examples, the PDSCH identifier 1630 may identify the starting location of the physical downlink shared channel based on the reference symbol.

In some examples, the PDSCH identifier 1630 may identify a starting location of a physical downlink shared channel based on the reference slot.

The PDSCH interface 1635 may transmit the physical downlink shared channel in accordance with the identified starting location.

In some examples, the PDSCH interface 1635 may transmit the physical downlink shared channel based on the identified starting location.

The reference symbol identifier 1640 may identify a reference symbol for identifying a starting location of a physical downlink shared channel based on identifying that the transmitted downlink control information corresponds to the combined physical downlink control channel candidate.

In some examples, the reference symbol identifier 1640 may identify a first symbol among a later of the first search space set and the second search space set.

In some examples, the reference symbol identifier 1640 may identify a first symbol among an earlier of the first search space set and the second search space set, a first symbol of the first search space set or the second search space set with a smallest index, or a first symbol of a first control resource set and a second control resource set with a smallest identifier.

In some examples, the reference symbol identifier 1640 may identify a downlink control information format for the transmitted downlink control information, where identifying the reference symbol is based on identifying the downlink control information format.

The reference slot identifier 1645 may identify a reference slot in accordance with a later slot of the first search space set and the second search space set based on identifying that the transmitted downlink control information corresponds to the combined physical downlink control channel candidate.

In some examples, the reference slot identifier 1645 may identify a reference slot in accordance with a later slot of the first search space set and the second search space set based on identifying that the transmitted downlink control information corresponds to the combined physical downlink control channel candidate.

The PUSCH identifier 1650 may identify a starting location of a physical uplink shared channel based on the reference slot.

In some examples, the PUSCH identifier 1650 may identify an offset number of slots relative to the reference slot.

The rate matching component 1655 may rate matching resources of a physical downlink shared channel scheduled by the downlink control information around resources in the first search space set and the second search space set corresponding to the downlink control information based on identifying that the transmitted downlink control information corresponds to the combined physical downlink control channel candidate.

In some examples, the rate matching component 1655 may rate matching resources of the physical downlinks shared channel with resources of one or more demodulation reference signals based on the precoder granularity.

In some cases, the one or more demodulation reference signals correspond to resource element groups of the control resource set when the precoder granularity indicates contiguous resource blocks of the control resource set.

In some cases, the one or more demodulation reference signals correspond to resource element groups of the combined physical downlink control channel candidate when the precoder granularity does not indicate contiguous resource blocks of the control resource set.

The precoder component 1660 may transmit a precoder granularity of a control resource set associated with the first search space set or the second search space set.

The TCI component 1665 may transmit the downlink control information without a transmission configuration indicator state field indicating a transmission configuration indicator state of a physical downlink shared channel scheduled by the downlink control information; and that the transmitted downlink control information does not include a transmission configuration indicator state.

In some examples, the TCI component 1665 may identify the transmission configuration indicator state, a quasi-co-location, or both for the scheduled physical downlink shared channel in accordance with the first control resource set or the second control resource set that corresponds to a combined physical downlink shared channel candidate based on identifying that the first control resource set corresponds to the second control resource set.

In some examples, the TCI component 1665 may determine whether an offset between the transmitted downlink control information and a corresponding physical downlink shared channel is greater than or equal to a UE capability threshold corresponding to the UE capability, where the transmission configuration indicator state, the quasi co-location or both is identified based on determining that the offset is greater than the capability threshold.

In some examples, the TCI component 1665 may identify the transmission configuration indicator state, a quasi-co-location, or both for the scheduled physical downlink shared channel in accordance with the first control resource set or the second control resource set based on identifying that the first control resource set is different from the second control resource set.

In some examples, the TCI component 1665 may identify the transmission configuration indicator state, a quasi-co-location, or both for the scheduled physical downlink shared channel in accordance with the first control resource set and the second control resource set based on identifying that the first control resource set is different from the second control resource set.

In some cases, the transmission configuration indicator state, the quasi co-location, or both correspond to a multi-state physical downlink shared channel based on the identifying.

The CORESET identifier 1670 may identify whether a first control resource set corresponding to the first search space set is a same control resource set as a second control resource set corresponding to the second search space set based on identifying that the transmitted downlink control information corresponds to the combined physical downlink control channel candidate and transmitting the downlink control information without the transmission configuration indicator state field.

In some examples, the CORESET identifier 1670 may identify the transmission configuration indicator state, the quasi co-location, or both for the scheduled physical downlink shared channel in accordance with the first control resource set or the second control resource set based on a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof.

The capability component 1675 may receive, from the UE, an indication of the UE capability.

The PUCCH identifier 1680 may identify resources of a physical uplink control channel based on a number of control channel elements and a starting control channel element index from a first control resource set corresponding to the first search space set or from a second control resource set corresponding to the second search space set based on identifying that the transmitted downlink control information corresponds to the combined physical downlink control channel candidate.

In some examples, the PUCCH identifier 1680 may identify the resources of the physical uplink control channel based on the number of control channel elements and the starting control channel element index from either the first control resource set or the second control resource set based on a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof.

In some examples, the PUCCH identifier 1680 may identify resources of a physical uplink control channel based on a number of control channel elements and a starting control channel element index from both a first control resource set corresponding to the first search space set and a second control resource set corresponding to the second search space set based on identifying that the transmitted downlink control information corresponds to the combined physical downlink control channel candidate.

The PUCCH interface 1685 may receive the physical uplink control channel in accordance with the identifying.

The CORESET pool index component 1690 may identify that a first control resource set pool index of a first control resource set corresponding to the first search space set is different from a second control resource set pool index of a second control resource set corresponding to the second search space set based on identifying that the transmitted downlink control information corresponds to the combined physical downlink control channel candidate.

In some examples, the CORESET pool index component 1690 may identify a control resource set pool index value corresponding to a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof, where the hybrid automatic repeat request acknowledgement codebook is identified in accordance with the control resource set pool index value.

In some examples, the CORESET pool index component 1690 may identify a physical downlink scrambling sequence initialization value, a default beam for a physical downlink shared channel scheduled via the transmitted downlink control information, a set of activated transmission configuration indicator states, or any combination thereof based on the first control resource set pool index or the second control resource set pool index.

In some examples, the CORESET pool index component 1690 may identify a control resource set pool index value corresponding to a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof, where the physical downlink scrambling sequence initialization value, the default beam for a physical downlink shared channel scheduled via the transmitted downlink control information, the set of activate transmission configuration indicator states, or any combination thereof is identified based on the control resource set pool index value.

The HARQ codebook component 1695 may identify a hybrid automatic repeat request acknowledgement codebook based on the first control resource set pool index or the second control resource set pool index based on identifying that the first control resource set pool index and the second control resource set pool index are different.

In some examples, the HARQ codebook component 1695 may identify a fixed control resource set pool index value of the first control resource set pool index and the second control resource set pool index, where the hybrid automatic repeat request acknowledgement codebook is identified in accordance with the fixed control resource set pool index value.

In some examples, the HARQ codebook component 1695 may identify a hybrid automatic repeat request acknowledgement codebook based on the first control resource set pool index and the second control resource set pool index based on identifying that the first control resource set pool index and the second control resource set pool index are different.

Figure 17:
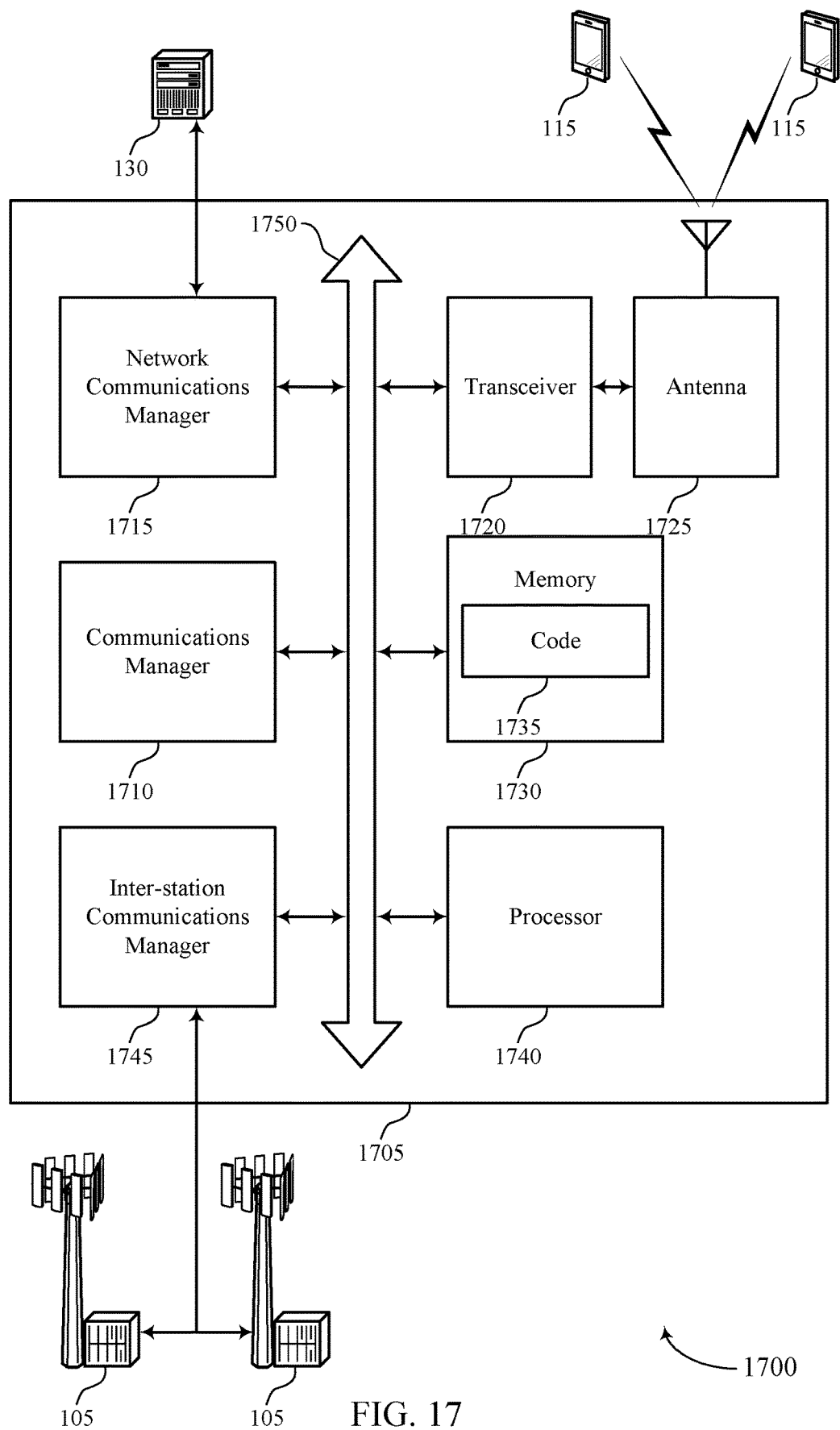
FIG. 17 shows a diagram of a system including a device that supports decoding downlink control information in a combined PDCCH candidate in accordance with aspects of the present disclosure.

FIG. 17 shows a diagram of a system 1700 including a device 1705 that supports decoding downlink control information in a combined PDCCH candidate in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communications manager 1710 may transmit downlink control information to a UE, where the downlink control information corresponds to a first physical downlink control channel candidate, a second physical downlink control channel candidate, or a combined physical downlink control channel candidate. The communications manager 1710 may identify that the transmitted downlink control channel candidate corresponds to the combined physical downlink control channel candidate based on the transmitting. The communications manager 1710 may communicate with the UE based on identifying that the decoded downlink control information corresponds to the combined physical downlink control channel candidate.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting decoding downlink control information in a combined PDCCH candidate).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
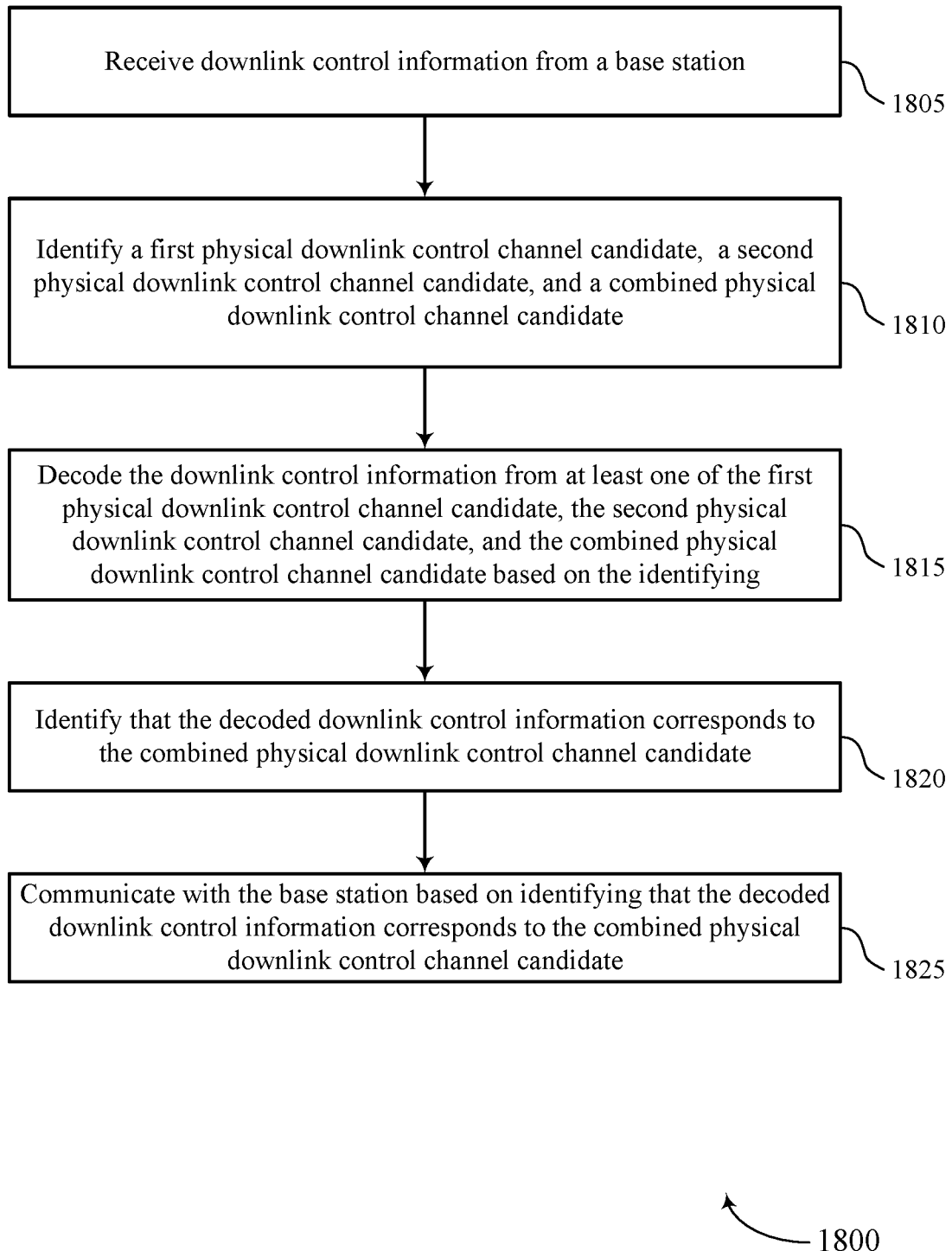
FIGS. 18 and 19 show flowcharts illustrating methods that support decoding downlink control information in a combined PDCCH candidate in accordance with aspects of the present disclosure.

FIG. 18 shows a flowchart illustrating a method 1800 that supports decoding downlink control information in a combined PDCCH candidate in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1805, the UE may receive downlink control information from a base station. The operations of 1805 may be performed according to the methods described herein. In some examples, aspects of the operations of 1805 may be performed by a DCI interface as described with reference to FIGS. 10 through 13.

At 1810, the UE may identify a first physical downlink control channel candidate, a second physical downlink control channel candidate, and a combined physical downlink control channel candidate. The operations of 1810 may be performed according to the methods described herein. In some examples, aspects of the operations of 1810 may be performed by a PDCCH candidate identifier as described with reference to FIGS. 10 through 13.

At 1815, the UE may decode the downlink control information from at least one of the first physical downlink control channel candidate, the second physical downlink control channel candidate, and the combined physical downlink control channel candidate based on the identifying. The operations of 1815 may be performed according to the methods described herein. In some examples, aspects of the operations of 1815 may be performed by a DCI decoder as described with reference to FIGS. 10 through 13.

At 1820, the UE may identify that the decoded downlink control information corresponds to the combined physical downlink control channel candidate. The operations of 1820 may be performed according to the methods described herein. In some examples, aspects of the operations of 1820 may be performed by a combined candidate identifier as described with reference to FIGS. 10 through 13.

At 1825, the UE may communicate with the base station based on identifying that the decoded downlink control information corresponds to the combined physical downlink control channel candidate. The operations of 1825 may be performed according to the methods described herein. In some examples, aspects of the operations of 1825 may be performed by a communication interface as described with reference to FIGS. 10 through 13.

Figure 19:
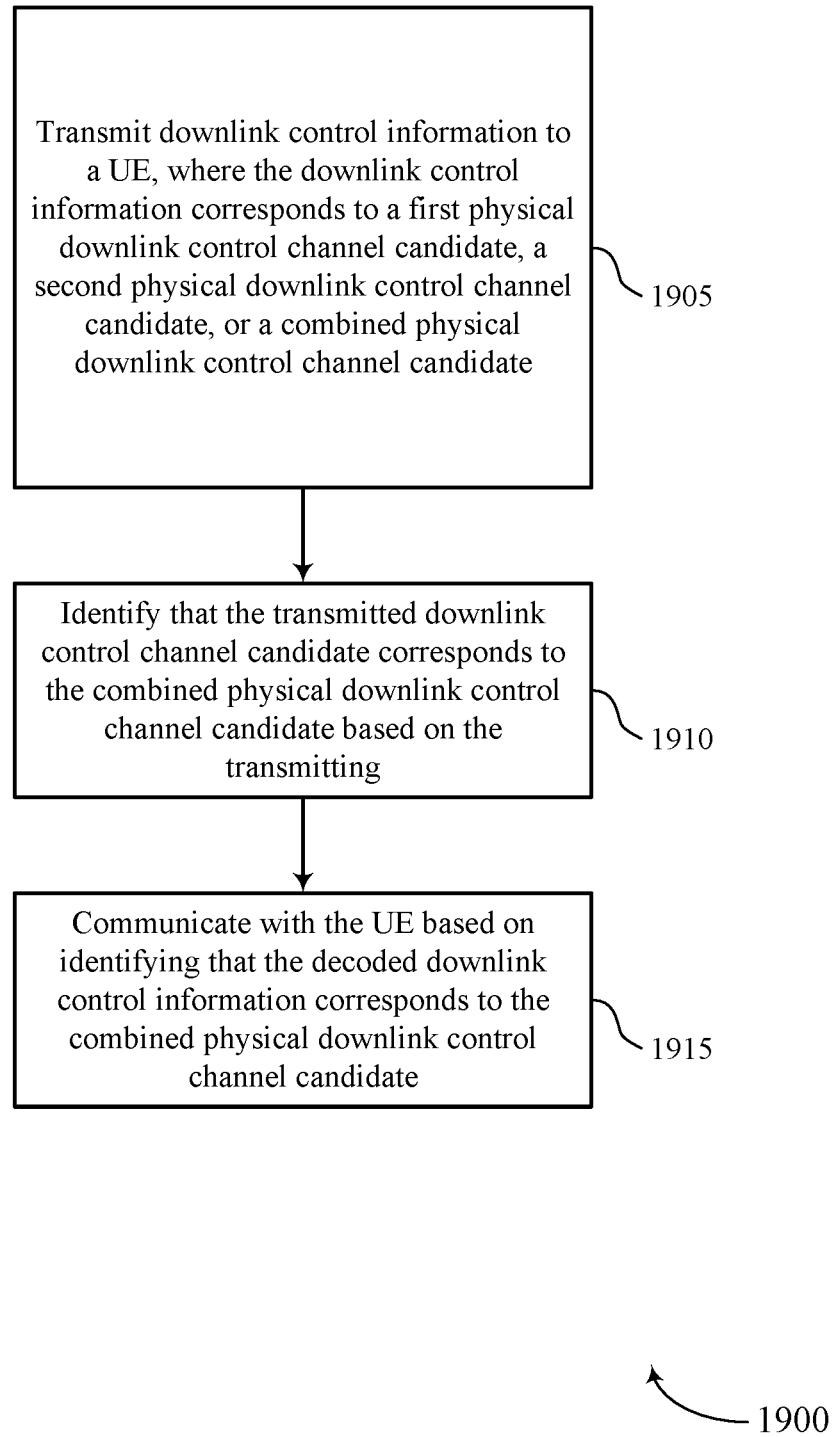

FIG. 19 shows a flowchart illustrating a method 1900 that supports decoding downlink control information in a combined PDCCH candidate in accordance with aspects of the present disclosure. The operations of method 1900 may be implemented by a base station 105 or its components as described herein. For example, the operations of method 1900 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 1905, the base station may transmit downlink control information to a UE, where the downlink control information corresponds to a first physical downlink control channel candidate, a second physical downlink control channel candidate, or a combined physical downlink control channel candidate. The operations of 1905 may be performed according to the methods described herein. In some examples, aspects of the operations of 1905 may be performed by a DCI interface as described with reference to FIGS. 14 through 17.

At 1910, the base station may identify that the transmitted downlink control channel candidate corresponds to the combined physical downlink control channel candidate based on the transmitting. The operations of 1910 may be performed according to the methods described herein. In some examples, aspects of the operations of 1910 may be performed by a combined candidate identifier as described with reference to FIGS. 14 through 17.

At 1915, the base station may communicate with the UE based on identifying that the decoded downlink control information corresponds to the combined physical downlink control channel candidate. The operations of 1915 may be performed according to the methods described herein. In some examples, aspects of the operations of 1915 may be performed by a communication interface as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving downlink control information from a base station; identifying a first physical downlink control channel candidate in a first search space set, a second physical downlink control channel candidate in a second search space set, and a combined physical downlink control channel candidate in the first search space set and the second search space set; decoding the downlink control information from at least one of the first physical downlink control channel candidate, the second physical downlink control channel candidate, and the combined physical downlink control channel candidate based at least in part on the identifying; identifying that the downlink control information corresponds to the combined physical downlink control channel candidate; and communicating with the base station based at least in part on identifying that the downlink control information corresponds to the combined physical downlink control channel candidate.

Aspect 2: The method of aspect 1, further comprising: identifying an indication in the downlink control information, the indication indicating that the downlink control information corresponds to the combined physical downlink control channel candidate.

Aspect 3: The method of aspect 2, wherein the indication comprises a bit indicating that the downlink control information corresponds to the combined physical downlink control channel candidate.

Aspect 4: The method of any of aspects 2 through 3, wherein identifying the indication in the downlink control information comprises: descrambling a cyclic redundancy check of the downlink control information with s a radio network temporary identifier indicating that the downlink control information corresponds to the combined physical downlink control channel candidate.

Aspect 5: The method of any of aspects 1 through 4, wherein decoding the downlink control information comprises: decoding downlink control information using at least a scrambling identifier that indicates that the downlink control information corresponds to the combined physical downlink control channel candidate.

Aspect 6: The method of aspect 5, wherein decoding the downlink control information using the scrambling identifier comprises: descrambling a demodulation reference signal and at least a portion of the downlink control information using the scrambling identifier that indicates that the downlink control information corresponds to the combined physical downlink control channel candidate.

Aspect 7: The method of any of aspects 1 through 6, further comprising: identifying a starting location of a physical downlink shared channel based at least in part on identifying that the downlink control information corresponds to the combined physical downlink control channel candidate; and receiving the physical downlink shared channel based at least in part on the starting location.

Aspect 8: The method of aspect 7, wherein identifying the starting location comprises: identifying that the starting location is during or after a first symbol of a later search space set of the first search space set and the second search space set.

Aspect 9: The method of any of aspects 7 through 8, wherein identifying the starting location comprises: identifying that the starting location is during or after a first symbol of an earlier search space set of the first search space set and the second search space set, during or after a first symbol of the first search space set or the second search space set with a smallest index, or during or after a first symbol of a first control resource set and a second control resource set with a smallest identifier.

Aspect 10: The method of any of aspects 1 through 9, further comprising: identifying a reference symbol for identifying a starting location of a physical downlink shared channel based at least in part on identifying that the downlink control information corresponds to the combined physical downlink control channel candidate.

Aspect 11: The method of aspect 10, wherein identifying the reference symbol comprises: identifying a first symbol among a later of the first search space set and the second search space set.

Aspect 12: The method of any of aspects 10 through 11, wherein identifying the reference symbol comprises: identifying a first symbol among an earlier of the first search space set and the second search space set, a first symbol of the first search space set or the second search space set with a smallest index, or a first symbol of a first control resource set and a second control resource set with a smallest identifier.

Aspect 13: The method of any of aspects 10 through 12, further comprising: identifying a downlink control information format for the decoded downlink control information, wherein identifying the reference symbol is based at least in part on identifying the downlink control information format.

Aspect 14: The method of any of aspects 10 through 13, further comprising: identifying the starting location of the physical downlink shared channel based at least in part on the reference symbol; and receiving the physical downlink shared channel based at least in part on the identified starting location.

Aspect 15: The method of any of aspects 1 through 14, further comprising: identifying a reference slot in accordance with a later slot of the first search space set and the second search space set based at least in part on identifying that the downlink control information corresponds to the combined physical downlink control channel candidate; and identifying a starting location of a physical downlink shared channel based at least in part on the reference slot.

Aspect 16: The method of aspect 15, wherein identifying the starting location further comprises: identifying a resource allocation field in the downlink control information, wherein the starting location of the physical downlink shared channel is identified using a value of the resource allocation field relative to the reference slot.

Aspect 17: The method of any of aspects 1 through 16, further comprising: identifying a reference symbol in accordance with a last symbol of a later of the first search space set and the second search space set; identifying an offset between the reference symbol and a physical downlink shared channel scheduled by the decoded downlink control information; comparing the offset to a UE capability threshold to determine whether to use a default setting or a setting indicated by the downlink control information for receiving the physical downlink shared channel.

Aspect 18: The method of aspect 17, further comprising: determining to use the default setting for receiving the physical downlink shared channel based at least in part on determining that the offset is less than the UE capability threshold in accordance with the comparing.

Aspect 19: The method of aspect 17, further comprising: determining to use the setting indicated by the downlink control information based at least in part on determining that the offset is greater than the UE capability threshold in accordance with the comparing.

Aspect 20: The method of any of aspects 1 through 19, further comprising: identifying a reference slot in accordance with a later slot of the first search space set and the second search space set based at least in part on identifying that the downlink control information corresponds to the combined physical downlink control channel candidate; and identifying a starting location of a physical uplink shared channel based at least in part on the reference slot.

Aspect 21: The method of aspect 20, wherein identifying the starting location further comprises: identifying a resource allocation field included in the decoded downlink control information, wherein the starting location is identified based on a value of the resource allocation field relative to the reference slot.

Aspect 22: The method of any of aspects 1 through 21, further comprising: identifying a reference symbol in accordance with a last symbol of a later search space set of the first search space set and the second search space set based at least in part on identifying that the downlink control information corresponds to the combined physical downlink control channel candidate; and identifying that a scheduled physical uplink control channel starts after a number of symbols after the reference symbol.

Aspect 23: The method of aspect 22, wherein the number of symbols is determined based at least in part on a capability of the UE.

Aspect 24: The method of any of aspects 1 through 23, further comprising: identifying that a physical downlink shared channel scheduled by the downlink control information is rate matched around resources in the first search space set and the second search space set corresponding to the downlink control information based at least in part on identifying that the downlink control information corresponds to the combined physical downlink control channel candidate.

Aspect 25: The method of aspect 24, further comprising: identifying a precoder granularity of a control resource set associated with the first search space set or the second search space set; and identifying that the physical downlink shared channel is further rate matched around one or more demodulation reference signals based at least in part on the precoder granularity.

Aspect 26: The method of aspect 25, wherein the one or more demodulation reference signals correspond to resource element groups of the control resource set when the precoder granularity indicates contiguous resource blocks of the control resource set.

Aspect 27: The method of aspect 25, wherein the one or more demodulation reference signals correspond to resource element groups of the combined physical downlink control channel candidate when the precoder granularity does not indicate contiguous resource blocks of the control resource set.

Aspect 28: The method of any of aspects 1 through 27, further comprising: identifying that the downlink control information does not include a transmission configuration indicator state field indicating a transmission configuration indicator state of a physical downlink shared channel scheduled by the downlink control information; and identifying whether a first control resource set corresponding to the first search space set is a same control resource set as a second control resource set corresponding to the second search space set based at least in part on identifying that the downlink control information corresponds to the combined physical downlink control channel candidate and identifying that the downlink control information does not include the transmission configuration indicator state field.

Aspect 29: The method of aspect 28, further comprising: identifying the transmission configuration indicator state, a quasi-co-location, or both for the scheduled physical downlink shared channel in accordance with the first control resource set or the second control resource set that corresponds to a combined physical downlink shared channel candidate based at least in part on identifying that the first control resource set corresponds to the second control resource set.

Aspect 30: The method of aspect 29, further comprising: determining whether an offset between the downlink control information and a corresponding physical downlink shared channel is greater than or equal to a UE capability threshold, wherein the transmission configuration indicator state, the quasi co-location or both is identified based at least in part on determining that the offset is greater than the UE capability threshold.

Aspect 31: The method of any aspect 28, further comprising: identifying the transmission configuration transmission configuration indicator state, a quasi-co-location, or both for the scheduled physical downlink shared channel in accordance with the first control resource set or the second control resource set based at least in part on identifying that the first control resource set is different from the second control resource set.

Aspect 32: The method of aspect 31, further comprising: identifying the transmission configuration indicator state, the quasi co-location, or both for the scheduled physical downlink shared channel in accordance with the first control resource set or the second control resource set based at least in part on a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof.

Aspect 33: The method of aspect 28, further comprising: identifying the transmission configuration indicator state, a quasi-co-location, or both for the scheduled physical downlink shared channel in accordance with the first control resource set and the second control resource set based at least in part on identifying that the first control resource set is different from the second control resource set.

Aspect 34: The method of aspect 33, wherein the transmission configuration indicator state, the quasi co-location, or both correspond to a multi-state physical downlink shared channel based at least in part on the identifying.

Aspect 35: The method of any of aspects 1 through 34, further comprising: identifying resources of a physical uplink control channel based at least in part on a number of control channel elements and a starting control channel element index from a first control resource set corresponding to the first search space set or from a second control resource set corresponding to the second search space set based at least in part on identifying that the downlink control information corresponds to the combined physical downlink control channel candidate.

Aspect 36: The method of aspect 35, further comprising: identifying the resources of the physical uplink control channel based at least in part on the number of control channel elements and the starting control channel element index from either the first control resource set or the second control resource set based at least in part on a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof.

Aspect 37: The method of any of aspects 1 through 36, further comprising: identifying resources of a physical uplink control channel based at least in part on a number of control channel elements and a starting control channel element index from both a first control resource set corresponding to the first search space set and a second control resource set corresponding to the second search space set based at least in part on identifying that the downlink control information corresponds to the combined physical downlink control channel candidate.

Aspect 38: The method of any of aspects 1 through 37, further comprising: identifying that a first control resource set pool index of a first control resource set corresponding to the first search space set is different from a second control resource set pool index of a second control resource set corresponding to the second search space set based at least in part on identifying that the downlink control information corresponds to the combined physical downlink control channel candidate.

Aspect 39: The method of aspect 38, further comprising: identifying a hybrid automatic repeat request acknowledgement codebook based at least in part on the first control resource set pool index or the second control resource set pool index based at least in part on identifying that the first control resource set pool index and the second control resource set pool index are different.

Aspect 40: The method of aspect 39, further comprising: identifying a fixed control resource set pool index value of the first control resource set pool index and the second control resource set pool index, wherein the hybrid automatic repeat request acknowledgement codebook is identified in accordance with the fixed control resource set pool index value.

Aspect 41: The method of any of aspects 39 through 40, further comprising: identifying a control resource set pool index value corresponding to a fixed control resource set pool index value, a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof, wherein the hybrid automatic repeat request acknowledgement codebook is identified in accordance with the control resource set pool index value.

Aspect 42: The method of any of aspects 38 through 41, further comprising: identifying a hybrid automatic repeat request acknowledgement codebook based at least in part on the first control resource set pool index and the second control resource set pool index based at least in part on identifying that the first control resource set pool index and the second control resource set pool index are different.

Aspect 43: The method of any of aspects 38 through 42, further comprising: identifying a physical downlink scrambling sequence initialization value, a default beam for a physical downlink shared channel scheduled via the decoded downlink control information, a set of activated transmission configuration indicator states, or any combination thereof based at least in part on the first control resource set pool index or the second control resource set pool index.

Aspect 44: The method of aspect 43, further comprising: identifying a control resource set pool index value corresponding to a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof, wherein the physical downlink scrambling sequence initialization value, the default beam for a physical downlink shared channel scheduled via the decoded downlink control information, the set of activated transmission configuration indicator states, or any combination thereof is identified based at least in part on the control resource set pool index value.

Aspect 45: The method of aspect 44 wherein the default setting and the setting indicated by the downlink control information correspond respective receive beams for receiving the physical downlink shared channel.

Aspect 46: A method for wireless communications at a base station, comprising: transmitting downlink control information to a UE, wherein the downlink control information corresponds to a first physical downlink control channel candidate in a first search space set, a second physical downlink control channel candidate in a second search space set, or a combined physical downlink control channel candidate in the first search space set and the second search space set; identifying that the transmitted downlink control channel candidate corresponds to the combined physical downlink control channel candidate based at least in part on the transmitting; and communicating with the UE based at least in part on identifying that the downlink control information corresponds to the combined physical downlink control channel candidate.

Aspect 47: The method of aspect 46, further comprising: including an indication in the downlink control information that indicates that the transmitted physical downlink control channel corresponds to the combined physical downlink control channel candidate.

Aspect 48: The method of aspect 47, wherein the indication comprises a bit indicating that the transmitted downlink control information corresponds to the combined physical downlink control channel candidate.

Aspect 49: The method of any of aspects 47 through 48, wherein including the indication comprises: scrambling a cyclic redundancy check of the downlink control information with a radio network temporary identifier indicating that the transmitted downlink control information corresponds to the combined physical downlink control channel candidate.

Aspect 50: The method of any of aspects 46 through 49, further comprising: scrambling the downlink control information using at least a scrambling identifier that indicates that the transmitted physical downlink control channel candidate is the combined physical downlink control channel candidate.

Aspect 51: The method of aspect 50, wherein scrambling the downlink control information further comprises: scrambling a demodulation reference signal and at least a portion of the downlink control information using the scrambling identifier that indicates that the transmitted physical downlink control channel candidate is the combined physical downlink control channel candidate.

Aspect 52: The method of any of aspects 46 through 51, further comprising: identifying a starting location of a physical downlink shared channel corresponding to the transmitted physical downlink control channel candidate based at least in part on identifying that the transmitted physical downlink control channel candidate is the combined physical downlink control channel candidate; and transmitting the physical downlink shared channel in accordance with the identified starting location.

Aspect 53: The method of aspect 52, wherein identifying the starting location comprises: identifying that the starting location is during or after a first symbol of a later search space set of the first search space set and the second search space set.

Aspect 54: The method of aspect 52, further comprising: identifying that the starting location is during or after a first symbol of an earlier search space set of the first search space set and the second search space set, during or after a first symbol of the first search space set or the second search space set with a smallest index, or during or after a first symbol of a first control resource set and a second control resource set with a smallest identifier.

Aspect 55: The method of aspect 54, further comprising: identifying an offset number of slots relative to the reference slot; and transmitting an identification of the offset number of slots in the downlink control information, wherein the physical downlink shared channel is transmitted based at least in part on the reference slot and the offset number of slots.

Aspect 56: The method of any of aspects 46 through 55, further comprising: identifying a reference symbol for identifying a starting location of a physical downlink shared channel based at least in part on identifying that the transmitted downlink control information corresponds to the combined physical downlink control channel candidate.

Aspect 57: The method of aspect 56, further comprising: identifying a first symbol among a later of the first search space set and the second search space set.

Aspect 58: The method of aspect 56, further comprising: identifying a first symbol among an earlier of the first search space set and the second search space set, a first symbol of the first search space set or the second search space set with a smallest index, or a first symbol of a first control resource set and a second control resource set with a smallest identifier.

Aspect 59: The method of any of aspects 56 through 58, further comprising: identifying a downlink control information format for the transmitted downlink control information, wherein identifying the reference symbol is based at least in part on identifying the downlink control information format.

Aspect 60: The method of any of aspects 56 through 59, further comprising: identifying the starting location of the physical downlink shared channel based at least in part on the reference symbol; and transmitting the physical downlink shared channel based at least in part on the identified starting location.

Aspect 61: The method of any of aspects 46 through 60, further comprising: identifying a reference slot in accordance with a later slot of the first search space set and the second search space set based at least in part on identifying that the transmitted downlink control information corresponds to the combined physical downlink control channel candidate; identifying a starting location of a physical downlink shared channel based at least in part on the reference slot, wherein the transmitted downlink control information indicates the starting location using a value of a resource allocation field included in the downlink control information.

Aspect 62: The method of any of aspects 46 through 61, further comprising: identifying a reference slot in accordance with a later slot of the first search space set and the second search space set based at least in part on identifying that the transmitted downlink control information corresponds to the combined physical downlink control channel candidate; and identifying a starting location of a physical uplink shared channel based at least in part on the reference slot, wherein the transmitted downlink control information indicates the starting location using a value of a resource allocation field included in the downlink control information.

Aspect 63: The method of aspect 62, further comprising: identifying an number of slots relative to the reference slot, wherein the value of the resource allocation field indicates the number of slots.

Aspect 64: The method of any of aspects 46 through 63, further comprising: rate matching resources of a physical downlink shared channel scheduled by the downlink control information around resources in the first search space set and the second search space set corresponding to the downlink control information based at least in part on identifying that the transmitted downlink control information corresponds to the combined physical downlink control channel candidate.

Aspect 65: The method of any of aspects 46 through 64, further comprising: transmitting a precoder granularity of a control resource set associated with the first search space set or the second search space set; and rate matching resources of the physical downlinks shared channel with resources of one or more demodulation reference signals based at least in part on the precoder granularity.

Aspect 66: The method of aspect 65, wherein the one or more demodulation reference signals correspond to resource element groups of the control resource set when the precoder granularity indicates contiguous resource blocks of the control resource set.

Aspect 67: The method of any of aspect 65, wherein the one or more demodulation reference signals correspond to resource element groups of the combined physical downlink control channel candidate when the precoder granularity does not indicate contiguous resource blocks of the control resource set.

Aspect 68: The method of any of aspects 46 through 67, further comprising: transmitting the downlink control information without a transmission configuration indicator state field indicating a transmission configuration indicator state of a physical downlink shared channel scheduled by the downlink control information; and that the transmitted downlink control information does not include a transmission configuration indicator state identifying whether a first control resource set corresponding to the first search space set is a same control resource set as a second control resource set corresponding to the second search space set based at least in part on identifying that the transmitted downlink control information corresponds to the combined physical downlink control channel candidate and transmitting the downlink control information without the transmission configuration indicator state field.

Aspect 69: The method of aspect 68, further comprising: identifying the transmission configuration indicator state, a quasi-co-location, or both for the scheduled physical downlink shared channel in accordance with the first control resource set or the second control resource set that corresponds to a combined physical downlink shared channel candidate based at least in part on identifying that the first control resource set corresponds to the second control resource set.

Aspect 70: The method of aspect 69, further comprising: receiving, from the UE, an indication of the UE capability; and determining whether an offset between the transmitted downlink control information and a corresponding physical downlink shared channel is greater than or equal to a UE capability threshold corresponding to the UE capability, wherein the transmission configuration indicator state, the quasi co-location or both is identified based at least in part on determining that the offset is greater than the UE capability threshold.

Aspect 71: The method of aspect 68, further comprising: identifying the transmission configuration indicator state, a quasi-co-location, or both for the scheduled physical downlink shared channel in accordance with the first control resource set or the second control resource set based at least in part on identifying that the first control resource set is different from the second control resource set.

Aspect 72: The method of aspect 71, further comprising: identifying the transmission configuration indicator state, the quasi co-location, or both for the scheduled physical downlink shared channel in accordance with the first control resource set or the second control resource set based at least in part on a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof.

Aspect 73: The method of aspect 68, further comprising: identifying the transmission configuration indicator state, a quasi-co-location, or both for the scheduled physical downlink shared channel in accordance with the first control resource set and the second control resource set based at least in part on identifying that the first control resource set is different from the second control resource set.

Aspect 74: The method of aspect 73, wherein the transmission configuration indicator state, the quasi co-location, or both correspond to a multi-state physical downlink shared channel based at least in part on the identifying.

Aspect 75: The method of any of aspects 46 through 74, further comprising: identifying resources of a physical uplink control channel based at least in part on a number of control channel elements and a starting control channel element index from a first control resource set corresponding to the first search space set or from a second control resource set corresponding to the second search space set based at least in part on identifying that the transmitted downlink control information corresponds to the combined physical downlink control channel candidate.

Aspect 76: The method of aspect 75, further comprising: identifying the resources of the physical uplink control channel based at least in part on the number of control channel elements and the starting control channel element index from either the first control resource set or the second control resource set based at least in part on a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof.

Aspect 77: The method of any of aspects 75 through 76, further comprising: receiving the physical uplink control channel in accordance with the identifying.

Aspect 78: The method of any of aspects 46 through 77, further comprising: identifying resources of a physical uplink control channel based at least in part on a number of control channel elements and a starting control channel element index from both a first control resource set corresponding to the first search space set and a second control resource set corresponding to the second search space set based at least in part on identifying that the transmitted downlink control information corresponds to the combined physical downlink control channel candidate.

Aspect 79: The method of aspect 78, further comprising: receiving the physical uplink control channel in accordance with the identifying.

Aspect 80: The method of any of aspects 46 through 79, further comprising: identifying that a first control resource set pool index of a first control resource set corresponding to the first search space set is different from a second control resource set pool index of a second control resource set corresponding to the second search space set based at least in part on identifying that the transmitted downlink control information corresponds to the combined physical downlink control channel candidate.

Aspect 81: The method of aspect 80, further comprising: identifying a hybrid automatic repeat request acknowledgement codebook based at least in part on the first control resource set pool index or the second control resource set pool index based at least in part on identifying that the first control resource set pool index and the second control resource set pool index are different.

Aspect 82: The method of aspect 81, further comprising: identifying a fixed control resource set pool index value of the first control resource set pool index and the second control resource set pool index, wherein the hybrid automatic repeat request acknowledgement codebook is identified in accordance with the fixed control resource set pool index value.

Aspect 83: The method of any of aspect 81, further comprising: identifying a control resource set pool index value corresponding to a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof, wherein the hybrid automatic repeat request acknowledgement codebook is identified in accordance with the control resource set pool index value.

Aspect 84: The method of aspect 80, further comprising: identifying a hybrid automatic repeat request acknowledgement codebook based at least in part on the first control resource set pool index and the second control resource set pool index based at least in part on identifying that the first control resource set pool index and the second control resource set pool index are different.

Aspect 85: The method of any of aspects 80 through 84, further comprising: identifying a physical downlink scrambling sequence initialization value, a default beam for a physical downlink shared channel scheduled via the transmitted downlink control information, a set of activated transmission configuration indicator states, or any combination thereof based at least in part on the first control resource set pool index or the second control resource set pool index.

Aspect 86: The method of aspect 85, further comprising: identifying a control resource set pool index value corresponding to a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof, wherein the physical downlink scrambling sequence initialization value, the default beam for a physical downlink shared channel scheduled via the transmitted downlink control information, the set of activate transmission configuration indicator states, or any combination thereof is identified based at least in part on the control resource set pool index value.

Aspect 87: A method for wireless communications at a UE, comprising: receiving downlink control information from a base station; identifying a first physical downlink control channel candidate, a second physical downlink control channel candidate, and a combined physical downlink control channel candidate; decoding the downlink control information from at least one of the first physical downlink control channel candidate, the second physical downlink control channel candidate, and the combined physical downlink control channel candidate based at least in part on the identifying; identifying that the downlink control information corresponds to the combined physical downlink control channel candidate; and communicating with the base station based at least in part on identifying that the downlink control information corresponds to the combined physical downlink control channel candidate.

Aspect 88: The method of aspect 87, further comprising: identifying an indication in the downlink control information, the indication indicating that the downlink control information corresponds to the combined physical downlink control channel candidate.

Aspect 89: The method of aspect 88, wherein identifying the indication in the downlink control information comprises: descrambling a cyclic redundancy check of the downlink control information with a radio network temporary identifier indicating that the downlink control information corresponds to the combined physical downlink control channel candidate.

Aspect 90: The method of any of aspects 87 through 89, wherein decoding the downlink control information comprises: decoding downlink control information using at least a scrambling identifier that indicates that the downlink control information corresponds to the combined physical downlink control channel candidate, wherein the decoding includes descrambling a demodulation reference signal and coded bits of the downlink control information using the scrambling identifier that indicates that the downlink control information corresponds to the combined physical downlink control channel candidate.

Aspect 91: The method of any of aspects 87 through 90, wherein identifying that the downlink control information corresponds to the combined physical downlink control channel candidate comprises: identifying that the downlink control information corresponds to the combined physical downlink control channel candidate based at least in part on a configuration that indicates that the first physical downlink control channel candidate is associated with the second physical downlink control channel candidate.

Aspect 92: The method of any of aspects 87 through 91, wherein identifying the first physical downlink control channel candidate, the second physical downlink control channel candidate, and the combined physical downlink control channel candidate comprises: identifying the first physical downlink control channel candidate in a first search space set, the second physical downlink control channel candidate in a second search space set, and the combined physical downlink control channel candidate in the first search space set and the second search space set.

Aspect 93: The method of aspect 92, further comprising: identifying a starting location of a physical downlink shared channel based at least in part on identifying that the downlink control information corresponds to the combined physical downlink control channel candidate, wherein the starting location is identified during or after a first symbol of a later search space set of the first search space set and the second search space set, during or after a first symbol of an earlier search space set of the first search space set and the second search space set, during or after a first symbol of the first search space set or the second search space set with a smallest index, or during or after a first symbol of a first control resource set and a second control resource set with a smallest identifier; and receiving the physical downlink shared channel based at least in part on the starting location.

Aspect 94: The method of any of aspects 92 through 93, further comprising: identifying a reference symbol for identifying a starting location of a physical downlink shared channel based at least in part on identifying that the downlink control information corresponds to the combined physical downlink control channel candidate; identifying the starting location of the physical downlink shared channel based at least in part on the reference symbol; and receiving the physical downlink shared channel based at least in part on the identified starting location.

Aspect 95: The method of aspect 94, wherein identifying the reference symbol comprises: identifying a first symbol among a later of the first search space set and the second search space set, a first symbol among an earlier of the first search space set and the second search space set, a first symbol of the first search space set or the second search space set with a smallest index, or a first symbol of a first control resource set and a second control resource set with a smallest identifier.

Aspect 96: The method of any of aspects 94 through 95, further comprising: identifying a downlink control information format for the decoded downlink control information, wherein identifying the reference symbol is based at least in part on identifying the downlink control information format.

Aspect 97: The method of any of aspects 92 through 96, further comprising: identifying a reference slot in accordance with a later slot of the first search space set and the second search space set based at least in part on identifying that the downlink control information corresponds to the combined physical downlink control channel candidate; identifying a starting location of a physical downlink shared channel based at least in part on the reference slot and a resource allocation field in the downlink control information, wherein the starting location of the physical downlink shared channel is identified using a value of the resource allocation field relative to the reference slot; and receiving the physical downlink shared channel based at least in part on the identified starting location.

Aspect 98: The method of any of aspects 92 through 97, further comprising: identifying a reference symbol in accordance with a last symbol of a later of the first search space set and the second search space set; identifying an offset between the reference symbol and a physical downlink shared channel scheduled by the decoded downlink control information; comparing the offset to a UE capability threshold to determine whether to use a default setting or a setting indicated by the downlink control information for receiving the physical downlink shared channel, wherein the default setting and the setting indicated by the downlink control information correspond respective receive beams for receiving the physical downlink shared channel.

Aspect 99: The method of aspect 98, further comprising: determining to use the default setting for receiving the physical downlink shared channel based at least in part on determining that the offset is less than the UE capability threshold in accordance with the comparing or determining to use the setting indicated by the downlink control information based at least in part on determining that the offset is greater than the UE capability threshold in accordance with the comparing.

Aspect 100: The method of any of aspects 92 through 99, further comprising: identifying a reference slot in accordance with a later slot of the first search space set and the second search space set based at least in part on identifying that the downlink control information corresponds to the combined physical downlink control channel candidate; identifying a starting location of a physical uplink shared channel based at least in part on the reference slot and a resource allocation field included in the decoded downlink control information, wherein the starting location is identified based on a value of the resource allocation field relative to the reference slot; and transmitting the physical uplink shared channel based at least in part on identifying the starting location.

Aspect 101: The method of any of aspects 92 through 100, further comprising: identifying a reference symbol in accordance with a last symbol of a later search space set of the first search space set and the second search space set based at least in part on identifying that the downlink control information corresponds to the combined physical downlink control channel candidate; and identifying that a scheduled physical uplink control channel starts during or after a number of symbols after the reference symbol, the number of symbols being based at least in part on a capability of the UE.

Aspect 102: The method of any of aspects 92 through 101, further comprising: identifying that the downlink control information does not include a transmission configuration indicator state field indicating a transmission configuration indicator state of a physical downlink shared channel scheduled by the downlink control information; and identifying whether a first control resource set corresponding to the first search space set is a same control resource set as a second control resource set corresponding to the second search space set based at least in part on identifying that the downlink control information corresponds to the combined physical downlink control channel candidate and identifying that the downlink control information does not include the transmission configuration indicator state field.

Aspect 103: The method of aspect 102, further comprising: identifying the transmission configuration indicator state, a quasi-co-location, or both for the scheduled physical downlink shared channel in accordance with the first control resource set or the second control resource set that corresponds to the combined physical downlink control channel candidate based at least in part on identifying that the first control resource set corresponds to the second control resource set; and determining whether an offset between the downlink control information and a corresponding physical downlink shared channel is greater than or equal to a UE capability threshold, wherein the transmission configuration indicator state, the quasi-co-location or both is identified based at least in part on determining that the offset is greater than the UE capability threshold.

Aspect 104: The method of aspect 103, further comprising: identifying the transmission configuration indicator state, a quasi-co-location, or both for the scheduled physical downlink shared channel in accordance with the first control resource set or the second control resource set based at least in part on a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof based at least in part on identifying that the first control resource set is different from the second control resource set.

Aspect 105: The method of aspect 103, further comprising: identifying the transmission configuration indicator state, a quasi-co-location, or both for the scheduled physical downlink shared channel in accordance with the first control resource set and the second control resource set based at least in part on identifying that the first control resource set is different from the second control resource set, wherein the transmission configuration indicator state, the quasi-co-location, or both correspond to a multi-beam or multi-transmission configuration indicator-state physical downlink shared channel based at least in part on the identifying.

Aspect 106: The method of any of aspects 92 through 105, further comprising: identifying that the downlink control information corresponding to the combined physical downlink control channel candidate schedules a physical downlink shared channel; and identifying resources of a physical uplink control channel for a hybrid automatic repeat request transmission for the physical uplink shared channel based at least in part on a number of control channel elements and a starting control channel element index from a first control resource set corresponding to the first search space set or from a second control resource set corresponding to the second search space set based at least in part on identifying that the downlink control information corresponds to the combined physical downlink control channel candidate.

Aspect 107: The method of aspect 106, wherein the resources are further identified based at least in part on the number of control channel elements and the starting control channel element index from either the first control resource set or the second control resource set based at least in part on a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof.

Aspect 108: The method of any of aspects 92 through 107, further comprising: identifying resources of a physical uplink control channel based at least in part on a number of control channel elements and a starting control channel element index from both a first control resource set corresponding to the first search space set and a second control resource set corresponding to the second search space set based at least in part on identifying that the downlink control information corresponds to the combined physical downlink control channel candidate.

Aspect 109: The method of any of aspects 92 through 108, further comprising: identifying that a first control resource set pool index of a first control resource set corresponding to the first search space set is different from a second control resource set pool index of a second control resource set corresponding to the second search space set based at least in part on identifying that the downlink control information corresponds to the combined physical downlink control channel candidate.

Aspect 110: The method of aspect 109, further comprising: identifying that the downlink control information corresponding to the combined physical downlink control channel candidate schedules a physical downlink shared channel; identifying a hybrid automatic repeat request acknowledgement codebook for the scheduled physical downlink control channel candidate based at least in part on the first control resource set pool index or the second control resource set pool index based at least in part on identifying that the first control resource set pool index and the second control resource set pool index are different; and.

Aspect 111: The method of aspect 110, further comprising: identifying a fixed control resource set pool index value of the first control resource set pool index and the second control resource set pool index, wherein the hybrid automatic repeat request acknowledgement codebook is identified in accordance with the fixed control resource set pool index value.

Aspect 112: The method of any of aspects 110 through 111, further comprising: identifying a control resource set pool index value corresponding to a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof, wherein the hybrid automatic repeat request acknowledgement codebook is identified in accordance with the control resource set pool index value.

Aspect 113: The method of any of aspects 109 through 112, further comprising: identifying that the downlink control information corresponding to the combined physical downlink control channel candidate schedules a physical downlink shared channel; identifying a hybrid automatic repeat request acknowledgement codebook for the scheduled physical downlink control channel candidate based at least in part on the first control resource set pool index and the second control resource set pool index based at least in part on identifying that the first control resource set pool index and the second control resource set pool index are different; and transmitting the hybrid automatic repeat request acknowledgement codebook for the scheduled physical downlink control channel candidate with a same value based at least in part on identifying the hybrid automatic repeat request acknowledgement codebook based at least in part on the first control resource set pool index and the second control resource set pool index.

Aspect 114: The method of any of aspects 109 through 113, further comprising: identifying a physical downlink scrambling sequence initialization value, a default beam for a physical downlink shared channel scheduled via the decoded downlink control information, a set of activated transmission configuration indicator states, or any combination thereof based at least in part on the first control resource set pool index or the second control resource set pool index; and.

Aspect 115: The method of any of aspects 87 through 114, further comprising: identifying that a physical downlink shared channel scheduled by the downlink control information is rate matched around resources of the first physical downlink control channel candidate and the second physical downlink control channel candidate corresponding to the downlink control information based at least in part on identifying that the downlink control information corresponds to the combined physical downlink control channel candidate.

Aspect 116: The method of aspect 115, further comprising: identifying a precoder granularity of a control resource set associated with the first physical downlink control channel candidate and the second physical downlink control channel candidate; and identifying that the physical downlink shared channel is further rate matched around one or more demodulation reference signals based at least in part on the precoder granularity, where the one or more demodulation reference signals correspond to resource element groups of the control resource set when the precoder granularity indicates contiguous resource blocks of the control resource set and wherein the one or more demodulation reference signals correspond to resource element groups of the combined physical downlink control channel candidate when the precoder granularity does not indicate contiguous resource blocks of the control resource set.

Aspect 117: An apparatus for wireless communications at a UE, comprising a processor; memory coupled with the processor; and instructions stored in the memory and executable by the processor to cause the apparatus to perform a method of any of aspects 1 through 44.

Aspect 118: An apparatus for wireless communications at a UE, comprising at least one means for performing a method of any of aspects 1 through 44.

Aspect 119: A non-transitory computer-readable medium storing code for wireless communications at a UE, the code comprising instructions executable by a processor to perform a method of any of aspects 1 through 44.

Aspect 120: An apparatus comprising a processor; memory coupled with the processor; and instructions stored in the memory and executable by the processor to cause the apparatus to perform a method of any of aspects 45 through 45.

Aspect 121: An apparatus comprising at least one means for performing a method of any of aspects 45 through 45.

Aspect 122: A non-transitory computer-readable medium storing code the code comprising instructions executable by a processor to perform a method of any of aspects 45 through 45.

Aspect 123: An apparatus for wireless communications at a base station, comprising a processor; memory coupled with the processor; and instructions stored in the memory and executable by the processor to cause the apparatus to perform a method of any of aspects 46 through 86.

Aspect 124: An apparatus for wireless communications at a base station, comprising at least one means for performing a method of any of aspects 46 through 86.

Aspect 125: A non-transitory computer-readable medium storing code for wireless communications at a base station, the code comprising instructions executable by a processor to perform a method of any of aspects 46 through 86.

Aspect 126: An apparatus for wireless communications at a UE, comprising a processor; memory coupled with the processor; and instructions stored in the memory and executable by the processor to cause the apparatus to perform a method of any of aspects 87 through 116.

Aspect 127: An apparatus for wireless communications at a UE, comprising at least one means for performing a method of any of aspects 87 through 116.

Aspect 128: A non-transitory computer-readable medium storing code for wireless communications at a UE, the code comprising instructions executable by a processor to perform a method of any of aspects 87 through 116.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving downlink control information from a network entity;
   identifying a first physical downlink control channel candidate in a first search space set, a second physical downlink control channel candidate in a second search space set, and a combined physical downlink control channel candidate in the first search space set and the second search space set;
   decoding the downlink control information from at least one of the first physical downlink control channel candidate, the second physical downlink control channel candidate, or the combined physical downlink control channel candidate based at least in part on the identifying;
   identifying that the downlink control information corresponds to the combined physical downlink control channel candidate;
   identifying a starting location of a physical downlink shared channel as during or after a first symbol of a later search space set of the first search space set and the second search space set based at least in part on identifying that the downlink control information corresponds to the combined physical downlink control channel candidate; and
   receiving the physical downlink shared channel based at least in part on the starting location.

2. The method of claim 1, further comprising:
   receiving, in the downlink control information, an indication that the downlink control information corresponds to the combined physical downlink control channel candidate.

3. The method of claim 2, wherein receiving the indication comprises:
   descrambling a cyclic redundancy check of the downlink control information with a radio network temporary identifier indicating that the downlink control information corresponds to the combined physical downlink control channel candidate.

4. The method of claim 1, wherein decoding the downlink control information comprises:
   decoding downlink control information using at least a scrambling identifier that indicates that the downlink control information corresponds to the combined physical downlink control channel candidate, wherein the decoding includes descrambling a demodulation reference signal and coded bits of the downlink control information using the scrambling identifier that indicates that the downlink control information corresponds to the combined physical downlink control channel candidate.

5. The method of claim 1, wherein identifying that the downlink control information corresponds to the combined physical downlink control channel candidate comprises:
   identifying that the downlink control information corresponds to the combined physical downlink control channel candidate based at least in part on a configuration that indicates that the first physical downlink control channel candidate is associated with the second physical downlink control channel candidate.

6. The method of claim 1, further comprising:
identifying a reference symbol as the first symbol among the later search space set of the first search space set and the second search space set for identifying the starting location of the physical downlink shared channel based at least in part on identifying that the downlink control information corresponds to the combined physical downlink control channel candidate;
identifying the starting location of the physical downlink shared channel based at least in part on the reference symbol; and
receiving the physical downlink shared channel based at least in part on the starting location.

7. The method of claim 1, further comprising:
identifying a reference slot in accordance with a later slot of the first search space set and the second search space set based at least in part on identifying that the downlink control information corresponds to the combined physical downlink control channel candidate;
identifying the starting location of the physical downlink shared channel based at least in part on the reference slot and a resource allocation field in the downlink control information, wherein the starting location of the physical downlink shared channel is identified using a value of the resource allocation field relative to the reference slot; and
receiving the physical downlink shared channel based at least in part on the starting location.

8. The method of claim 1, further comprising:
identifying a reference symbol in accordance with a last symbol of a later of the first search space set and the second search space set;
identifying an offset between the reference symbol and a physical downlink shared channel scheduled by the decoded downlink control information; and
comparing the offset to a UE capability threshold to determine whether to use a default setting or a setting indicated by the downlink control information for receiving the physical downlink shared channel, wherein the default setting and the setting indicated by the downlink control information correspond respective receive beams for receiving the physical downlink shared channel.

9. The method of claim 1, further comprising:
identifying a reference slot in accordance with a later slot of the first search space set and the second search space set based at least in part on identifying that the downlink control information corresponds to the combined physical downlink control channel candidate;
identifying a starting location of a physical uplink shared channel based at least in part on the reference slot and a resource allocation field included in the decoded downlink control information, wherein the starting location is identified based on a value of the resource allocation field relative to the reference slot; and
transmitting the physical uplink shared channel based at least in part on identifying the starting location.

10. The method of claim 1, further comprising:
identifying a reference symbol in accordance with a last symbol of a later search space set of the first search space set and the second search space set based at least in part on identifying that the downlink control information corresponds to the combined physical downlink control channel candidate; and
identifying that a scheduled physical uplink shared channel starts during or after a number of symbols after the reference symbol, the number of symbols being based at least in part on a capability of the UE.

11. The method of claim 1, further comprising:
identifying that a physical downlink shared channel scheduled by the downlink control information is rate matched around resources of the first physical downlink control channel candidate and the second physical downlink control channel candidate corresponding to the downlink control information based at least in part on identifying that the downlink control information corresponds to the combined physical downlink control channel candidate.

12. The method of claim 11, further comprising:
identifying a precoder granularity of a control resource set associated with the first physical downlink control channel candidate and the second physical downlink control channel candidate; and
identifying that the physical downlink shared channel is further rate matched around one or more demodulation reference signals based at least in part on the precoder granularity, wherein the one or more demodulation reference signals correspond to resource element groups of the control resource set when the precoder granularity indicates contiguous resource blocks of the control resource set and wherein the one or more demodulation reference signals correspond to resource element groups of the combined physical downlink control channel candidate when the precoder granularity does not indicate contiguous resource blocks of the control resource set.

13. The method of claim 1, further comprising:
identifying that the downlink control information does not include a transmission configuration indicator state field indicating a transmission configuration indicator state of the physical downlink shared channel scheduled by the downlink control information; and
identifying whether a first control resource set corresponding to the first search space set is a same control resource set as a second control resource set corresponding to the second search space set based at least in part on identifying that the downlink control information corresponds to the combined physical downlink control channel candidate and identifying that the downlink control information does not include the transmission configuration indicator state field.

14. The method of claim 13, further comprising:
identifying the transmission configuration indicator state, a quasi-co-location, or both for the physical downlink shared channel in accordance with the first control resource set or the second control resource set that corresponds to the combined physical downlink control channel candidate based at least in part on identifying that the first control resource set corresponds to the second control resource set; and
determining whether an offset between the downlink control information and a corresponding physical downlink shared channel is greater than or equal to a UE capability threshold, wherein the transmission configuration indicator state, the quasi-co-location or both is identified based at least in part on determining that the offset is greater than the UE capability threshold.

15. The method of claim 14, further comprising:
identifying the transmission configuration indicator state, the quasi-co-location, or both for the physical downlink shared channel in accordance with the first control resource set or the second control resource set using a lower control resource set identifier of the first control resource set and the second control resource set based at least in part on identifying that the first control resource set is different from the second control resource set.

16. The method of claim 13, further comprising:
identifying the transmission configuration indicator state, a quasi-co-location, or both for the physical downlink shared channel in accordance with the first control resource set and the second control resource set based at least in part on identifying that the first control resource set is different from the second control resource set, wherein the transmission configuration indicator state, the quasi-co-location, or both correspond to a multi-beam or multi-transmission configuration indicator-state physical downlink shared channel.

17. The method of claim 1, further comprising:
identifying that the downlink control information corresponding to the combined physical downlink control channel candidate schedules a physical downlink shared channel; and
identifying resources of a physical uplink control channel for a hybrid automatic repeat request transmission for the physical downlink shared channel using a number of control channel elements and a starting control channel element index from a first control resource set corresponding to a lower search space set identifier of the first search space set and the second search space set based at least in part on identifying that the downlink control information corresponds to the combined physical downlink control channel candidate.

18. The method of claim 1, further comprising:
identifying resources of a physical uplink control channel using a number of control channel elements and a starting control channel element index from both a first control resource set corresponding to the first search space set and a second control resource set corresponding to the second search space set based at least in part on identifying that the downlink control information corresponds to the combined physical downlink control channel candidate.

19. The method of claim 1, further comprising:
identifying that a first control resource set pool index of a first control resource set corresponding to the first search space set is different from a second control resource set pool index of a second control resource set corresponding to the second search space set based at least in part on identifying that the downlink control information corresponds to the combined physical downlink control channel candidate.

20. The method of claim 19, further comprising:
identifying that the downlink control information corresponding to the combined physical downlink control channel candidate schedules the physical downlink shared channel;
identifying a hybrid automatic repeat request acknowledgement codebook for the physical downlink shared channel using the first control resource set pool index or the second control resource set pool index based at least in part on identifying that the first control resource set pool index and the second control resource set pool index are different; and
transmitting the hybrid automatic repeat request acknowledgement codebook for the physical downlink shared channel.

21. The method of claim 20, further comprising:
identifying a control resource set pool index value corresponding to a fixed control resource set pool index value of the first control resource set pool index and the second control resource set pool index, a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof, wherein the hybrid automatic repeat request acknowledgement codebook is identified in accordance with the control resource set pool index value.

22. The method of claim 19, further comprising:
identifying that the downlink control information corresponding to the combined physical downlink control channel candidate schedules the physical downlink shared channel;
identifying a hybrid automatic repeat request acknowledgement codebook for the scheduled physical downlink shared channel using the first control resource set pool index and the second control resource set pool index based at least in part on identifying that the first control resource set pool index and the second control resource set pool index are different; and
transmitting the hybrid automatic repeat request acknowledgement codebook for the physical downlink shared channel with a same value based at least in part on identifying the hybrid automatic repeat request acknowledgement codebook using the first control resource set pool index and the second control resource set pool index.

23. The method of claim 19, further comprising:
identifying a physical downlink scrambling sequence initialization value, a default beam for the physical downlink shared channel scheduled via the decoded downlink control information, a set of activated transmission configuration indicator states, or any combination thereof based at least in part on the first control resource set pool index or the second control resource set pool index; and
identifying a control resource set pool index value corresponding to a fixed value, a lower control resource set identifier of the first control resource set and the second control resource set, a higher control resource set identifier of the first control resource set and the second control resource set, a lower search space set identifier of the first search space set and the second search space set, a higher search space set identifier of the first search space set and the second search space set, a starting location of the first search space set and the second search space set, an ending location of the first search space set or the second search space set, or any combination thereof, wherein the physical downlink scrambling sequence initialization value, the default beam for the physical downlink shared channel scheduled via the decoded downlink control information, the set of activated transmission configuration indicator states, or any combination thereof is identified based at least in part on the control resource set pool index value.

24. An apparatus for wireless communications at a user equipment (UE), comprising:
a processor;
memory coupled with the processor; and
instructions stored in the memory and executable by the processor to cause the apparatus to:
receive downlink control information from a network entity;
identify a first physical downlink control channel candidate in a first search space set, a second physical downlink control channel candidate in a second search space set, and a combined physical downlink control channel candidate in the first search space set and the second search space set;
decode the downlink control information from at least one of the first physical downlink control channel candidate, the second physical downlink control channel candidate, or the combined physical downlink control channel candidate based at least in part on the identifying;
identify that the downlink control information corresponds to the combined physical downlink control channel candidate;
identify a starting location of a physical downlink shared channel as during or after a first symbol of a later search space set of the first search space set and the second search space set based at least in part on identifying that the downlink control information corresponds to the combined physical downlink control channel candidate; and
receive the physical downlink shared channel based at least in part on the starting location.

25. An apparatus for wireless communications at a user equipment (UE), comprising:
means for receiving downlink control information from a network entity;
means for identifying a first physical downlink control channel candidate in a first search space set, a second physical downlink control channel candidate in a second search space set, and a combined physical downlink control channel candidate in the first search space set and the second search space set;
means for decoding the downlink control information from at least one of the first physical downlink control channel candidate, the second physical control channel candidate, or the combined physical downlink control channel candidate based at least in part on the identifying;
means for identifying that the downlink control information corresponds to the combined physical downlink control channel candidate;
means for identifying a starting location of a physical downlink shared channel as during or after a first symbol of a later search space set of the first search space set and the second search space set based at least in part on identifying that the downlink control information corresponds to the combined physical downlink control channel candidate; and
means for receiving the physical downlink shared channel based at least in part on the starting location.

26. A non-transitory computer-readable medium storing code for wireless communications at a user equipment (UE), the code comprising instructions executable by a processor to:
receive downlink control information from a network entity;
identify a first physical downlink control channel candidate in a first search space set, a second physical downlink control channel candidate in a second search space set, and a combined physical downlink control channel candidate in the first search space set and the second search space set;
decode the downlink control information from at least one of the first physical downlink control channel candidate, the second physical downlink control channel candidate, or the combined physical downlink control channel candidate based at least in part on the identifying;
identify that the downlink control information corresponds to the combined physical downlink control channel candidate;
identify a starting location of a physical downlink shared channel as during or after a first symbol of a later search space set of the first search space set and the second search space set based at least in part on identifying that the downlink control information corresponds to the combined physical downlink control channel candidate; and
receive the physical downlink shared channel based at least in part on the starting location.

* * * * *